US011208053B2

(12) United States Patent
Chang et al.

(10) Patent No.: US 11,208,053 B2
(45) Date of Patent: Dec. 28, 2021

(54) MOVABLE CARRIER AUXILIARY SYSTEM

(71) Applicant: ABILITY OPTO-ELECTRONICS TECHNOLOGY CO., LTD., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO ELECTRONICS TECHNOLOGY CO., LTD., Taichung (TW)

( * ) Notice: Subject to any disclaimer, the term of this patent is extended or adjusted under 35 U.S.C. 154(b) by 399 days.

(21) Appl. No.: 16/506,293

(22) Filed: Jul. 9, 2019

(65) Prior Publication Data
US 2020/0215991 A1 Jul. 9, 2020

(30) Foreign Application Priority Data

Jan. 7, 2019 (TW) .................. 108100592

(51) Int. Cl.
*B60R 11/04* (2006.01)
*B60R 1/12* (2006.01)

(52) U.S. Cl.
CPC .............. *B60R 11/04* (2013.01); *B60R 1/12* (2013.01); *B60R 2001/1215* (2013.01); *B60R 2001/1253* (2013.01); *B60R 2300/105* (2013.01); *B60R 2300/602* (2013.01);
(Continued)

(58) Field of Classification Search
CPC ... B60R 11/04; B60R 1/12; B60R 2001/1215; B60R 2001/1253; B60R 2300/602; B60R 2300/8026; B60R 2300/8066; B60R 2300/8093; B60R 2300/105; B60R 1/08; B60R 1/088; B60R 1/04; B60R 1/00; B60R 2300/10; B60R 2300/20; B60R 2300/30; B60R 2300/804; G02B 13/0045; G02B 13/004
See application file for complete search history.

(56) References Cited

U.S. PATENT DOCUMENTS

| 10,151,904 B2 * | 12/2018 | Lee ................ G02B 13/06 |
| 10,228,545 B2 * | 3/2019 | Chang ............... G02B 9/62 |
| 10,558,015 B2 * | 2/2020 | Chang ........... G02B 13/0045 |

(Continued)

*Primary Examiner* — James M Pontius
(74) *Attorney, Agent, or Firm* — Muncy, Geissler, Olds & Lowe, P.C.

(57) ABSTRACT

A movable carrier auxiliary system includes at least two optical image capturing systems respectively disposed on a left portion and a right portion of a movable carrier. Each optical image capturing system includes an image capturing module, an operation module, at least one warning module, and at least one displaying device, and has at least one lens group including at least two lenses having refractive power. The image capturing module captures and produces an environmental image surrounding the movable carrier. The operation module electrically connected to the image capturing module detects at least one moving object in the environmental image to generate a detecting signal. The warning module electrically connected to the operation module receives the detecting signal, and generates a warning signal when determines that the moving object approach to the movable carrier. The displaying device is electrically connected to the warning module to display the warning signal.

40 Claims, 20 Drawing Sheets

(52) U.S. Cl.
CPC .......... *B60R 2300/8026* (2013.01); *B60R 2300/8066* (2013.01); *B60R 2300/8093* (2013.01)

(56) References Cited

U.S. PATENT DOCUMENTS

| | | | |
|---|---|---|---|
| 10,809,488 B2* | 10/2020 | Chang | G02B 7/08 |
| 10,816,749 B2* | 10/2020 | Chang | H04N 5/2253 |
| 10,911,654 B2* | 2/2021 | Chang | H04N 5/2254 |
| 10,960,829 B2* | 3/2021 | Chang | B60R 1/04 |
| 11,089,215 B2* | 8/2021 | Chang | H04N 5/23293 |
| 2010/0020170 A1* | 1/2010 | Higgins-Luthman | G06K 9/00791 348/135 |
| 2013/0208083 A1* | 8/2013 | Li | H04N 5/23238 348/36 |
| 2015/0098135 A1* | 4/2015 | Chung | G02B 13/18 359/713 |
| 2016/0044284 A1* | 2/2016 | Goseberg | G06F 3/012 348/148 |
| 2016/0252709 A1* | 9/2016 | Lin | G02B 13/0045 348/335 |
| 2016/0282588 A1* | 9/2016 | Sekine | G02B 13/0045 |
| 2017/0176716 A1* | 6/2017 | Lai | G02B 13/0055 |
| 2017/0371133 A1* | 12/2017 | Lai | G02B 9/62 |
| 2020/0021720 A1* | 1/2020 | Wang | H04N 5/2258 |
| 2020/0216065 A1* | 7/2020 | Chang | G02F 1/166 |
| 2020/0218945 A1* | 7/2020 | Chang | G06K 9/6288 |
| 2020/0269862 A1* | 8/2020 | Chang | G08G 1/22 |

* cited by examiner

MOVABLE CARRIER AUXILIARY SYSTEM

BACKGROUND OF THE INVENTION

Technical Field

The present invention generally relates to a movable carrier auxiliary system, and more particularly to an auxiliary system that could visualize an external environment with a wide viewing angle and could identify and warn an object in the environment.

Description of Related Art

With frequent commercial activities and the rapid expansion of transportation logistics, people are more dependent on the mobile vehicle such as car or motorcycle. At the same time, drivers are paying more and more attention to the protection of their lives and property when driving, and therefore, in addition to the performance and the comfort of the mobile vehicle, it is also considered whether the mobile vehicle to be purchased provides sufficient safety guards or auxiliary devices. Under this trend, in order to increase the safety of vehicles, automobile manufacturers or vehicle equipment design manufacturers have developed various driving safety protection devices or auxiliary devices, such as rearview mirrors, driving recorders, a panoramic image instant displaying of blind vision areas, a global positioning system that records the driving path at any time, and etc.

In addition, with the rapid development of digital cameras and computer visions in daily life, the digital cameras have been applied to driving assistance systems, hoping to reduce the accident rate of traffic accidents through the application of artificial intelligence.

Take a conventional rearview mirror as an example, when a driver changes lanes or turns, most of the conventional rearview mirror is used to observe and determine the presence or absence of objects outside of the vehicle. However, most of the rearview mirrors have limitations and disadvantages in use under certain driving conditions. For example, when driving at night, the driver's pupil is in an enlarged state in the dark environment just like the shutter of the camera for providing more optical signals to the optic nerve. In such a state, the driver's eyes are extremely sensitive to sudden light. Usually, the rearview mirror reflects the front light from the overtaking or subsequent vehicles, which causes the driver to have a visual dizziness, so that the driver's visual ability will be rapidly reduced in an instant, increasing the driver's reaction time that front obstacles become visible.

Moreover, based on the structural design of the traditional car, all of the rearview mirrors have their own blind vision area in the corresponding installation position, so that the driver cannot completely obtain the actual road information outside of the car via the images shown by the rearview mirrors. In terms of safety design considerations, the conventional rearview mirror still has room for improvements.

Furthermore, when the driver wants to change lanes, turn, or reverse during driving, the driver must change the line of sight to see the left or right rear view mirror to know the road environment of the single lane. However, the viewable area provided by the left or right rear view mirror does not help the driver to know the blind vision information that the left or right rear view mirror does not display. Sometimes, the driver needs to turn the head directly to check the rear exterior conditions of the vehicle, or by watching the rearview mirror within the vehicle to completely capture the static and dynamic scene outside of the vehicle. Therefore, in the above specific actions for driving a vehicle, the driver needs to constantly change the line of sight to obtain the road condition information, and cannot pay attention to the road conditions in all directions in time, which may cause a car accident or a collision event.

Therefore, there is a need for the manufacturers to develop an image output device to display an image with a wide viewing angle integrated by both of the visible area and the blind vision area of the interior and exterior rearview mirrors to the driver, so that the driver could obtain the road information of the surrounding environment of the vehicle by a single line of sight conversion, improving the driving safety.

BRIEF SUMMARY OF THE INVENTION

The aspect of embodiment of the present disclosure directs to a movable carrier auxiliary system which includes at least two optical image capturing systems respectively disposed on a left portion and a right portion of a movable carrier, at least one warning module, and at least one displaying device. Each of the optical image capturing systems includes an image capturing module and an operation module, wherein the image capturing module captures and produces an environmental image of the surrounding of the movable carrier. The operation module is electrically connected to the mage capturing module, and detects at least one moving object in the environmental image to generate a detecting signal. The at least one warning module is electrically connected to the operation module, and could receive the detecting signal, and could generate a warning signal when determines that the moving object approach to the movable carrier. The at least one displaying device is electrically connected to the warning module to display the warning signal.

Another primary objective of the present invention is to provide a movable carrier auxiliary system, which includes at least two optical image capturing systems respectively disposed on a left portion and a right portion of a movable carrier, at least one warning module, and at least one displaying device. Each of the optical image capturing systems includes an image capturing module and an operation module wherein the image capturing module captures and produces an environmental image surrounding the movable carrier, and the operation module is electrically connected to the image capturing module and detects at least one moving object in the environmental image to generate a detecting signal. The at least one warning module is electrically connected to the operation module, and could receive the detecting signal, and could generate a warning signal when determines that the moving object approach to the movable carrier. The at least one displaying device is electrically connected to the warning module to display the warning signal. Each of the optical image capturing systems has at least one lens group, wherein the at least one lens group includes at least two lenses having refractive power and satisfies: $1.0 \le f/HEP \le 10.0$; $0 \deg < HAF \le 150 \deg$; and $0.9 \le 2(ARE/HEP) \le 2.0$, wherein f is a focal length of the at least one lens group; HEP is an entrance pupil diameter of the at least one lens group; HAF is a half of a maximum field angle of the at least one lens group; ARE is a profile curve length measured from a start point where an optical axis of the at least one lens group passes through any surface of one of the at least two lenses, along a surface profile of the corresponding lens, and finally to a coordinate point of a perpendicular distance where is a half of the entrance pupil diameter away from the optical axis.

Still another primary objective of the present invention is to provide a movable carrier auxiliary system, which includes at least three optical image capturing systems, at least one warning module, at least one warning member at least one image fusion output device, and at least one displaying device. The optical image capturing systems are respectively disposed on a left portion, a right portion, and a rear portion of a movable carrier, wherein each of the optical image capturing systems includes an image capturing module and an operation module. The image capturing module captures and produces an environmental image surrounding the movable carrier; the operation module is electrically connected to the image capturing module, and detects at least one moving object in the environmental image to generate a detecting signal and at least one tracking mark. The at least one warning module is electrically connected to the operation module, and could receive the detecting signal, and could generate a warning signal when determines that the moving object approach to the movable carrier. The at least one warning member is disposed on the movable carrier and is electrically connected to the at least one warning module, and could receive the warning signal and operate accordingly. The at least one image fusion output device is disposed inside of the movable carrier and is electrically connected to the optical image capturing systems, thereby to receive the environmental image of the optical image capturing systems to generate a fusion image. The at least one displaying device is electrically connected to the image fusion output device to display the fusion image and the at least one tracking mark. Each of the optical image capturing systems has at least one lens group, wherein the at least one lens group includes at least two lenses having refractive power and satisfies: $1.0 \leq f/HEP \leq 10.0$; $0 \deg < HAF \leq 150 \deg$; and $0.9 \leq 2(ARE/HEP) \leq 2.0$, wherein f is a focal length of the at least one lens group; HEP is an entrance pupil diameter of the at least one lens group; HAF is a half of a maximum field angle of the at least one lens group; ARE is a profile curve length measured from a start point where an optical axis of the at least one lens group passes through any surface of one of the at least two lenses, along a surface profile of the corresponding lens, and finally to a coordinate point of a perpendicular distance where is a half of the entrance pupil diameter away from the optical axis.

The lens group uses structural size design and combination of refractive powers, convex and concave surfaces of at least two optical lenses (the convex or concave surface in the disclosure denotes the geometrical shape of an image-side surface or an object-side surface of each lens on an optical axis) to reduce the size and increase the quantity of incoming light of the optical image capturing module, thereby the optical image capturing module could have a better amount of light entering therein and could improve imaging total pixels and imaging quality for image formation.

The movable carrier auxiliary system is a vehicle electronic rear-view mirror as an example and includes a first transparent assembly, a second transparent assembly, an electro-optic medium layer, at least one transparent electrode, at least one reflective layer, and at least one transparent conductive layer. The electro-optic medium layer is disposed between the first transparent assembly and the second transparent assembly. The transparent electrode could be disposed between the first transparent assembly and the electro-optic medium layer. The electro-optic medium layer could be disposed between the first transparent assembly and the reflective layer. The transparent electrode could be disposed between the electro-optic medium layer and the reflective layer. In this way, when the electro-optic medium layer is enabled by applying an external voltage or current, the optical properties of the electro-optic medium layer in the visible wavelength range (e.g. light transmittance, light reflectivity, or absorbance) could produce stable reversible change, thereby enabling color and transparency changes.

When an intensity of the external light is too strong to affect the driver's eyes, the external light is absorbed by the electro-optic medium layer to be in a matt state after the light beam reaches the electro-optic medium layer, so that the vehicle electronic rearview mirror is switched to an anti-glare mode. On the other hand, when the electro-optic medium layer is disenabled, the electro-optic medium layer is transparent. At this time, the external light passes through the electro-optic medium layer to be reflected by the reflective layer, so that the vehicle electronic rear-view mirror is switched to a mirror mode.

In an embodiment, the first transparent assembly has a surface away from the second transparent assembly. An external light enters the vehicle electronic rear-view mirror via the surface, and the vehicle electronic rear-view mirror reflects the external light, so that the external light leaves the vehicle electronic rear-view mirror via the surface. A reflectance of the vehicle electronic rear-view mirror for reflecting the external light is more than 35%.

In an embodiment, the first transparent assembly is adhered to the second incidence surface via an optical adhesive, and the optical adhesive forms an optical adhesion layer.

In an embodiment, the vehicle electronic rear-view mirror includes an auxiliary reflective layer disposed between the reflective layer and the second transparent assembly.

In an embodiment, a material of the reflective layer could be a material which is conductive and is selected from a group consisting of at least one of silver (Ag), copper (Cu), aluminum (Al), titanium (Ti), molybdenum (Mo) or its alloy.

In an embodiment, a material of the auxiliary reflective layer could be selected from a material containing cerium oxide, or a group consisting of chromium (Cr), titanium, and molybdenum, or an alloy thereof, or could be a transparent conductive material.

In an embodiment, the second transparent assembly is disposed between the transparent conductive layer and the reflective layer.

In an embodiment, a material of the transparent conductive layer could be at least one material selected from a group consisting of indium tin oxide (ITO), indium zinc oxide (IZO), Al-doped ZnO (AZO), or Fluorine-doped tin oxide.

In an embodiment, the displaying device is adapted to emit an image light, wherein the image light passes through the vehicle electronic rear-view mirror and leaves the vehicle electronic rear-view mirror via the surface. A reflectance of the vehicle electronic rear-view mirror for reflecting the external light could be more than 40%, and a penetration rate of the vehicle electronic rear-view mirror for the image light is greater than 15%.

In an embodiment, the electro-optic medium layer is selected from an electrochromic layer, a polymer dispersed liquid crystal (PDLC) layer, or a suspended particle device (SPD) layer.

In an embodiment, the lens group satisfies: $0.9 \leq ARS/EHD \leq 2.0$, wherein for any surface of any lens, ARS is a profile curve length measured from a start point where the optical axis passes therethrough, along a surface profile thereof, and finally to an end point of the maximum effective half diameter thereof; EHD is a maximum effective half diameter thereof.

In an embodiment, the lens group satisfies: PLTA≤100 µm; PSTA≤100 µm; NLTA≤100 µm; NSTA≤100 µm; SLTA≤100 µm; SSTA≤100 µm; and |TDT|<250%, wherein HOI is a maximum height for image formation perpendicular to the optical axis on an image plane of the at least one lens group; PLTA is a transverse aberration at 0.7 HOI in a positive direction of a tangential ray fan aberration after the longest operation wavelength passing through an edge of the entrance pupil; PSTA is a transverse aberration at 0.7 HOI in the positive direction of the tangential ray fan aberration after the shortest operation wavelength passing through the edge of the entrance pupil; NLTA is a transverse aberration at 0.7 HOI in a negative direction of the tangential ray fan aberration after the longest operation wavelength passing through the edge of the entrance pupil; NSTA is a transverse aberration at 0.7 HOI in the negative direction of the tangential ray fan aberration after the shortest operation wavelength passing through the edge of the entrance pupil; SLTA is a transverse aberration at 0.7 HOI of a sagittal ray fan aberration after the longest operation wavelength passing through the edge of the entrance pupil; SSTA is a transverse aberration at 0.7 HOI of the sagittal ray fan aberration after the shortest operation wavelength passing through the edge of the entrance pupil; TDT is a TV distortion for image formation in the optical image capturing module.

In an embodiment, the lens group includes four lenses having refractive power, which are constituted by a first lens, a second lens, a third lens, and a fourth lens in order along an optical axis from an object side to an image side. The lens group satisfies: 0.1≤InTL/HOS≤0.95, wherein HOS is a distance in parallel with the optical axis between an object-side surface of the first lens and an image plane of the at least one lens group; InTL is a distance in parallel with the optical axis from the object-side surface of the first lens to an image-side surface of the fourth lens.

In an embodiment, the lens group includes five lenses having refractive power, which are constituted by a first lens, a second lens, a third lens, a fourth lens, and a fifth lens in order along an optical axis from an object side to an image side. The lens group satisfies: 0.1≤InTL/HOS≤0.95, wherein HOS is a distance in parallel with the optical axis between an object-side surface of the first lens and an image plane of the at least one lens group; InTL is a distance in parallel with the optical axis from the object-side surface of the first lens to an image-side surface of the fifth lens.

In an embodiment, the lens group includes six lenses having refractive power, which are constituted by a first lens, a second lens, a third lens, a fourth lens, a fifth lens, and a six lens in order along an optical axis from an object side to an image side. The lens group satisfies: 0.1≤InTL/HOS≤0.95, wherein HOS is a distance in parallel with the optical axis between an object-side surface of the first lens and an image plane of the at least one lens group; InTL is a distance in parallel with the optical axis from the object-side surface of the first lens to an image-side surface of the sixth lens.

In an embodiment, the lens group includes seven lenses having refractive power, which are constituted by a first lens, a second lens, a third lens, a fourth lens, a fifth lens, a sixth lens, and a seventh lens in order along an optical axis from an object side to an image side. The lens group satisfies: 0.1≤InTL/HOS≤0.95, wherein HOS is a distance in parallel with the optical axis between an object-side surface of the first lens and an image plane of the at least one lens group; InTL is a distance in parallel with the optical axis from the object-side surface of the first lens to an image-side surface of the seventh lens.

In an embodiment, the lens group includes more than seven lenses having refractive power.

In an embodiment, the optical image capturing system has at least two lens groups, wherein each of the lens groups includes at least two lenses having refractive power.

In an embodiment, the displaying device includes at least one of a LCD, a LED, an OLED, a plasma projection element, a digital projection element, and a liquid crystal display module.

In an embodiment, the electrical connector includes at least one of a flexible circuit board, a copper foil, and an electric wire.

In an embodiment, further including an image sensing device electrically connected to the at least one control member for sensing an environment brightness inside of the movable carrier, wherein the at least one control member controls a brightness of the at least one displaying device according to the environment brightness.

In an embodiment, when the environment brightness decreases, the brightness of the image decreases, while when the environment brightness rises, the brightness of the image rises.

The lens parameter related to a length or a height in the lens:

A maximum height for image formation of the optical image capturing module is denoted by HOI. A height of the optical image capturing module (i.e., a distance between an object-side surface of the first lens and an image plane on an optical axis) is denoted by HOS. A distance from the object-side surface of the first lens to the image-side surface of the seventh lens is denoted by InTL. A distance from the first lens to the second lens is denoted by IN12 (instance). A central thickness of the first lens of the optical image capturing module on the optical axis is denoted by TP1 (instance).

The lens parameter related to a material in the lens:

An Abbe number of the first lens in the optical image capturing module is denoted by NA1 (instance). A refractive index of the first lens is denoted by Nd1 (instance).

The lens parameter related to a view angle of the lens:

A view angle is denoted by AF. Half of the view angle is denoted by HAF. A major light angle is denoted by MRA.

The lens parameter related to exit/entrance pupil in the lens:

An entrance pupil diameter of the optical image capturing module is denoted by HEP. For any surface of any lens, a maximum effective half diameter (EHD) is a perpendicular distance between an optical axis and a crossing point on the surface where the incident light with a maximum viewing angle of the optical image capturing module passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on. In the optical image capturing module, a maximum effective diameter of the image-side surface of the lens closest to the image plane is denoted by PhiA, which satisfies the condition: PhiA=2*EHD. If the surface is aspherical, a cut-off point of the largest effective diameter is the cut-off point containing the aspheric surface. An ineffective half diameter (IHD) of any surface of one single lens refers to a surface segment between cut-off points of the maximum effective half diameter of the same surface extending in a direction away from the optical axis, wherein said a cut-off point is an end point of the surface having an aspheric coefficient if said surface is aspheric. In the optical image capturing module, a maximum diameter of the image-side surface of the lens closest to the image plane is denoted by PhiB, which satisfies the condition: PhiB=2*(maximum effective half diameter EHD+maximum ineffective half diameter IHD)= PhiA+2*(maximum ineffective half diameter IHD).

In the optical image capturing module, a maximum effective diameter of the image-side surface of the lens closest to the image plane (i.e., the image space) could be also called optical exit pupil, and is denoted by PhiA. If the optical exit pupil is located on the image-side surface of the third lens, then it is denoted by PhiA3; if the optical exit pupil is located on the image-side surface of the fourth lens, then it is denoted by PhiA4; if the optical exit pupil is located on the image-side surface of the fifth lens, then it is denoted by PhiA5; if the optical exit pupil is located on the image-side surface of the sixth lens, then it is denoted by PhiA6, and so on. A pupil magnification ratio of the optical image capturing module is denoted by PMR, which satisfies the condition: PMR=PhiA/HEP.

The lens parameter related to an arc length of the shape of a surface and a surface profile:

For any surface of any lens, a profile curve length of the maximum effective half diameter is, by definition, measured from a start point where the optical axis of the belonging optical image capturing module passes through the surface of the lens, along a surface profile of the lens, and finally to an end point of the maximum effective half diameter thereof. In other words, the curve length between the aforementioned start and end points is the profile curve length of the maximum effective half diameter, which is denoted by ARS. For example, the profile curve length of the maximum effective half diameter of the object-side surface of the first lens is denoted by ARS11, the profile curve length of the maximum effective half diameter of the image-side surface of the first lens is denoted by ARS12, the profile curve length of the maximum effective half diameter of the object-side surface of the second lens is denoted by ARS21, the profile curve length of the maximum effective half diameter of the image-side surface of the second lens is denoted by ARS22, and so on.

For any surface of any lens, a profile curve length of a half of the entrance pupil diameter (HEP) is, by definition, measured from a start point where the optical axis of the belonging optical image capturing module passes through the surface of the lens, along a surface profile of the lens, and finally to a coordinate point of a perpendicular distance where is a half of the entrance pupil diameter away from the optical axis. In other words, the curve length between the aforementioned stat point and the coordinate point is the profile curve length of a half of the entrance pupil diameter (HEP), and is denoted by ARE. For example, the profile curve length of a half of the entrance pupil diameter (HEP) of the object-side surface of the first lens is denoted by ARE11, the profile curve length of a half of the entrance pupil diameter (HEP) of the image-side surface of the first lens is denoted by ARE12, the profile curve length of a half of the entrance pupil diameter (HEP) of the object-side surface of the second lens is denoted by ARE21, the profile curve length of a half of the entrance pupil diameter (HEP) of the image-side surface of the second lens is denoted by ARE22, and so on.

The lens parameter related to a depth of the lens shape:

A displacement from a point on the object-side surface of the sixth lens, which is passed through by the optical axis, to a point on the optical axis, where a projection of the maximum effective semi diameter of the object-side surface of the sixth lens ends, is denoted by InRS61 (the depth of the maximum effective semi diameter). A displacement from a point on the image-side surface of the sixth lens, which is passed through by the optical axis, to a point on the optical axis, where a projection of the maximum effective semi diameter of the image-side surface of the seventh lens ends, is denoted by InRS62 (the depth of the maximum effective semi diameter). The depth of the maximum effective semi diameter (sinkage) on the object-side surface or the image-side surface of any other lens is denoted in the same manner.

The lens parameter related to the lens shape:

A critical point C is a tangent point on a surface of a specific lens, and the tangent point is tangent to a plane perpendicular to the optical axis and the tangent point cannot be a crossover point on the optical axis. Following the above description, a distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point C61 on the object-side surface of the sixth lens and the optical axis is HVT61 (instance), and a distance perpendicular to the optical axis between a critical point C62 on the image-side surface of the sixth lens and the optical axis is HVT62 (instance). A distance perpendicular to the optical axis between a critical point on the object-side or image-side surface of other lenses is denoted in the same manner.

The object-side surface of the seventh lens has one inflection point IF711 which is nearest to the optical axis, and the sinkage value of the inflection point IF711 is denoted by SGI711 (instance). A distance perpendicular to the optical axis between the inflection point IF711 and the optical axis is HIF711 (instance). The image-side surface of the seventh lens has one inflection point IF721 which is nearest to the optical axis, and the sinkage value of the inflection point IF721 is denoted by SGI721 (instance). A distance perpendicular to the optical axis between the inflection point IF721 and the optical axis is HIF721 (instance).

The object-side surface of the seventh lens has one inflection point IF712 which is the second nearest to the optical axis, and the sinkage value of the inflection point IF712 is denoted by SGI712 (instance). A distance perpendicular to the optical axis between the inflection point IF712 and the optical axis is HIF712 (instance). The image-side surface of the seventh lens has one inflection point IF722 which is the second nearest to the optical axis, and the sinkage value of the inflection point IF722 is denoted by SGI722 (instance). A distance perpendicular to the optical axis between the inflection point IF722 and the optical axis is HIF722 (instance).

The object-side surface of the seventh lens has one inflection point IF713 which is the third nearest to the optical axis, and the sinkage value of the inflection point IF713 is denoted by SGI713 (instance). A distance perpendicular to the optical axis between the inflection point IF713 and the optical axis is HIF713 (instance). The image-side surface of the seventh lens has one inflection point IF723 which is the third nearest to the optical axis, and the sinkage value of the inflection point IF723 is denoted by SGI723 (instance). A distance perpendicular to the optical axis between the inflection point IF723 and the optical axis is HIF723 (instance).

The object-side surface of the seventh lens has one inflection point IF714 which is the fourth nearest to the optical axis, and the sinkage value of the inflection point IF714 is denoted by SGI714 (instance). A distance perpendicular to the optical axis between the inflection point IF714 and the optical axis is HIF714 (instance). The image-side surface of the seventh lens has one inflection point IF724 which is the fourth nearest to the optical axis, and the sinkage value of the inflection point IF724 is denoted by SGI724 (instance). A distance perpendicular to the optical axis between the inflection point IF724 and the optical axis is HIF724 (instance).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing module is denoted by ODT. TV distortion for image formation in the optical image capturing module is denoted by TDT. Further, the range of the aberration offset for the view of image formation may be limited to 50%-100% field. An offset of the spherical aberration is denoted by DFS. An offset of the coma aberration is denoted by DFC.

The length of the contour curve of any surface of a single lens in the range of the maximum effective radius affects the surface correction aberration and the optical path difference between the fields of view. The longer the profile curve length, the better the ability to correct the aberration, but at the same time. It will increase the difficulty in manufacturing, so it is necessary to control the length of the profile curve of any surface of a single lens within the maximum effective radius, in particular to control the profile length (ARS) and the surface within the maximum effective radius of the surface. The proportional relationship (ARS/TP) between the thicknesses (TP) of the lens on the optical axis. For example, the length of the contour curve of the maximum effective radius of the side surface of the first lens object is represented by ARS11, and the thickness of the first lens on the optical axis is TP1, and the ratio between the two is ARS11/TP1, and the maximum effective radius of the side of the first lens image side. The length of the contour curve is represented by ARS12, and the ratio between it and TP1 is ARS12/TP1. The length of the contour curve of the maximum effective radius of the side of the second lens object is represented by ARS21, the thickness of the second lens on the optical axis is TP2, the ratio between the two is ARS21/TP2, and the contour of the maximum effective radius of the side of the second lens image. The length of the curve is represented by ARS22, and the ratio between it and TP2 is ARS22/TP2. The proportional relationship between the length of the profile of the maximum effective radius of any surface of the remaining lenses in the optical imaging system and the thickness (TP) of the lens on the optical axis to which the surface belongs, and so on. The optical image capturing module of the present invention satisfies: $0.9 \leq ARS/EHD \leq 2.0$.

The optical image capturing module has a maximum image height HOI on the image plane vertical to the optical axis. A transverse aberration at 0.7 HOI in the positive direction of the tangential ray fan aberration after the longest operation wavelength passing through the edge of the entrance pupil is denoted by PLTA; a transverse aberration at 0.7 HOI in the positive direction of the tangential ray fan aberration after the shortest operation wavelength passing through the edge of the entrance pupil is denoted by PSTA; a transverse aberration at 0.7 HOI in the negative direction of the tangential ray fan aberration after the longest operation wavelength passing through the edge of the entrance pupil is denoted by NLTA; a transverse aberration at 0.7 HOI in the negative direction of the tangential ray fan aberration after the shortest operation wavelength passing through the edge of the entrance pupil is denoted by NSTA; a transverse aberration at 0.7 HOI of the sagittal ray fan aberration after the longest operation wavelength passing through the edge of the entrance pupil is denoted by SLTA; a transverse aberration at 0.7 HOI of the sagittal ray fan aberration after the shortest operation wavelength passing through the edge of the entrance pupil is denoted by SSTA. The optical image capturing module of the present invention satisfies:

$PLTA \leq 100$ µm; $PSTA \leq 100$ µm; $NLTA \leq 100$ µm; $NSTA \leq 100$ µm; $SLTA \leq 100$ µm; $SSTA \leq 100$ µm; $|TDT| \leq 250\%$; $0.1 \leq InTL/HOS \leq 0.95$; and $0.2 \leq Ins/HOS \leq 1.1$.

For visible light spectrum, the values of MTF in the spatial frequency of 110 cycles/mm at the optical axis, 0.3 field of view, and 0.7 field of view on an image plane are respectively denoted by MTFQ0, MTFQ3, and MTFQ7. The optical image capturing module of the present invention satisfies:

$MTFQ0 \geq 0.2$; $MTFQ3 \geq 0.01$; and $MTFQ7 \geq 0.01$.

For any surface of any lens, the profile curve length within a half of the entrance pupil diameter (HEP) affects the ability of the surface to correct aberration and differences between optical paths of light in different fields of view. With longer profile curve length, the ability to correct aberration is better. However, the difficulty of manufacturing increases as well. Therefore, the profile curve length within a half of the entrance pupil diameter (HEP) of any surface of any lens has to be controlled. The ratio between the profile curve length (ARE) within a half of the entrance pupil diameter (HEP) of one surface and the thickness (TP) of the lens, which the surface belonged to, on the optical axis (i.e., ARE/TP) has to be particularly controlled. For example, the profile curve length of a half of the entrance pupil diameter (HEP) of the object-side surface of the first lens is denoted by ARE11, the thickness of the first lens on the optical axis is TP1, and the ratio between these two parameters is ARE11/TP1; the profile curve length of a half of the entrance pupil diameter (HEP) of the image-side surface of the first lens is denoted by ARE12, and the ratio between ARE12 and TP1 is ARE12/TP1. The profile curve length of a half of the entrance pupil diameter (HEP) of the object-side surface of the second lens is denoted by ARE21, the thickness of the second lens on the optical axis is TP2, and the ratio between these two parameters is ARE21/TP2; the profile curve length of a half of the entrance pupil diameter (HEP) of the image-side surface of the second lens is denoted by ARE22, and the ratio between ARE22 and TP2 is ARE22/TP2. For any surface of other lenses in the optical image capturing system, the ratio between the profile curve length of a half of the entrance pupil diameter (HEP) thereof and the thickness of the lens which the surface belonged to is denoted in the same manner.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A movable carrier auxiliary system of the present invention includes a system design, a structural design, and an optical design, wherein system embodiments will be described first.

Figure 1A:
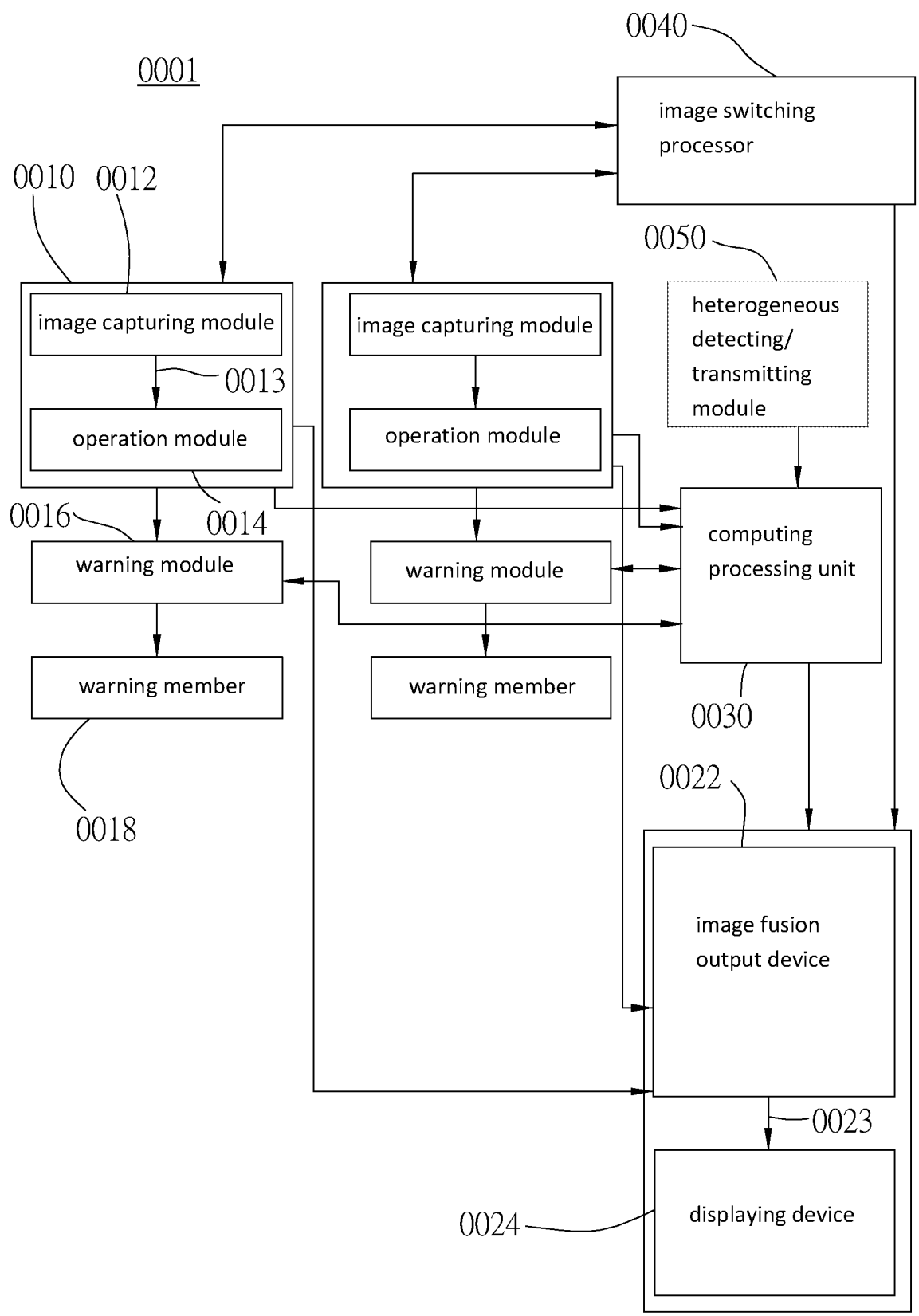
FIG. 1A is a flowchart of a first system embodiment of the present invention.
Figure 1B:
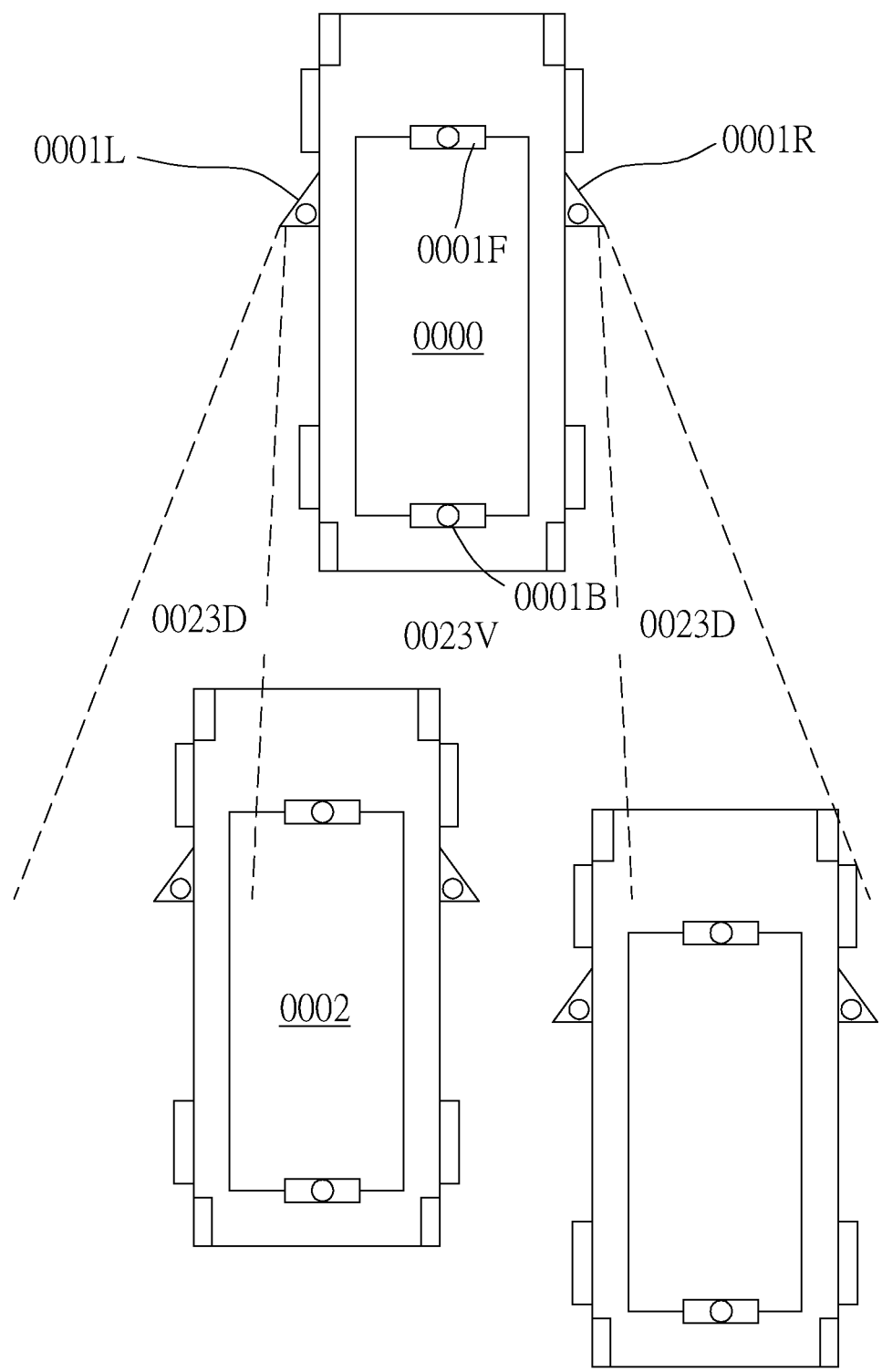
FIG. 1B is a schematic diagram, showing the operation of the first system embodiment of the present invention.

Take FIG. 1A and FIG. 1B as an example to illustrate a schematic diagram of a movable carrier 0000 (e.g. vehicle) according to a first system embodiment of the present invention. In the current system embodiment, a movable carrier auxiliary system 0001 (in order to illustrate easily, the movable carrier auxiliary system is labeled an auxiliary system 0001) includes at least two optical image capturing systems 0010, at least one image fusion output device 0022, and at least one displaying device 0024, wherein the optical image capturing systems 0010 are respectively disposed on a left portion 0001L and a right portion 0001R of the movable carrier 0000. Each of the optical image capturing systems 0010 includes an image capturing module 0012 and an operation module 0014, wherein the image capturing module 0012 captures and produces an environmental image 0013 of the surrounding of the movable carrier 0000. A horizontal angle of view covered by the environmental image 0013 is at least 50 degrees. The operation module 0014 is electrically connected to the image capturing module 0012, and detects at least one moving object 0002 in the environmental image 0013 to generate a detecting signal and at least one tracking mark. The at least one image fusion output device 0022 is disposed inside of the movable carrier 0000 and is electrically connected to the optical image capturing systems 0010, thereby to receive the environmental image 0013 of the optical image capturing systems 0010 to generate a fusion image 0023 with a wide viewing angle, wherein a horizontal angle of view covered by the fusion image 0023 is at least 180 degrees. The at least one displaying device 0024 is electrically connected to the image fusion output device 0022 to display the fusion image 0023 and the at least one tracking mark. The movable carrier auxiliary system 0001 could detect the at least one moving object 0002 in the environmental image 0013 when the movable carrier 0000 moves or is at rest.

The auxiliary system 0001 further includes a warning module 0016 and at least one warning member 0018, wherein the warning module 0016 is electrically connected to the operation module 0014, thereby to obtain a vehicle condition and a distance between the moving object 0002 and the movable carrier 0000 according to an algorithm. When the detecting signal is received to determine that the moving object 0002 approaches the movable carrier 0000, a warning signal 0016W is generated. The warning member 0018 is disposed on the movable carrier 0000 and is electrically connected to the warning module 0016, wherein the warning member 0018 operates when the warning member 0018 receives the warning signal 0016W sent from the warning module 0016. An action of the warning member 0018 includes that the vehicle subsystem seats, the rearview mirrors, the steering wheel, the climate control, the airbags, the telephone, the radio, the on-board computers, and performance control functions that are automatically adjusted according to the driving conditions.

The movable carrier auxiliary system 0000 further includes at least one computing processing unit 0030, at least one image switching processor 0040, and at least one heterogeneous detecting module 0050, wherein the computing processing unit 0030 is electrically connected to the warning module 0016. The image switching processor 0040 outputs the corresponding environmental image 0013 to the displaying device 0024 by switching to one of the optical image capturing systems 0010 disposed at different positions based on different control signals come from the movable carrier 0000. The heterogeneous detecting module 0050 is adapted to send a signal to the surrounding environment of the movable carrier 0000 and receive a feedback signal, and transmit the feedback signal to the computing processing unit 0030, thereby to achieve the detecting performance. The computing processing unit 0030 combines the feedback signals come from the heterogeneous detecting module 0050 via the environmental images 0013, thereby to identify the object in the surrounding environment of the movable carrier 0000 and an instantaneous distance between the object and the movable carrier 0000. The computing processing unit 0030 stores at least one predetermined safe distance and compares values between the predetermined safe distance and the instantaneous distance, wherein when the instantaneous distance is smaller than the predetermined safe distance, the computing processing unit 0030 controls the warning module 0016 to generate a warning signal to display on the displaying device 0024.

The heterogeneous detecting module 0050 could be selected from an ultrasonic transmitting/receiving module, a millimeter wave radar transmitting/receiving module, a lidar transmitting/receiving module, an infrared light transmitting/receiving module, and a laser transmitting/receiving module.

The displaying device 0024 could be disposed inside, outside, or both inside and outside of the movable carrier 0000. In the current embodiment, the displaying device 0024 is a vehicle electronic rear-view mirror which includes a left side mirror and a right side mirror.

As shown in FIG. 1A and FIG. 1B, in the current system embodiment, the left portion 0001L and the right portion 0001R of the movable carrier 0000 are respectively located on a left rear-view mirror, and a right rear-view mirror of the movable carrier 0000. However, this is not a limitation of the present invention. In other embodiments, the left portion and the right portion of the movable carrier 0000 could be located at any position on the left/right side of the movable carrier 0000. For instance, a front portion 0001F is located around a head of the movable carrier 0000, near a front windshield inside of the movable carrier 0000, or on a front bumper. For instance, a rear portion 0001B is located around a trunk of the movable carrier 0000 or on a rear bumper.

In the current system embodiment, the optical image capturing system 0010 is disposed around an outside of the movable carrier 0000. The environmental image 0013 generated by the image capturing module 0012 contains a visible area 0023V contained by the rear-view mirrors and a blind area (blind vision) 0023D which is invisible in the conventional rear-view mirrors, thereby to display the fusion image 0023 spliced by a plurality of environmental images 0013 on the image fusion output device 0022, providing drivers with more complete road information. In the current system embodiment, the image capturing module 0012 is a wide dynamic range fisheye video camera (WDR fisheye video camera).

In the current system embodiment, the displaying device 0024 is an electronic rear-view mirror (e.g. digital rear-view mirror), wherein the electronic rear-view mirror is adapted to display the fusion image 0023 and the tracking mark, and is disposed inside of the movable carrier 0000 to be used as an inside rear-view mirror. The electronic rear-view mirror could be switched to display its own reflected light image (i.e., used as a general mirror), or to display the fusion image 0023 and the tracking mark. In addition, the displaying device 0024 could be disposed on a screen (not shown) inside of the movable carrier 0000 to display fusion image 0023 and the tracking mark for the driver to inspect.

Referring to FIG. 1A and FIG. 1B, each of the optical image capturing systems 0010 disposed around the movable carrier 0000 (i.e., on the left portion 0001L, on the right portion 0001R, and on the rear portion 0001B) obtains the corresponding environmental image 0013 via its image capturing module 0012. After that, the environmental images 0013 captured by the image capturing modules 0012 are transmitted to the image fusion output device 0022 to splice the environmental images 0013, thereby to generate the fusion image 0023 spliced by the environmental images 0013. Then, the fusion image 0023 is transmitted to the displaying device 0024 (e.g. the electronic rear-view mirror) to display, wherein a horizontal angle of view covered by the fusion image 0023 is at least 120 degrees. In this way, the driver only needs to change a single sight and watches the displaying device 0024 to obtain a complete information about the left rear-view mirror, the right rear-view mirror, the visible area 0023V, and the blind area 0023D, effectively improving the driving safety of vehicles.

Figure 1C:
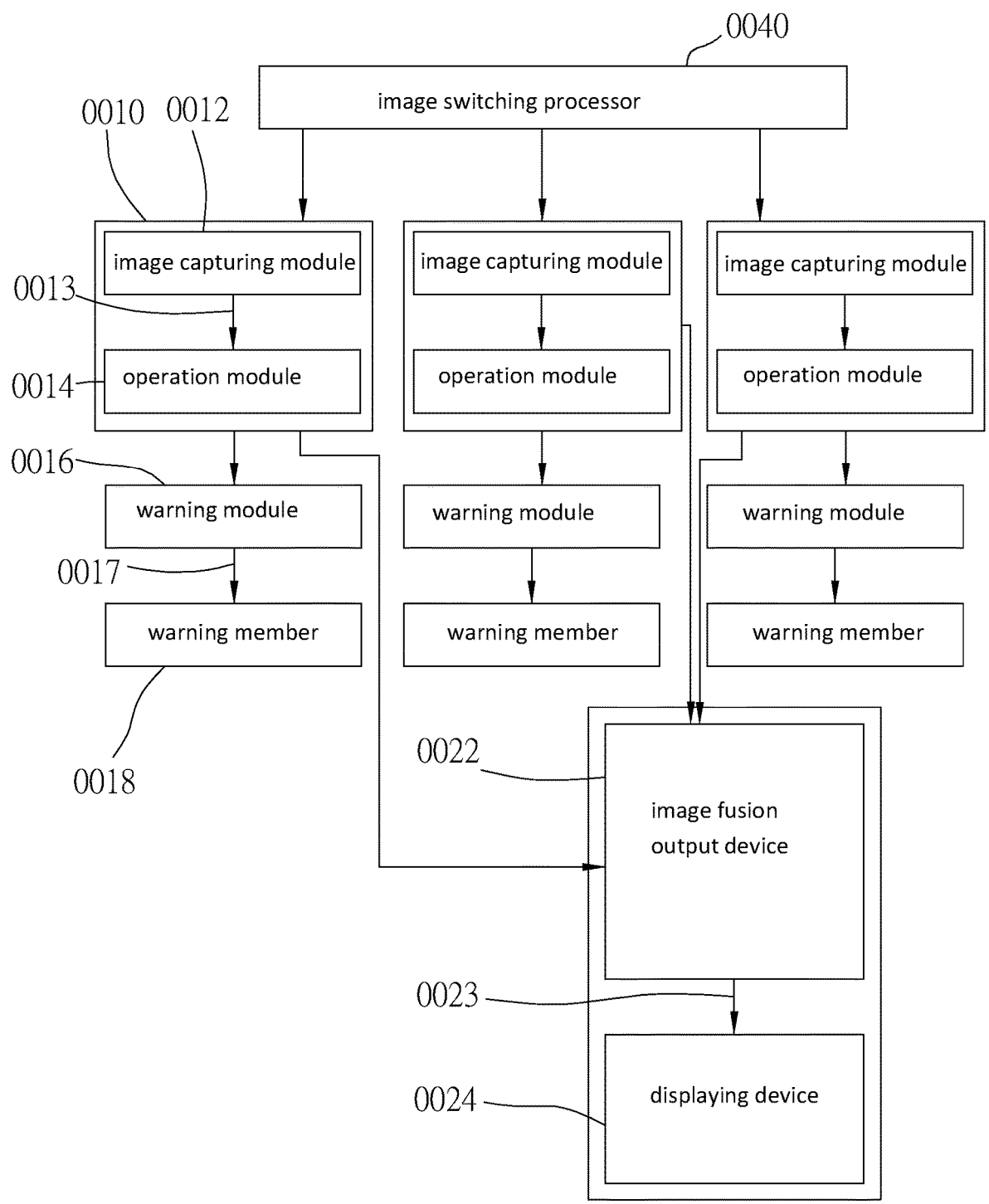
FIG. 1C is a flowchart of a second system embodiment of the present invention.

Take FIG. 1C as an example to illustrate a schematic diagram according to a second system embodiment of the present invention, wherein the difference between the first system embodiment and the second system embodiment is that the movable carrier auxiliary system 0001 according to the second system embodiment includes three optical image capturing systems 0010 respectively disposed on the left portion 0001L, the right portion 0001R, and the rear portion 0001B of the movable carrier 0000 to capture the left, the right, and the rear environmental images. In addition, the fusion image 0023 spliced by the environmental images 0013 with a wide viewing angle is displayed in a top view, wherein a horizontal angle of view covered by the fusion image 0023 is at least 180 degrees.

Figure 1D:
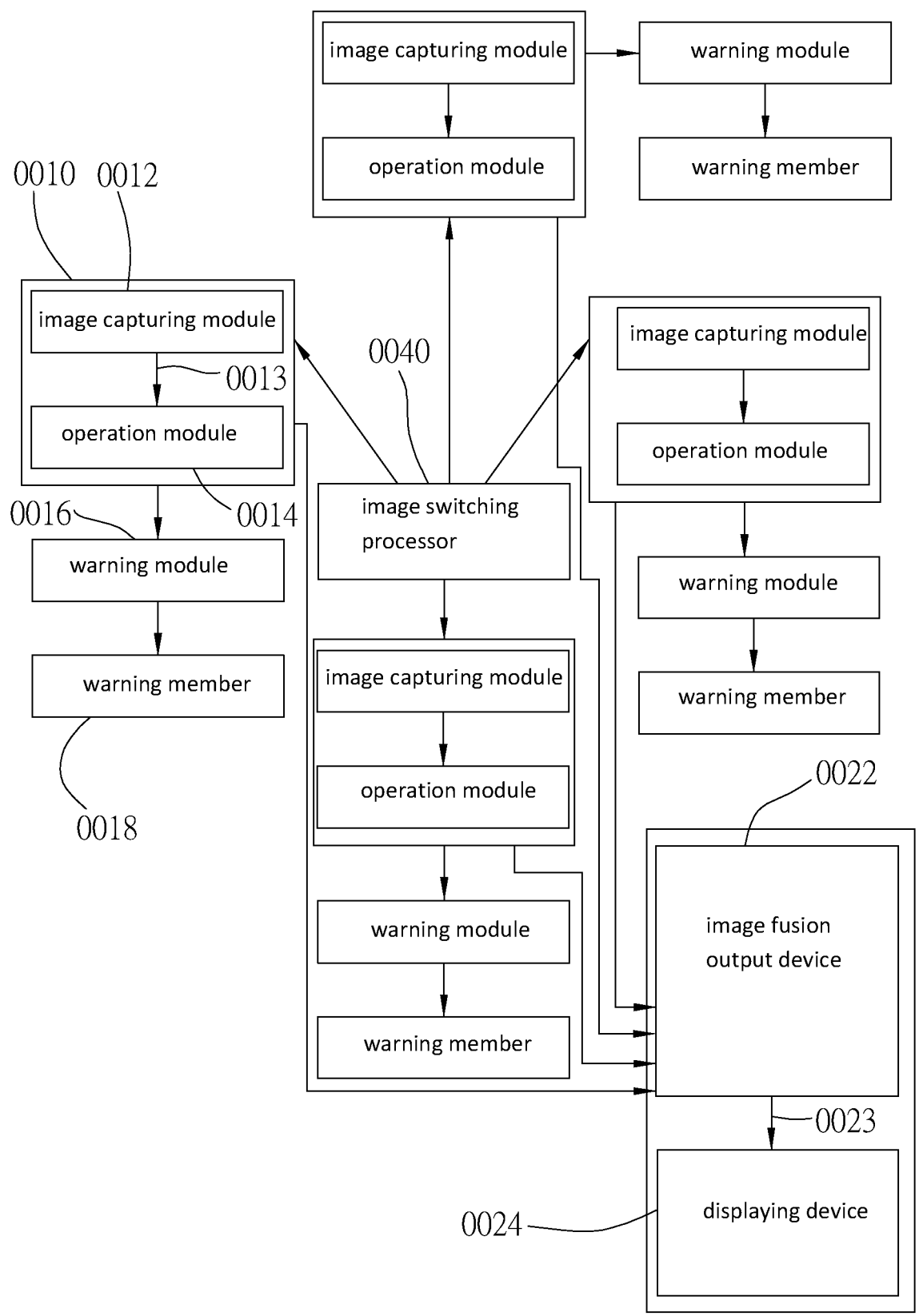
FIG. 1D is a flowchart of a third system embodiment of the present invention.

Take FIG. 1D as an example to illustrate a schematic diagram according to a third system embodiment of the present invention, wherein the difference between the first system embodiment and the third system embodiment is that the movable carrier auxiliary system 0001 includes four optical image capturing systems 0010 respectively disposed on the left portion 0001L, the right portion 0001R, the front portion 0001F, and the rear portion 0001B of the movable carrier 0000 to capture the left, the right, the front, and the rear environmental images. In addition, the fusion image 0023 spliced by the environmental images 0013 with a wide viewing angle is displayed in a top view, wherein a horizontal angle of view covered by the fusion image 0023 is 360 degrees.

The movable carrier auxiliary system further includes a plurality of light emitting members (not shown) which are a left direction light and a right direction light of the movable carrier 0000 as an example, wherein the direction lights could be disposed around a headlamp or a rear brake light of the movable carrier 0000. In other embodiments, the direction lights could be disposed at any side of the movable carrier 0000. The light emitting members are electrically connected to the optical image capturing systems 0010, and an operation of the light emitting members drives the warning module 0016 of the optical image capturing system 0010 on the left portion 0001L or the right portion 0001R to operate.

More specifically, when the driver switches on one of the light emitting members (e.g. the right indicator), the optical image capturing system 0010 on the right portion 0001R is driven to operate. At this time, the road environment located on right side of the movable carrier 0000 could be detected by the operation module 0014 to detect an instant condition of the moving object 0002 according to a motion detection algorithm to generate the detecting signal and at least one tracking mark as illustrated in FIG. 1D. When the operation module 0014 determines that there is a moving object 0002 within the environmental image 0013, a movement condition of the moving object 0002 within the environmental image 0013 is detected via the motion detection algorithm, thereby to generate the detecting signal and the tracking mark, wherein the tracking mark tracks the movement condition of the moving object 0002 within the environmental image 0013 by marking the moving object 0002 in a framed manner, and shifts corresponding to the movement of the moving object 0002, which facilitates the driver to recognize a static object and a moving object within the environmental image 0013. The action when the driver switches on the left indicator is the same as that of the right indicator, thus we are not going to describe in details herein.

The warning module 0016 receives the detecting signal and determines whether a distance between the moving object 0002 and the movable carrier 0000 has reached a warning standard preset value according to a warning logical algorithm. If the distance between the moving object 0002 and the movable carrier 0000 has reached the warning standard preset value, the warning module 0016 sends the warning signal 0016W to the warning member 0018 to issue a warning effect for the driver to respond (i.e., to remind the driver of the road condition information). When the driver wants to operate the movable carrier 0000 to reverse or change lanes, and the light emitting member is activated as the precondition, the optical image capturing system 0010 on the left portion 0001L or the right portion 0001R operates accordingly. The optical image capturing system 0010 detects the moving object 0002 according to the motion detection algorithm and the warning logical algorithm.

In addition, the way that the warning module 0016 determines according to the warning logical algorithm could be that when the moving object 0002 moves into the visible area 0023V covered by the environmental image 0013, the warning module 0016 generates and sends the warning signal 0016W to the warning member 0018, while when the moving object 0002 is located within the blind area, the warning signal 0016W would not be generated. Alternatively, when the moving object 0002 enters an area covered by the environmental image 0013 and covers more than half of the blind area, the warning module 0016 generates and sends the warning signal 0016W to the warning member 0018. Alternatively, when the moving object 0002 enters the area covered by the environmental image 0013, the warning module 0016 generates and sends the warning signal 0016W to the warning member 0018. A parameter of the warning logical algorithm set by the warning module 0016 could be determined in advance when producing the movable carrier auxiliary system 0001 of the present invention, thereby to determine a judging standard of generating the warning signal 0016W (i.e., generating the warning signal 0016W by determining when the distance between the moving object 0002 and the movable carrier 0000 is less than or equal to a certain distance).

The warning member 0018 could be at least one selected from the group of a warning light and a sounding device, wherein "at least one of the warning light and the sounding device" should be understood to mean "only the warning light, only the sounding device, or both the warning light and the sounding device.". For instance, the warning member 0018 could be a buzzer or a light emitting diode (LED) and could be respectively disposed on the left/right side of the movable carrier 0000 (e.g. an inner or outer area near the driver seat such as a front pillar, a left/right rear-view mirror, a fascia, a front windshield), so as to operate corresponding to the detecting result of the left rear, right rear or/and rear of the movable carrier 0000.

Figure 1E:
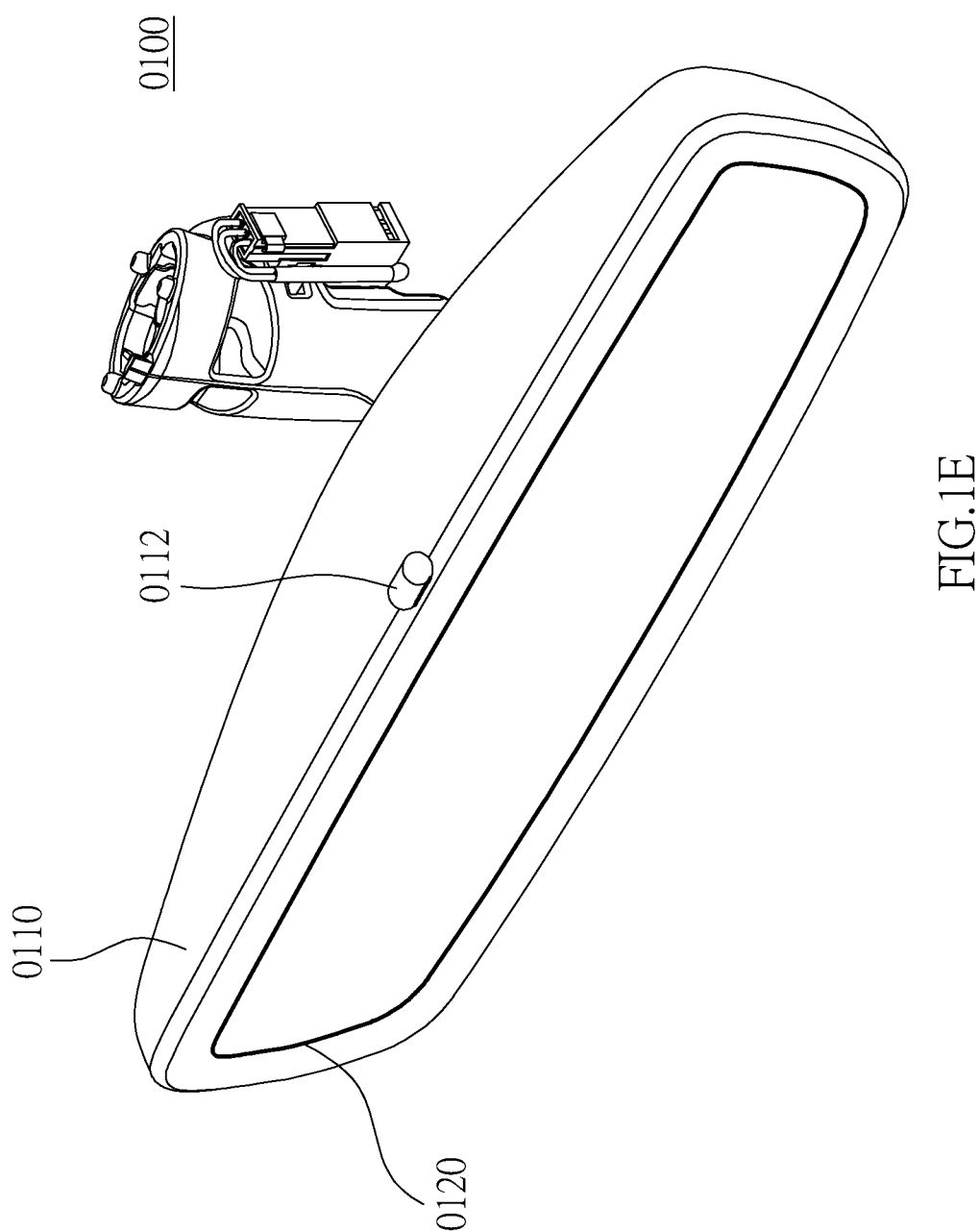
FIG. 1E is a schematic diagram of a first structural embodiment of the present invention.
Figure 1F:
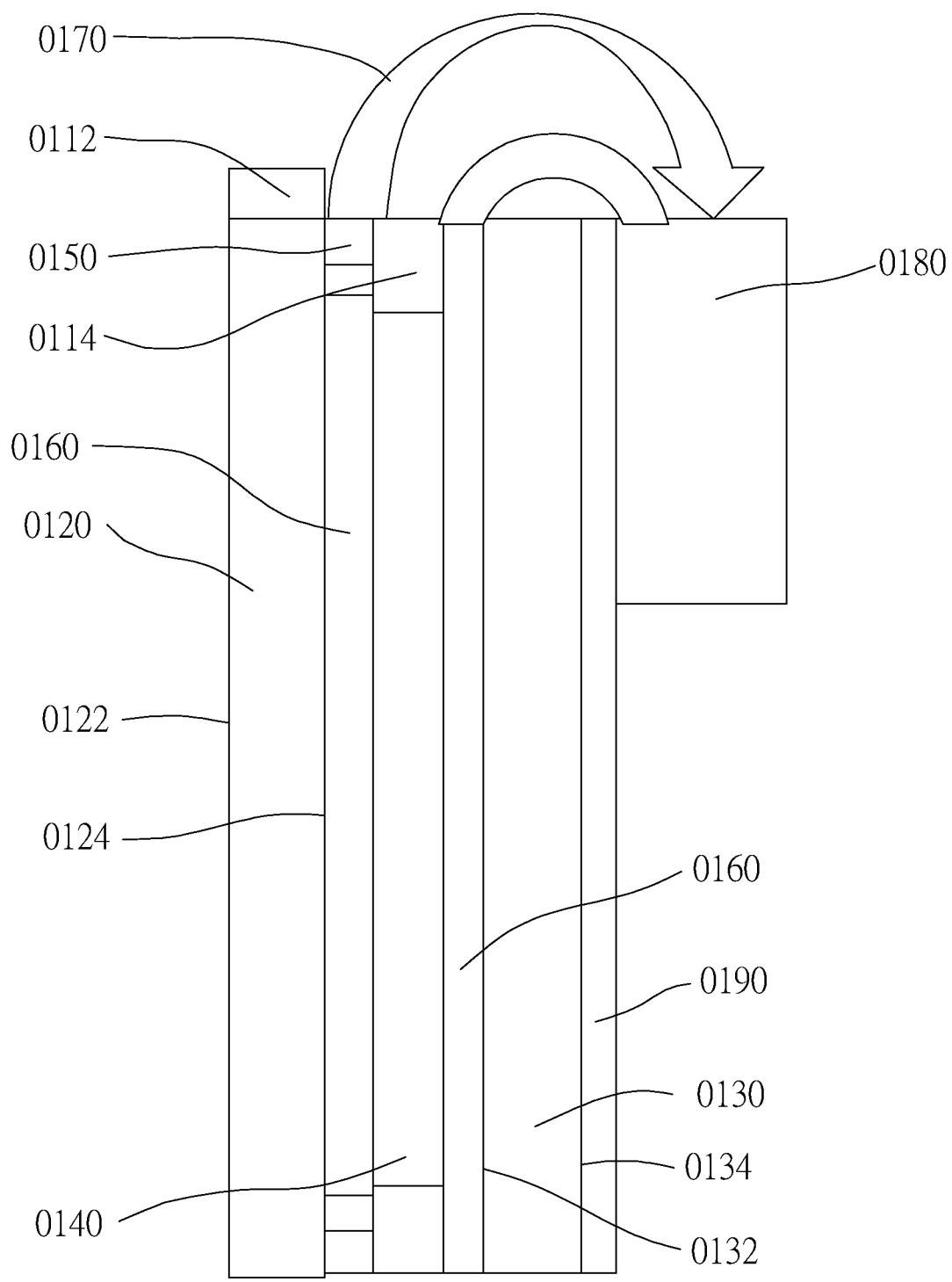
FIG. 1F is a sectional view, showing the short side of the first structural embodiment of the present invention.

A displaying device 0024 which is a vehicle electronic rear-view mirror 0100 as an example according to a first structural embodiment of the present invention is illustrated in FIG. 1E. FIG. 1F is a sectional schematic view of FIG. 1E seen from a right shorter lateral side. The vehicle electronic rear-view mirror 0100 could be disposed on a transport which is a vehicle as an example to assist in the driving of the vehicle or to provide information about driving. More specifically, the vehicle electronic rear-view mirror 0100 could be an inner rear-view mirror disposed inside of the vehicle or could be an outer rear-view mirror disposed outside of the vehicle, which are used to assist the driver in understanding the location of other vehicles. However, this is not a limitation of the present invention. In addition, the transport is not limited to be vehicle, but could be other types of vehicles, such as land, water, air transport, and etc.

The vehicle electronic rear-view mirror 0100 is assembled in a casing 0110, wherein the casing 0110 has an opening (not shown). More specifically, the opening of the casing 0110 overlaps with a reflective layer 0190 of the vehicle electronic rear-view mirror 0100 (shown in FIG. 1F). In this way, an external light could be transmitted to the reflective layer 0190 located inside of the casing 0110 through the opening, so that the vehicle electronic rear-view mirror 0100 functions as a mirror. When the driver drives the vehicle and faces the opening for example, the driver could see the external light reflected by the vehicle electronic rear-view mirror 0100, thereby knowing the position of the rear vehicle.

Referring to FIG. 1F, the vehicle electronic rear-view mirror 0100 includes a first transparent assembly 0120 and a second transparent assembly 0130, wherein the first transparent assembly 0120 faces the driver, and the second transparent assembly 0130 is disposed on a side away from the driver. More specifically, the first transparent assembly 0120 and the second transparent assembly 0130 are translucent substrates, wherein a material of the translucent substrates could be glass for example. However, the material of the translucent substrates is not a limitation of the present invention. In other embodiments, the material of the translucent substrates could be plastic, quartz, PET substrate, or other applicable materials, wherein the PET substrate has the advantages of low cost, easy manufacture, and extremely thinness, in addition to packaging and protection effects.

In the current structural embodiment, the first transparent assembly 0120 includes a first incidence surface 0122 and a first exit surface 0124, wherein an incoming light image from the rear of the driver enters the first transparent assembly 0120 via the first incidence surface 0122, and is emitted via the first exit surface 0124. The second transparent assembly 0130 includes a second incidence surface 0132 and a second exit surface 0134, wherein the second incidence surface 0132 faces the first exit surface 0124, and a gap is formed between the second incidence surface 0132 and the first exit surface 0124 by an adhesive 0114. After the incoming light image being emitted via the first exit surface 0124, the incoming light image enters the second transparent assembly 0130 via the second incidence surface 0132, and is emitted via the second exit surface 0134.

An electro-optic medium layer 0140 is disposed in the gap between the first exit surface 0124 of the first transparent assembly 0120 and the second incidence surface 0132 of the second transparent assembly 0130. At least one transparent electrode 0150 is disposed between the first transparent assembly 0120 and the electro-optic medium layer 0140. The electro-optic medium layer 0140 is disposed between the first transparent assembly 0120 and at least one reflective layer 0190. A transparent conductive layer 0160 is disposed between the first transparent assembly 0120 and the electro-optic medium layer 0140. Another transparent conductive layer 0160 is disposed between the second transparent assembly 0130 and the electro-optic medium layer 0140. An electrical connector 0170 is electrically connected to the transparent conductive layer 0160, and another electrical connector 0170 is electrically connected to the transparent electrode 0150, thereby to transmit electrical energy to the electro-optic medium layer 0140 to change a transparency of the electro-optic medium layer 0140. When a brightness of the incoming light image exceeds a certain brightness (e.g. a strong headlight from the rear of the vehicle), an image sensing device which is a glare sensor 0112 as an example electrically connected to a control member 0180 receives the light energy and convert it into a signal, and the control member 0180 determines whether the brightness of the incoming light image exceeds a predetermined brightness, and if a glare is generated, the electrical energy is provided to the electro-optic medium layer 0140 by the electrical connector 0170 to generate an anti-glare performance. If the external light image is too strong, it will cause glare effect and affect the driver's eyes, thus endangering driving safety. In an embodiment, the electrical connector could include at least one of a flexible circuit board, a copper foil, and an electric wire.

In addition, the transparent electrode 0150 and the reflective layer 0190 could respectively cover entire surface of the first transparent assembly 0120 and entire surface of the second transparent assembly 0130. However, this is not a limitation of the present invention. In the current structural embodiment, a material of the transparent electrode 0150 could be selected from metal oxides such as indium tin oxide, indium zinc oxide, aluminum tin oxide, aluminum zinc oxide, indium antimony zinc oxide, other suitable oxides, or a stacked layer of at least two of the foregoing oxides. Moreover, a material of the reflective layer 0190 could be a material which is conductive and is selected from a group consisting of at least one of silver (Ag), copper (Cu), aluminum (Al), titanium (Ti), molybdenum (Mo) or its alloy. However, the material of the transparent electrode 0150 and the material of the reflective layer 0190 are not a limitation of the present invention. In other embodiments, the material of the transparent electrode 0150 and the material of the reflective layer 0190 could be other types of materials.

The electro-optic medium layer 0140 could be made of an organic material or an inorganic material. However, this is not a limitation of the present invention. In the current structural embodiment, the electro-optic medium layer 0140 could be an electrochromic material. The electro-optic medium layer 0140 is disposed between the first transparent assembly 0120 and the second transparent assembly 0130 and is disposed between the first transparent assembly 0120 and the reflective layer 0190. More specifically, the transparent electrode 0150 is disposed between the first transparent assembly 0120 and the electro-optic medium layer 0140 (i.e., electrochromic material layer). In a structural embodiment, the reflective layer 0190 could be disposed between the second transparent assembly 0130 and the electro-optic medium layer 0140. In other embodiments, the electro-optic medium layer could be a polymer dispersed liquid crystal (PDLC) layer or a suspended particle device (SPD) layer. In addition, in the current structural embodiment, the vehicle electronic rear-view mirror 0100 further includes an adhesive 0114 located between the first transparent assembly 0120 and the second transparent assembly 0130 and surrounding the electro-optic medium layer 0140. The electro-optic medium layer 0140 is co-packaged by the adhesive 0114, the first transparent assembly 0120, and the second transparent assembly 0130.

In the current structural embodiment, the transparent conductive layer 0160 is disposed between the electro-optic medium layer 0140 and the reflective layer 0190. More specifically, the transparent conductive layer 0160 could be used as an anti-oxidation layer of reflective layer 0190, so that the electro-optic medium layer 0140 could be prevented from being in contact with the reflective layer 0190, thereby preventing the reflective layer 0190 being corroded by organic materials, providing the vehicle electronic rear-view mirror 0100 of the current structural embodiment a longer service life. In addition, the electro-optic medium layer 0140 is co-packaged by the adhesive 0114, the transparent electrode 0150, and the transparent conductive layer 0160. In the current structural embodiment, the transparent conductive layer 0160 contains at least one material selected from a group consisting of indium tin oxide (ITO), indium zinc oxide (IZO), Al-doped ZnO (AZO), or Fluorine-doped tin oxide.

In the current structural embodiment, the vehicle electronic rear-view mirror 0100 could optionally provide with the electrical connector 0170. For instance, in an structural embodiment, a conducting wire or a conducting structural is electrically connected to the transparent electrode 0150 and the reflective layer 0190, so that the transparent electrode 0150 and the reflective layer 0190 could be electrically connected to the at least one control member 0180, which provides a driving signal, via the conducting wire or the conducting structural, thereby to drive the electro-optic medium layer 0140.

When the electro-optic medium layer 0140 is enabled, the electro-optic medium layer 0140 would undergo an electrochemical redox reaction and change its energy level to be in a diming state. When an external light passes through the opening of the casing 0110 and reaches the electro-optic medium layer 0140, the external light would be absorbed by the electro-optic medium layer 0140 which is in the diming state, so that the vehicle electronic rear-view mirror 0100 is switched to an anti-glare mode. On the other hand, when the electro-optic medium layer 0140 is disenabled, the electro-optic medium layer 0140 is transparent. At this time, the external light passing through the opening of the casing 0110 passes through the electro-optic medium layer 0140 to be reflected by the reflective layer 0190, so that the vehicle electronic rear-view mirror 0100 is switched to a mirror mode.

More specifically, the first transparent assembly 0120 has the first incidence surface 0122 which is away from the second transparent assembly 0130. For instance, an external light from the rear vehicles enters the vehicle electronic rear-view mirror 0100 via the first incidence surface 0122, and the vehicle electronic rear-view mirror 0100 reflects the external light, so that the external light leaves the vehicle electronic rear-view mirror 0100 via the first incidence surface 0122. In addition, eyes of the vehicle driver could receive the external light reflected by the vehicle electronic rear-view mirror 0100 to know the position of other vehicles behind. Moreover, the reflective layer 0190 could have the optical properties of partial penetration and partial reflection by selecting a suitable material and design a proper film thickness.

Figure 1G:
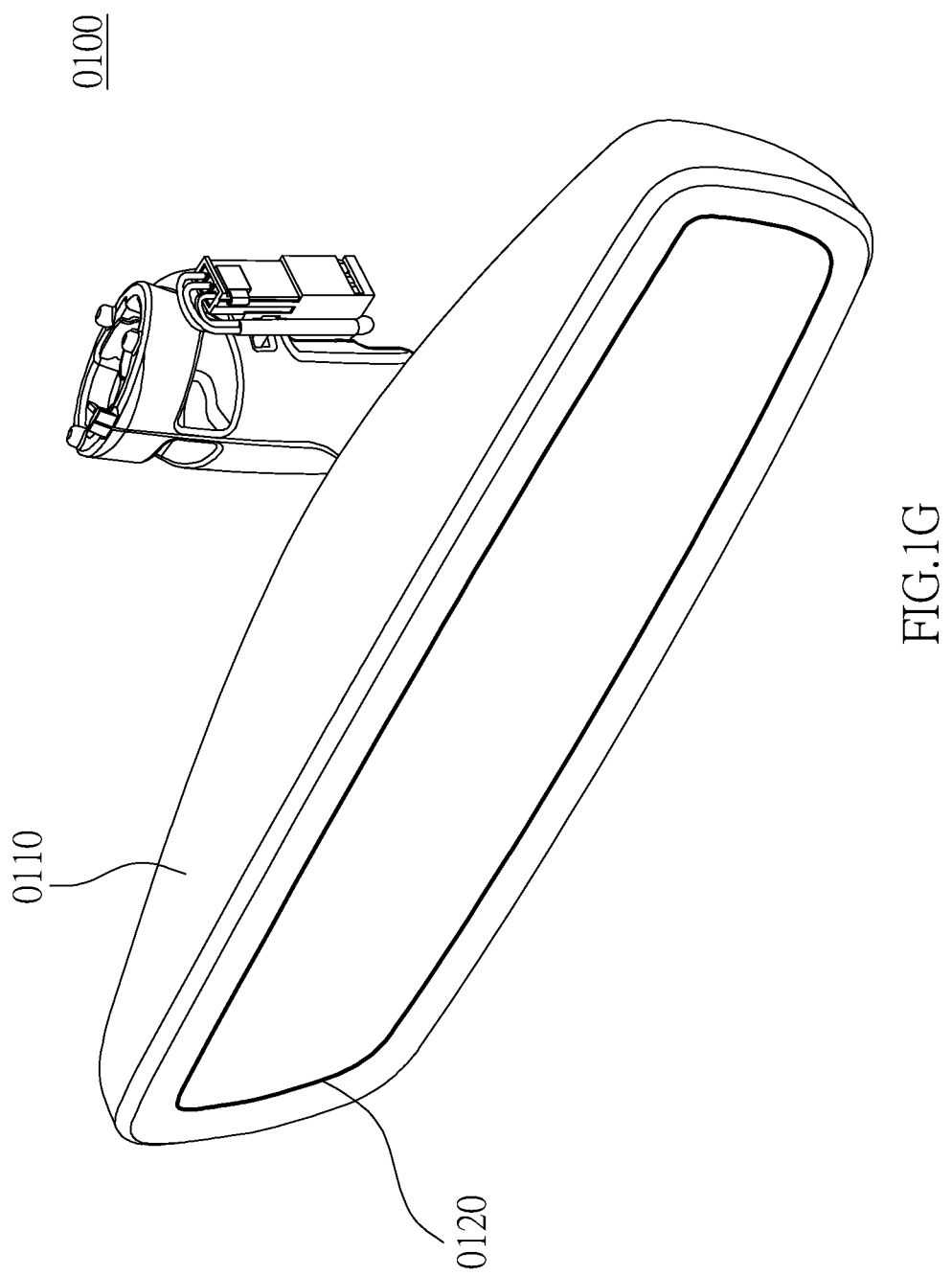
FIG. 1G is a schematic diagram of a second structural embodiment of the present invention.
Figure 1H:
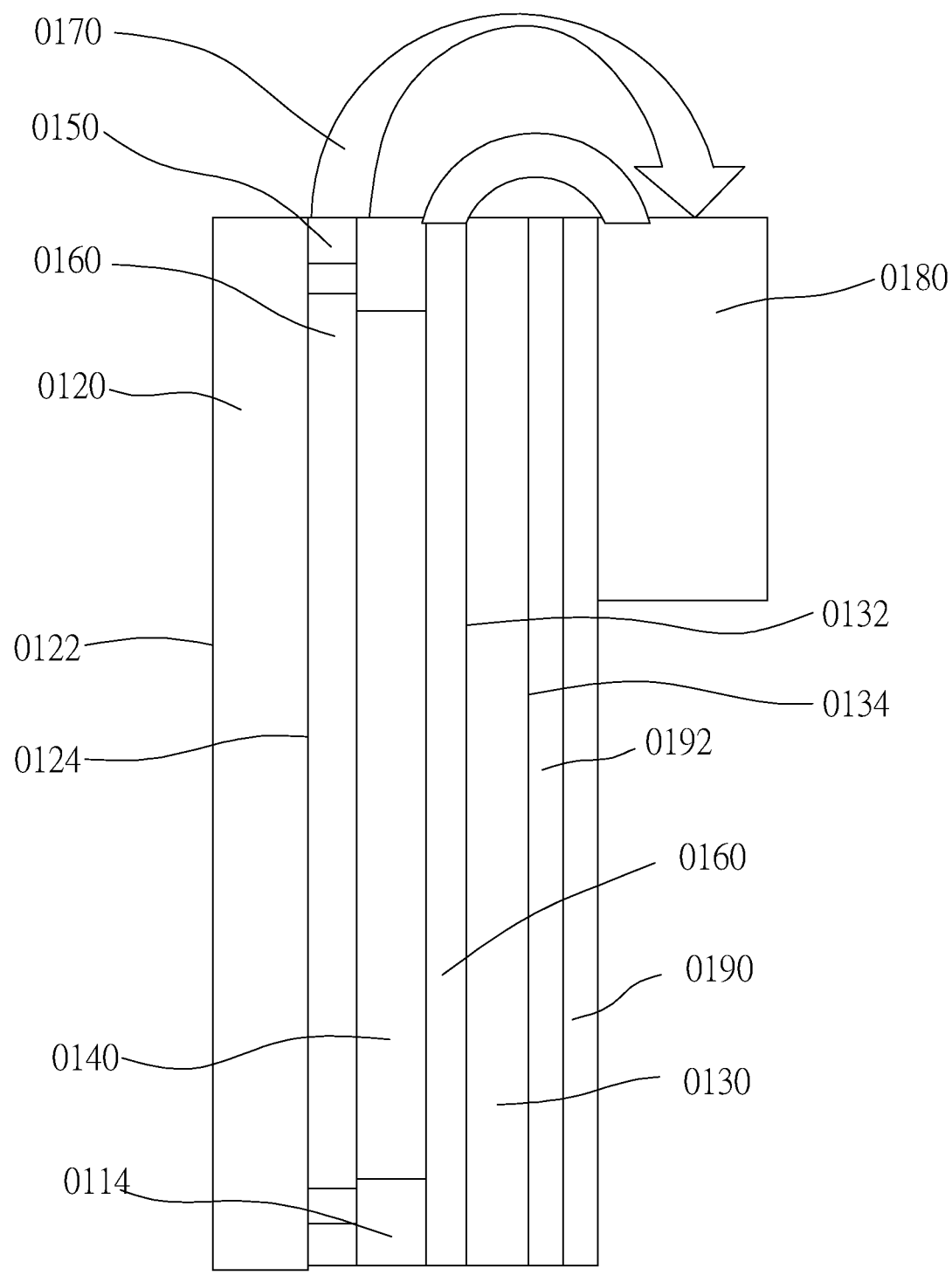
FIG. 1H is a sectional view, showing the short side of the second structural embodiment of the present invention.

A displaying device 0024 which is a vehicle electronic rear-view mirror 0100 as an example according to a second structural embodiment of the present invention is illustrated in FIG. 1G. FIG. 1H is a sectional schematic view of FIG. 1G seen from a right shorter lateral side. The difference between the first structural embodiment and the second structural embodiment is that the vehicle electronic rear-view mirror 0100 according to the second structural embodiment could optionally include an auxiliary reflective layer 0192 disposed between the reflective layer 0190 and the first transparent assembly 0120. In an embodiment, the auxiliary reflective layer 0192 could be disposed between the transparent conductive layer 0160 and the second transparent assembly 0130. More specifically, the auxiliary reflective layer 0192 is disposed between the reflective layer 0190 and the second transparent assembly 0130, and is adapted to assist in adjusting an optical penetration reflection property of the entire vehicle electronic rear-view mirror 0100. For example, an external light enters the vehicle electronic rear-view mirror 0100 via the first incidence surface 0122, and the vehicle electronic rear-view mirror 0100 reflects the external light, so that the external light leaves the vehicle electronic rear-view mirror 0100 via the first incidence surface 0122. In the current structural embodiment, in order to provide the driver an image light with sufficient brightness, a reflectance of the vehicle electronic rear-view mirror 0100 for reflecting the external light could be more than 35%, and a penetration rate of the vehicle electronic rear-view mirror 0100 for the image light could be, for example, greater than 15%. In addition, the auxiliary reflective layer 0192 could also be used as an adhesive layer between the reflective layer 0190 and the second transparent assembly 0130, which could facilitate the reflective layer 0190 to be attached to the second transparent assembly 0130. In the current structural embodiment, the auxiliary reflective layer 0192 includes at least one material selected from a group consisting of chromium (Cr), titanium, and molybdenum, or an alloy thereof, or could also include other types of materials, thereby to adjust the optical penetration reflection property of the entire vehicle electronic rear-view mirror 0100. For instance, the material of the auxiliary reflective layer 0192 could be selected from a group consisting of at least one of chromium, titanium, aluminum, molybdenum, and silver, or an alloy thereof, or could include cerium oxide or a transparent conductive material. Moreover, the material of the auxiliary reflective layer 0192 could be indium tin oxide or other metal oxides. However, the material of the auxiliary reflective layer is not limited by the materials as exemplified above.

Figure 1I:
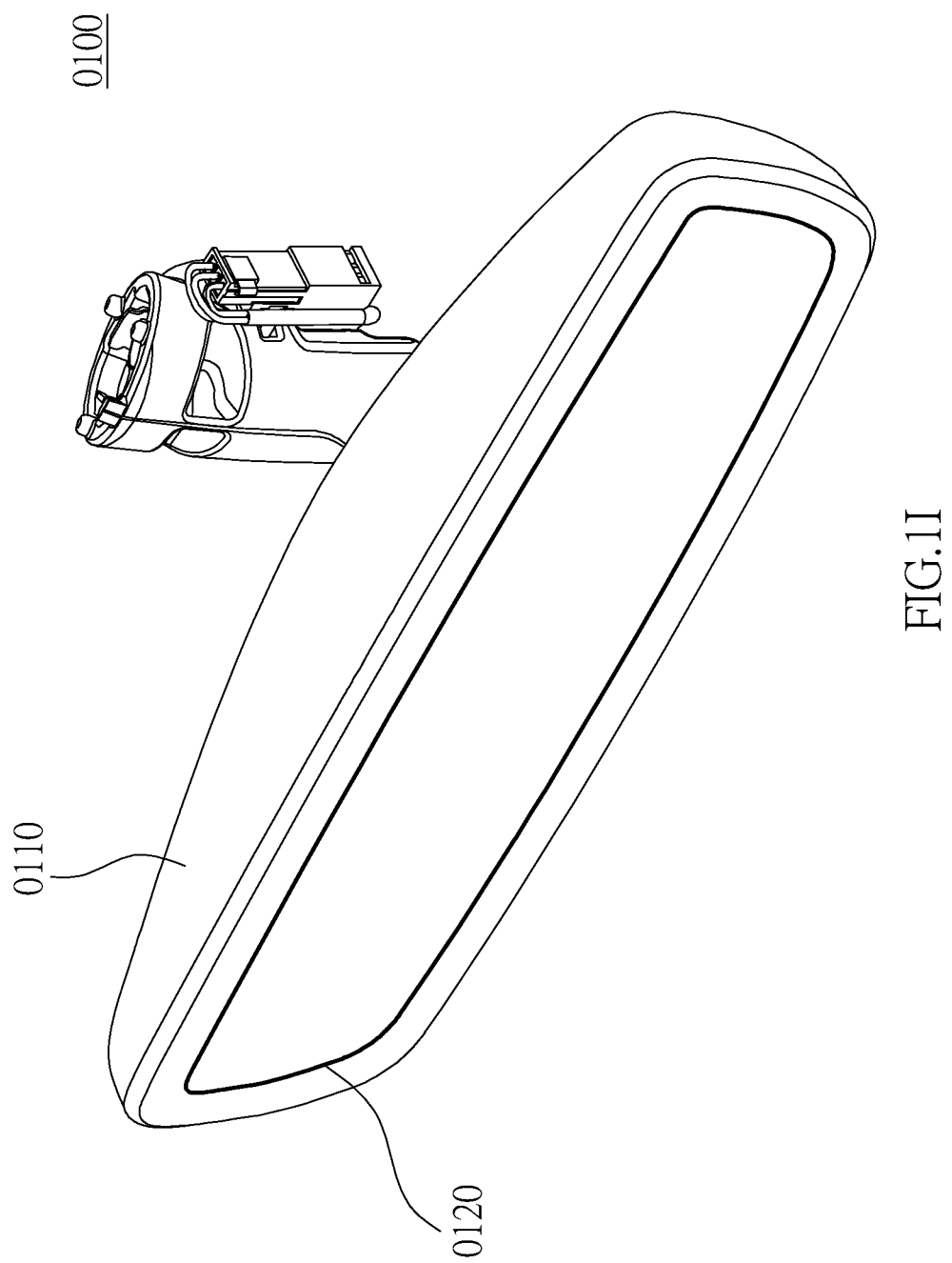
FIG. 1I is a schematic diagram of a third structural embodiment of the present invention.
Figure 1J:
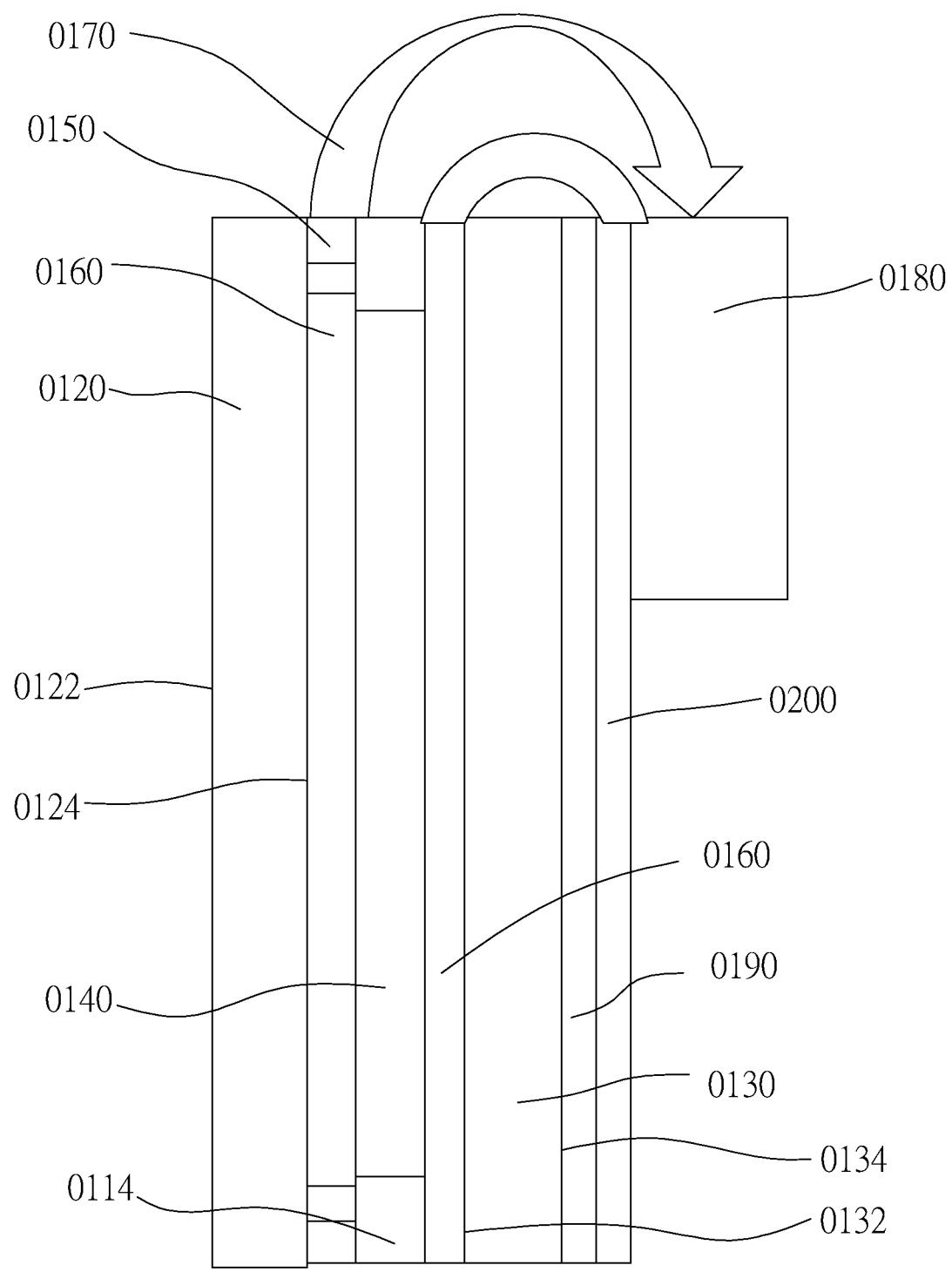
FIG. 1J is a sectional view, showing the short side of the third structural embodiment of the present invention.

A displaying device 0024 which is a vehicle electronic rear-view mirror 0100 as an example according to a third structural embodiment of the present invention is illustrated in FIG. 1I. FIG. 1J is a sectional schematic view of FIG. 1I seen from a right shorter lateral side. The difference between the first structural embodiment and the third structural embodiment is that the vehicle electronic rear-view mirror 0100 according to the third structural embodiment includes at least one monitor 0200 disposed on a side of the second transparent assembly 0130 away from the first transparent assembly 0120. For instance, in a structural embodiment, the at least one monitor 0200 is disposed on the second exit surface 0134 of the second transparent assembly 0130 away from the first transparent assembly 0120. In addition, the monitor 0200 is adapted to emit an image light, wherein the image light passes through the vehicle electronic rear-view mirror 0100 and leaves the vehicle electronic rear-view mirror 0100 via the first incidence surface 0122. Since the reflective layer 0190 has the optical properties of partial penetration and partial reflection, an image light emitted by the monitor 0200 could pass through the reflective layer 0190, allowing the user to see an internal image displayed by the monitor 0200. In the current structural embodiment, a size and an outer contour of the monitor 0200 are approximately the same as the first transparent assembly 0120 (i.e., a full screen). In addition, the monitor 0200 could be a streaming media for providing a driving information or a road condition information to the driver, that is, all visible areas of the vehicle electronic rear-view mirror 0100 according to the current structural embodiment could simultaneously provide the external light from other vehicles behind and the image light from the monitor 0200 to the driver, thereby to achieve a good driving assistance performance. Moreover, the size and the outer contour of the monitor 0200 could be designed to be smaller than the first transparent assembly 0120 to meet specific requirements, so that only a specific visible area on first transparent assembly 0120 could observe the image light from the monitor 0200. In the current structural embodiment, the monitor 0200 could be a liquid crystal display (LCD) for example, or could be other types of monitor such as organic light-emitting diode (OLED) monitor. However, the monitor is not a limitation of the present invention.

Figure 1K:
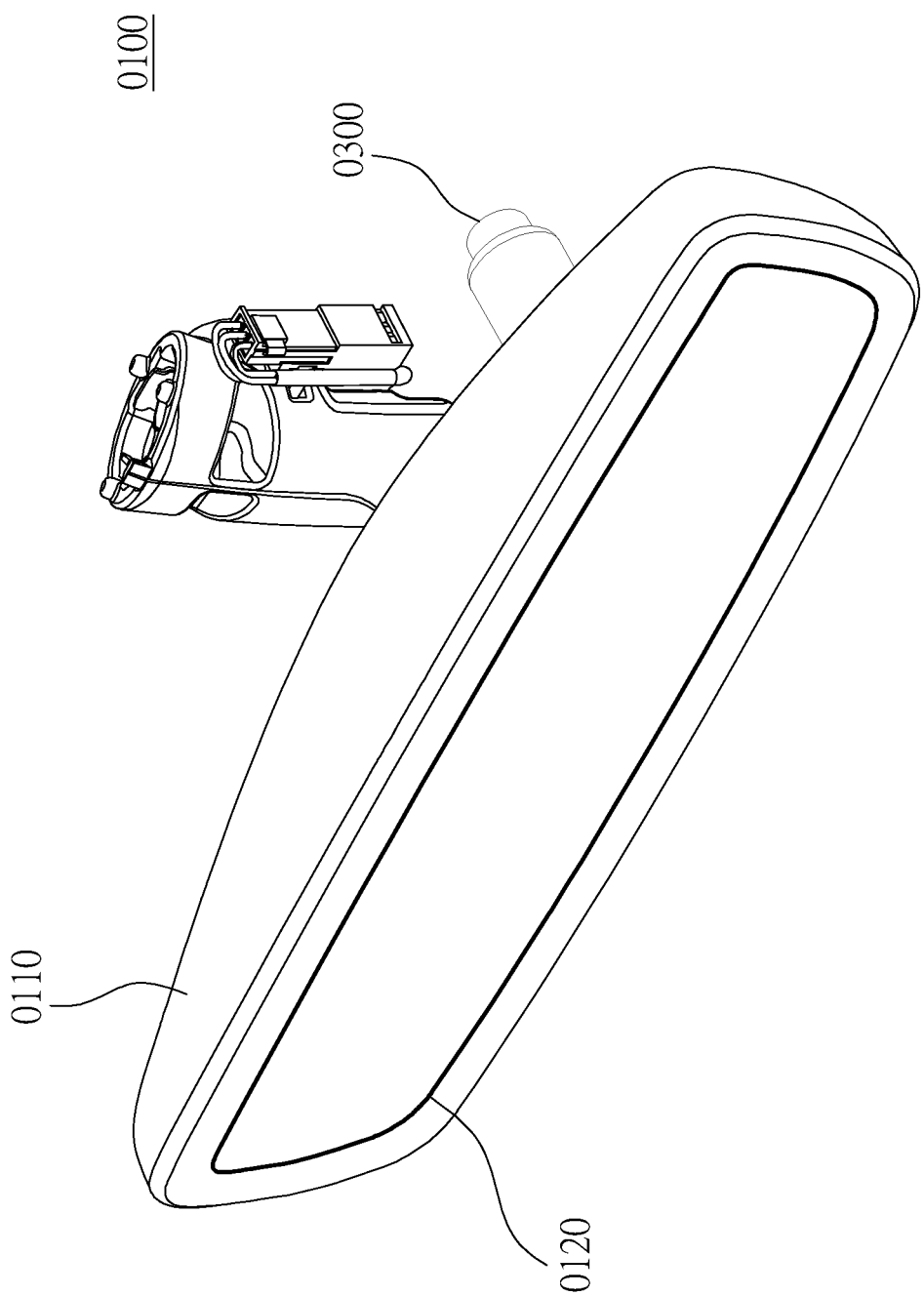
FIG. 1K is a schematic diagram of a fourth structural embodiment of the present invention.
Figure 1L:
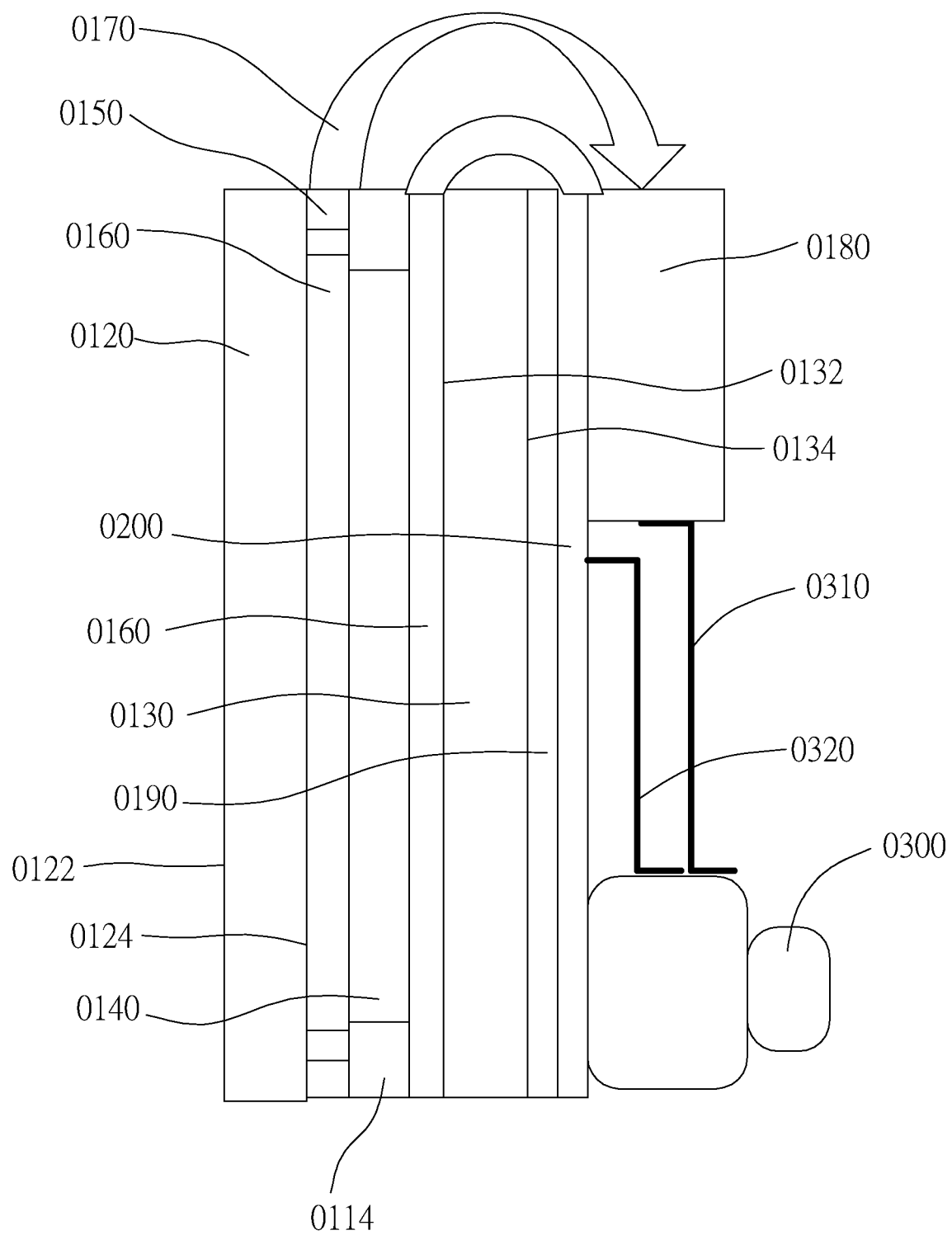
FIG. 1L is a sectional view, showing the short side of the fourth structural embodiment of the present invention.

A displaying device 0024 which is a vehicle electronic rear-view mirror 0100 as an example according to a fourth structural embodiment of the present invention is illustrated in FIG. 1K. FIG. 1L is a sectional schematic view of FIG. 1K seen from a right shorter lateral side. The difference between the third structural embodiment and the fourth structural embodiment is that the vehicle electronic rear-view mirror 0100 according to the fourth structural embodiment includes at least one video module disposed on a side of the second transparent assembly 0130 away from the first transparent assembly 0120 and facing a forward direction of the movable carrier 0000 for example, and being electrically coupled to the monitor 0200. When an external image of the movable carrier 0000 needs to be captured, at least one control member 0180 could be electrically connected to the video module 0300 through a first signal transmission line 0310 and activated, and then an external image signal of the movable carrier 0000 captured by the video module 0300 could be transmitted to the monitor 0200 via a second signal transmission line 0320, thereby to provide an instant driving information or a real-time traffic information to the driver.

In the current structural embodiment, the monitor 0200 could be a screen with a high dynamic range (HDR), which could show brightness with more obvious light and shade color transition, closer to a real situation seen by the human eye. In order to achieve a condition with a sufficient light compared with the external environment of the movable carrier 0000, the monitor 0200 could be a screen with a brightness exceeding 1000 nits (most preferable), or with a brightness exceeding 4000 nits (nts)(second preferable), which could exhibit a high dynamic range (HDR) image, thereby the driver could clearly observe the driving information or the road condition information presented by the monitor 0200 within the movable carrier 0000.

In the current structural embodiment, there is further a signal input device (not shown) electrically coupled to the displaying device 0024, wherein the signal input device is adapted to send a heterogeneous signal that is not from the optical image capturing system to the display device 0024 for numerical or graphical presentation. The signal input device could be a tire pressure detector (TPMS) for example, so that an internal tire pressure of the movable carrier 0000 could be detected and instantly converted into a digital signal, wherein the digital signal is transmitted to the display device 0024 to be displayed in a numerical or graphical manner, thereby to help the driver to grasp the movable carrier 0000 and achieve a warning effect.

In a structural embodiment, the movable carrier auxiliary system 100 includes a plurality of video modules 0300 (not shown), wherein each of the video modules 0300 is disposed on different positions of the movable carrier auxiliary system 100. For instance, if the movable carrier 0000 is a vehicle, the video modules 0300 could be respectively disposed on the left/right rear-view mirrors, on the front/rear bumpers, or between the front windshield and the rear windshield inside of the vehicle, wherein the external image signal captured by each of the video modules 0300 could be transmitted to the monitor 0200, and could be instantly and simultaneously presented to the driver for different viewing directions in a non-overlapping manner or in an image butting manner.

In a structural embodiment, the movable carrier auxiliary system 100 further includes at least one movable detector (not shown) and a plurality of video modules (not shown), wherein each of the video modules is disposed on different positions of the movable carrier auxiliary system 100 (not shown). For instance, if the movable carrier 0000 is a vehicle, the video modules could be respectively disposed on the left/right rear-view mirrors, on the front/rear bumpers, or between the front windshield and the rear windshield inside of the vehicle. When the movable carrier 0000 is in a state of shutting down the power system and stopping driving, the movable detector starts to continuously detect whether the movable carrier 0000 is collided or vibrated. If the movable carrier 0000 is bumped or vibrated, the movable detector starts the video modules to instantly record, thereby to help the driver record collision events for on-site restoration and gather the evidence.

In a structural embodiment, the movable carrier auxiliary system 100 further includes a switch controller and two video modules 0300 (not shown), wherein one of the video modules 0300 is disposed on a front position of the movable carrier 0000, and another one thereof is disposed on a rear position of the movable carrier 0000. When the movable carrier 0000 is on a reverse mode, the monitor 0020 could display a rear image of the movable carrier 0000 and instantly record the video, thereby assisting the driver to avoid the rear collision event of the movable carrier 0000.

In a structural embodiment, the movable carrier auxiliary system 100 further includes an information communication device (not shown), wherein the information communication device is adapted to communicate with a default contact person or organization, so that when the driver encounters a specific event such as a traffic accident, the driver could notify somebody and seek an assistance through the information communication device to avoid an expansion of personal property damage.

In a structural embodiment, the movable carrier auxiliary system 100 further includes a driving setter and a biological identification device (not shown), wherein the driving setter is electrically connected to the biological identification device. When a specific driver enters the movable carrier 0000 and faces the biological identification device, an identification could be performed and the driving setter is started. The driving setter controls the movable carrier 0000 according to parameters preset by an individual driver, thereby assisting the driver to quickly complete the corresponding setting of the movable carrier 0000 usage habit and effectively control the movable carrier 0000.

Figure 1M:
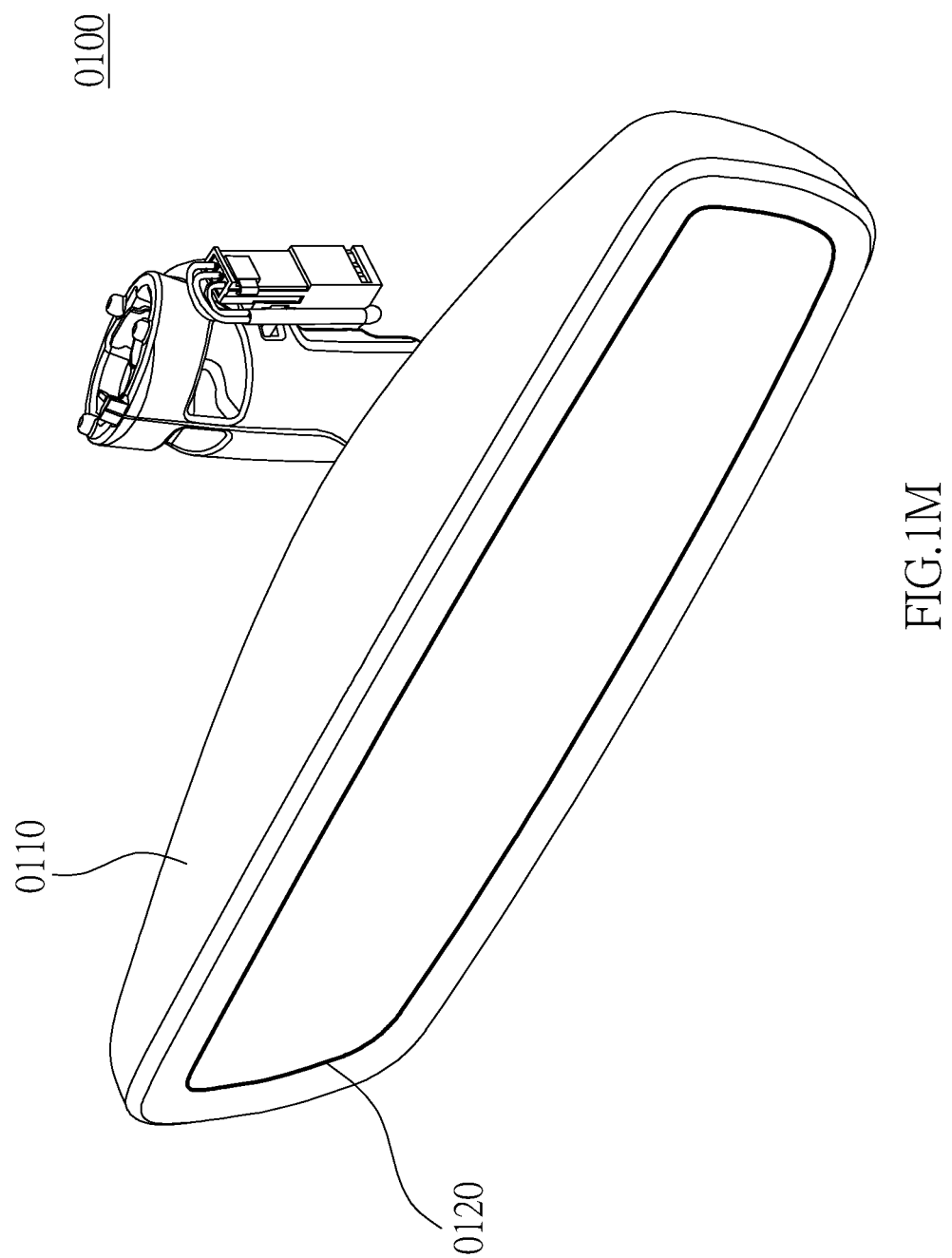
FIG. 1M is a schematic diagram of a fifth structural embodiment of the present invention.
Figure 1N:
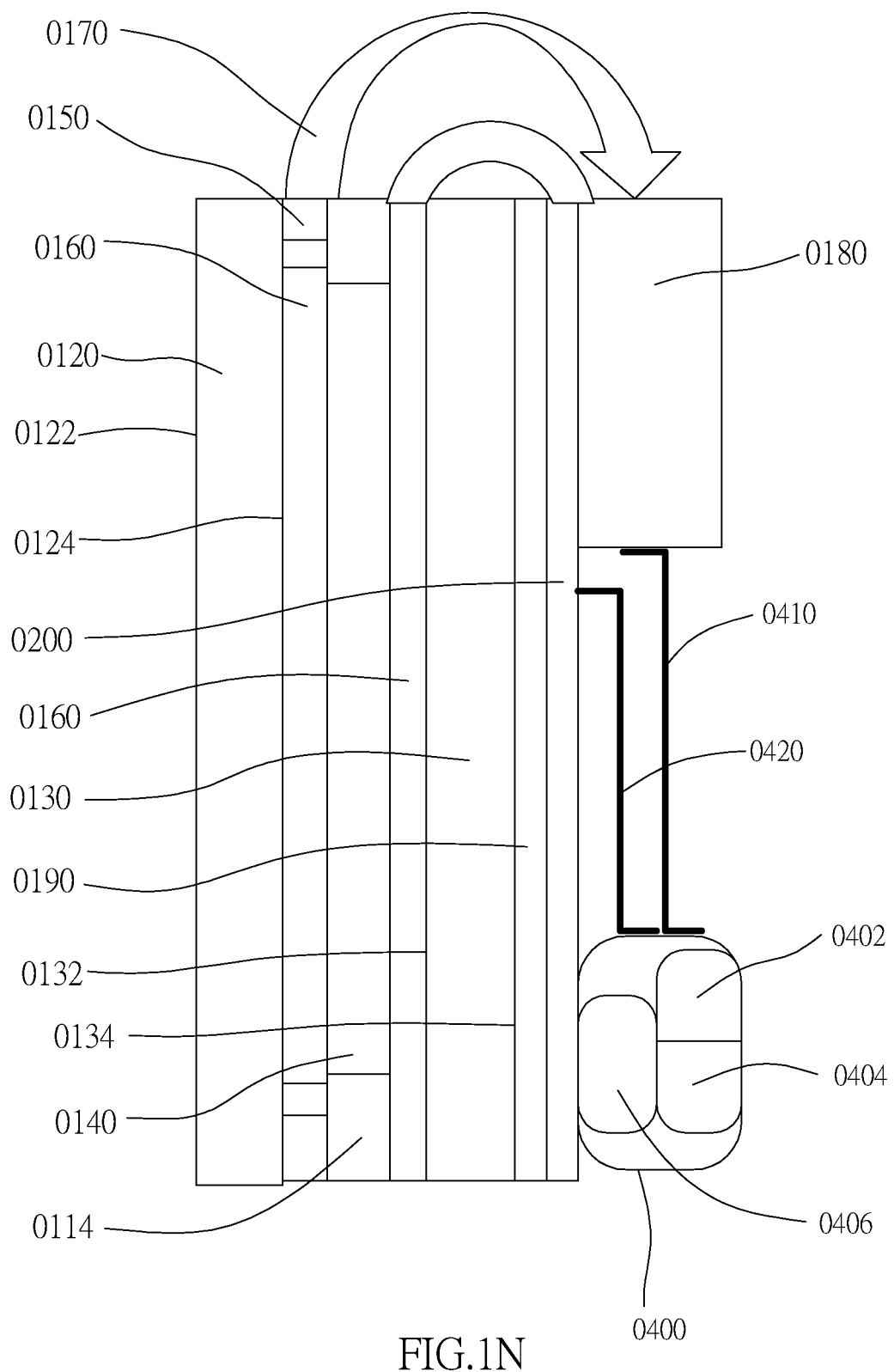
FIG. 1N is a sectional view, showing the short side of the fifth structural embodiment of the present invention.

A displaying device 0024 which is a vehicle electronic rear-view mirror 0100 as an example according to a fifth structural embodiment of the present invention is illustrated in FIG. 1M. FIG. 1N is a sectional schematic view of FIG. 1M seen from a right shorter lateral side. The difference between the third structural embodiment and the fifth structural embodiment is that the vehicle electronic rear-view mirror 0100 according to the fifth structural embodiment (i.e., the vehicle electronic rear-view mirror according to the fifth structural embodiment) could be equipped with a satellite navigation system 0400, wherein the satellite navigation system 0400 at least includes at least one antenna module 0402, a satellite signal transceiver 0404, and a satellite navigation processor 0406. When the movable carrier 0000 needs to obtain informations such as a driving route planning, an electronic map navigation, or a navigation route guidance, at least one control member 0180 is electrically connected to the satellite navigation system 0400 through the first signal transmission line 0410 and is started, and then a map information and location signals captured by the satellite navigation system 0400 is transmitted to the monitor 0200 via the second signal transmission line 0420, thereby to provide a real-time traffic information to the driver to assist driving decisions.

The antenna module 0402 is adapted to receive and transmit a satellite signal to the satellite signal transceiver 0404 for further processing, wherein a type of the antenna module 0402 could include a helical antenna and a patch antenna. The helical antenna and the patch antenna have different radiation field shapes and gain values, and the type could be selected according to design requirements.

The satellite signal transceiver 0404 is adapted to digitize the satellite signal received by the antenna module 0402 through a signal receiving/transmitting processing circuit (not shown) to generate a satellite navigation data. The satellite navigation processor 0406 is adapted to process and operate the satellite navigation data to perform a location locating process and to execute related applications to generate and provide a satellite navigation information service, wherein the satellite signal transceiver 0404 transmits the satellite navigation data to the satellite navigation processor 0406 in a serial transmission manner.

Moreover, a maximum diameter of an image-side surface of a lens of the lens group closest to the image plane is denoted by PhiB, and a maximum effective diameter of the image-side surface of the lens of the lens group L closest to the image plane (i.e., the image space) could be also called optical exit pupil, and is denoted by PhiA.

In order to keep small in size and provide high imaging quality, the optical image capturing module of the current embodiment satisfies: 0 mm<PhiA≤17.4 mm. Preferably, the optical image capturing module of the current embodiment satisfies: 0 mm<PhiA≤13.5 mm.

Furthermore, the optical embodiments will be described in detail as follow. The optical image capturing module could work in three wavelengths, including 486.1 nm, 587.5 nm, and 656.2 nm, wherein 587.5 nm is the main reference wavelength and is the reference wavelength for obtaining the technical characters. The optical image capturing module could also work in five wavelengths, including 470 nm, 510 nm, 555 nm, 610 nm, and 650 nm wherein 555 nm is the main reference wavelength, and is the reference wavelength for obtaining the technical characters.

The optical image capturing module of the present invention satisfies $0.5 \le \Sigma PPR/|\Sigma NPR| \le 15$, and a preferable range is $1 \le \Sigma PPR/|\Sigma NPR| \le 3.0$, where PPR is a ratio of the focal length f of the optical image capturing module to a focal length fp of each of lenses with positive refractive power; NPR is a ratio of the focal length f of the optical image capturing module to a focal length fn of each of lenses with negative refractive power; $\Sigma PPR$ is a sum of the PPRs of each positive lens; and $\Sigma NPR$ is a sum of the NPRs of each negative lens. It is helpful for control of an entire refractive power and an entire length of the optical image capturing module.

The optical image capturing module further includes an image sensor provided on the image plane. The optical image capturing module of the present invention satisfies HOS/HOI≤50 and 0.5≤HOS/f≤150, and a preferable range is 1≤HOS/HOI≤40 and 1≤HOS/f≤140, where HOI is a half of a diagonal of an effective sensing area of the image sensor, i.e., the maximum image height, and HOS is a height of the optical image capturing module, i.e. a distance on the optical axis between the object-side surface of the first lens and the image plane. It is helpful for reduction of the size of the optical image capturing module for use in compact cameras.

The optical image capturing module of the present invention is further provided with an aperture to increase image quality.

In the optical image capturing module of the present invention, the aperture could be a front aperture or a middle aperture, wherein the front aperture is provided between the object and the first lens, and the middle is provided between the first lens and the image plane. The front aperture provides a long distance between an exit pupil of the optical image capturing module and the image plane, which allows more elements to be installed. The middle could enlarge a view angle of view of the optical image capturing module and increase the efficiency of the image sensor. The optical image capturing module satisfies $0.1 \le InS/HOS \le 1.1$, where InS is a distance between the aperture and the image surface. It is helpful for size reduction and wide angle.

The optical image capturing module of the present invention satisfies $0.1 \le \Sigma TP/InTL \le 0.9$, where InTL is a distance between the object-side surface of the first lens and the image-side surface of the sixth lens, and $\Sigma TP$ is a sum of central thicknesses of the lenses on the optical axis. It is helpful for the contrast of image and yield rate of manufacture and provides a suitable back focal length for installation of other elements.

The optical image capturing module of the present invention satisfies $0.001 \le |R1/R2| \le 25$, and a preferable range is $0.01 \le |R1/R2| < 12$, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing module of the present invention satisfies $-7 < (R11-R12)/(R11+R12) < 50$, where R11 is a radius of curvature of the object-side surface of the sixth lens, and R12 is a radius of curvature of the image-side surface of the sixth lens. It may modify the astigmatic field curvature.

The optical image capturing module of the present invention satisfies $IN12/f \le 60$, where IN12 is a distance on the optical axis between the first lens and the second lens. It may correct chromatic aberration and improve the performance.

The optical image capturing module of the present invention satisfies $IN56/f \le 3.0$, where IN56 is a distance on the optical axis between the fifth lens and the sixth lens. It may correct chromatic aberration and improve the performance.

The optical image capturing module of the present invention satisfies $0.1 \le (TP1+IN12)/TP2 \le 10$, where TP1 is a central thickness of the first lens on the optical axis, and TP2 is a central thickness of the second lens on the optical axis. It may control the sensitivity of manufacture of the optical image capturing module and improve the performance.

The optical image capturing module of the present invention satisfies $0.1 \le (TP6+IN56)/TP5 \le 15$, where TP5 is a central thickness of the fifth lens on the optical axis, TP6 is a central thickness of the sixth lens on the optical axis, and IN56 is a distance between the fifth lens and the sixth lens. It may control the sensitivity of manufacture of the optical image capturing module and improve the performance.

The optical image capturing module of the present invention satisfies $0.1 \le TP4/(IN34+TP4+IN45) < 1$, where TP2 is a central thickness of the second lens on the optical axis, TP3 is a central thickness of the third lens on the optical axis, TP4 is a central thickness of the fourth lens on the optical axis, IN34 is a distance on the optical axis between the third lens and the fourth lens, IN45 is a distance on the optical axis between the fourth lens and the fifth lens, and InTL is a distance between the object-side surface of the first lens and the image-side surface of the seventh lens. It may fine tune and correct the aberration of the incident rays layer by layer, and reduce the height of the optical image capturing module.

The optical image capturing module satisfies 0 mm≤HVT61≤3 mm; 0 mm<HVT62≤6 mm; 0≤HVT61/HVT62; 0 mm≤|SGC61|≤0.5 mm; 0 mm≤|SGC62|≤2 mm; and $0 \le |SGC62|/(|SGC62|+TP6) \le 0.9$, where HVT61 a distance perpendicular to the optical axis between the critical point C61 on the object-side surface of the sixth lens and the optical axis; HVT62 a distance perpendicular to the optical axis between the critical point C62 on the image-side surface of the sixth lens and the optical axis; SGC61 is a distance on the optical axis between a point on the object-side surface of the sixth lens where the optical axis passes through and a point where the critical point C61 projects on the optical axis; SGC62 is a distance on the optical axis between a point on the image-side surface of the sixth lens where the optical axis passes through and a point where the critical point C62 projects on the optical axis. It is helpful to correct the off-axis view field aberration.

The optical image capturing module satisfies $0.2 \le HVT62/HOI \le 0.9$, and preferably satisfies $0.3 \le HVT62/HOI \le 0.8$. It may help to correct the peripheral aberration.

The optical image capturing module satisfies $0 \le HVT62/HOS \le 0.5$, and preferably satisfies $0.2 \le HVT62/HOS \le 0.45$. It may help to correct the peripheral aberration.

The optical image capturing module of the present invention satisfies $0 < SGI611/(SGI611+TP6) \le 0.9$; $0 < SGI621/(SGI621+TP6) \le 0.9$, and it is preferable to satisfy $0.1 \le SGI611/(SGI611+TP6) \le 0.6$; $0.1 \le SGI621/(SGI621+TP7) \le 0.6$, where SGI611 is a displacement on the optical axis from a point on the object-side surface of the sixth lens, through which the optical axis passes, to a point where the inflection point on the object-side surface, which is the closest to the optical axis, projects on the optical axis, and SGI621 is a displacement on the optical axis from a point on the image-side surface of the sixth lens, through which the optical axis passes, to a point where the inflection point on the image-side surface, which is the closest to the optical axis, projects on the optical axis.

The optical image capturing module of the present invention satisfies $0 < SGI612/(SGI612+TP6) \le 0.9$; $0 < SGI622/(SGI622+TP6) \le 0.9$, and it is preferable to satisfy 0.1≤SGI612/(SGI612+TP6)≤0.6; 0.1≤SGI622/(SGI622+TP6)≤0.6, where SGI612 is a displacement on the optical axis from a point on the object-side surface of the sixth lens, through which the optical axis passes, to a point where the inflection point on the object-side surface, which is the second closest to the optical axis, projects on the optical axis, and SGI622 is a displacement on the optical axis from a point on the image-side surface of the sixth lens, through which the optical axis passes, to a point where the inflection point on the object-side surface, which is the second closest to the optical axis, projects on the optical axis.

The optical image capturing module of the present invention satisfies 0.001 mm≤|HIF611|≤5 mm; 0.001 mm≤|HIF621|≤5 mm, and it is preferable to satisfy 0.1 mm≤|HIF611|≤3.5 mm; 1.5 mm≤|HIF621|≤3.5 mm, where HIF611 is a distance perpendicular to the optical axis between the inflection point on the object-side surface of the sixth lens, which is the closest to the optical axis, and the optical axis; HIF621 is a distance perpendicular to the optical axis between the inflection point on the image-side surface of the sixth lens, which is the closest to the optical axis, and the optical axis.

The optical image capturing module of the present invention satisfies 0.001 mm≤|HIF612|≤5 mm; 0.001 mm≤|HIF622|≤5 mm, and it is preferable to satisfy 0.1 mm≤|HIF622|≤3.5 mm; 0.1 mm≤|HIF612|≤3.5 mm, where HIF612 is a distance perpendicular to the optical axis between the inflection point on the object-side surface of the sixth lens, which is the second closest to the optical axis, and the optical axis; HIF622 is a distance perpendicular to the optical axis between the inflection point on the image-side surface of the sixth lens, which is the second closest to the optical axis, and the optical axis.

The optical image capturing module of the present invention satisfies 0.001 mm≤|HIF613|≤5 mm; 0.001 mm≤|HIF623|≤5 mm, and it is preferable to satisfy 0.1 mm≤|HIF623|≤3.5 mm; 0.1 mm≤|HIF613|≤3.5 mm, where HIF613 is a distance perpendicular to the optical axis between the inflection point on the object-side surface of the sixth lens, which is the third closest to the optical axis, and the optical axis; HIF623 is a distance perpendicular to the optical axis between the inflection point on the image-side surface of the sixth lens, which is the third closest to the optical axis, and the optical axis.

The optical image capturing module of the present invention satisfies 0.001 mm≤|HIF614|≤5 mm; 0.001 mm≤|HIF624|≤5 mm, and it is preferable to satisfy 0.1 mm≤|HIF624|≤3.5 mm; 0.1 mm≤|HIF614|≤3.5 mm, where HIF614 is a distance perpendicular to the optical axis between the inflection point on the object-side surface of the sixth lens, which is the fourth closest to the optical axis, and the optical axis; HIF624 is a distance perpendicular to the optical axis between the inflection point on the image-side surface of the sixth lens, which is the fourth closest to the optical axis, and the optical axis.

In an embodiment, the lenses of high Abbe number and the lenses of low Abbe number are arranged in an interlaced arrangement that could be helpful for correction of aberration of the optical image capturing module.

An equation of aspheric surface is $$z = ch^2/[1+[1(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \ldots \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing module, the lenses could be made of plastic or glass. The plastic lenses may reduce the weight and lower the cost of the optical image capturing module, and the glass lenses may control the thermal effect and enlarge the space for arrangement of the refractive power of the optical image capturing module. In addition, the opposite surfaces (object-side surface and image-side surface) of the first to the seventh lenses could be aspheric that could obtain more control parameters to reduce aberration. The number of aspheric glass lenses could be less than the conventional spherical glass lenses, which is helpful for reduction of the height of the optical image capturing module.

When the lens has a convex surface, which means that the surface is convex around a position, through which the optical axis passes, and when the lens has a concave surface, which means that the surface is concave around a position, through which the optical axis passes.

The optical image capturing module of the present invention could be applied in a dynamic focusing optical image capturing module. It is superior in the correction of aberration and high imaging quality so that it could be allied in lots of fields.

The optical image capturing module of the present invention could further include a driving module to meet different demands, wherein the driving module could be coupled with the lenses to move the lenses. The driving module could be a voice coil motor (VCM), which is used to move the lens for focusing, or could be an optical image stabilization (OIS) component, which is used to lower the possibility of having the problem of image blurring which is caused by subtle movements of the lens while shooting.

To meet different requirements, at least one lens among the first lens to the seventh lens of the optical image capturing module of the present invention could be a light filter, which filters out light of wavelength shorter than 500 nm. Such effect could be achieved by coating on at least one surface of the lens, or by using materials capable of filtering out short waves to make the lens.

To meet different requirements, the image plane of the optical image capturing module in the present invention could be either flat or curved. If the image plane is curved (e.g., a sphere with a radius of curvature), the incidence angle required for focusing light on the image plane could be decreased, which is not only helpful to shorten the length of the optical image capturing module (TTL), but also helpful to increase the relative illuminance.

We provide several optical embodiments in conjunction with the accompanying drawings for the best understanding. In practice, the optical embodiments of the present invention could be applied to other structural embodiments.

First Optical Embodiment

Figure 2A:
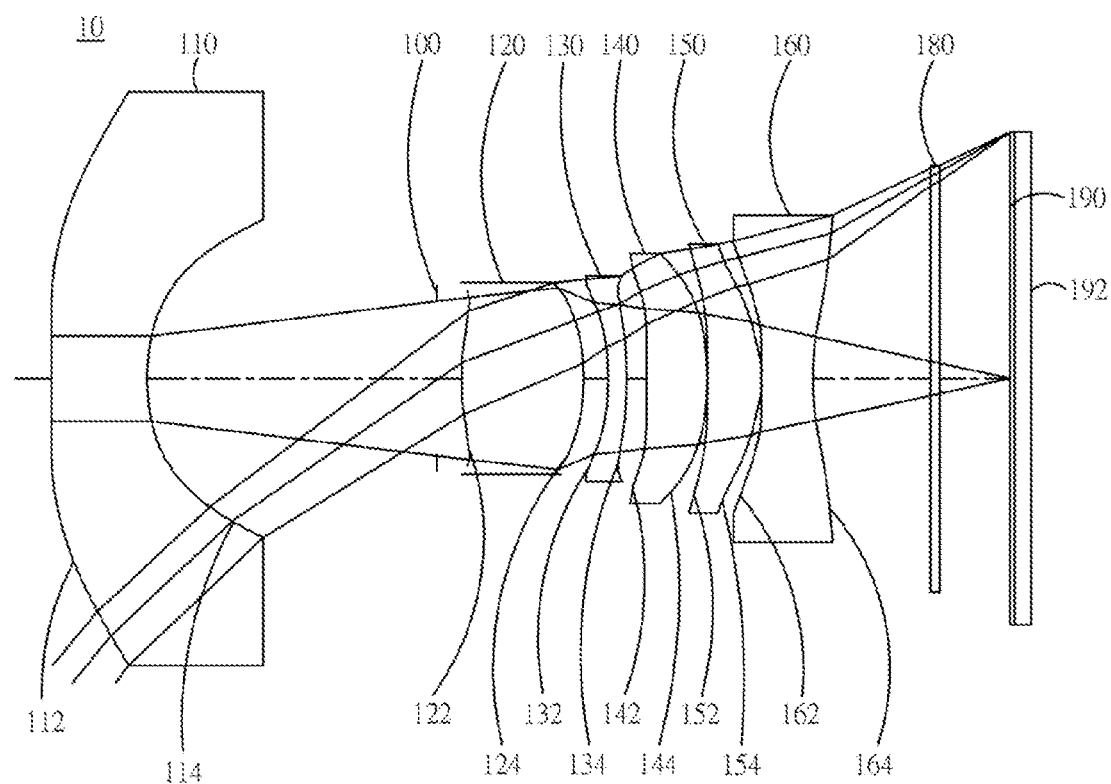
FIG. 2A is a schematic diagram of a first optical embodiment of the present invention.
Figure 2B:
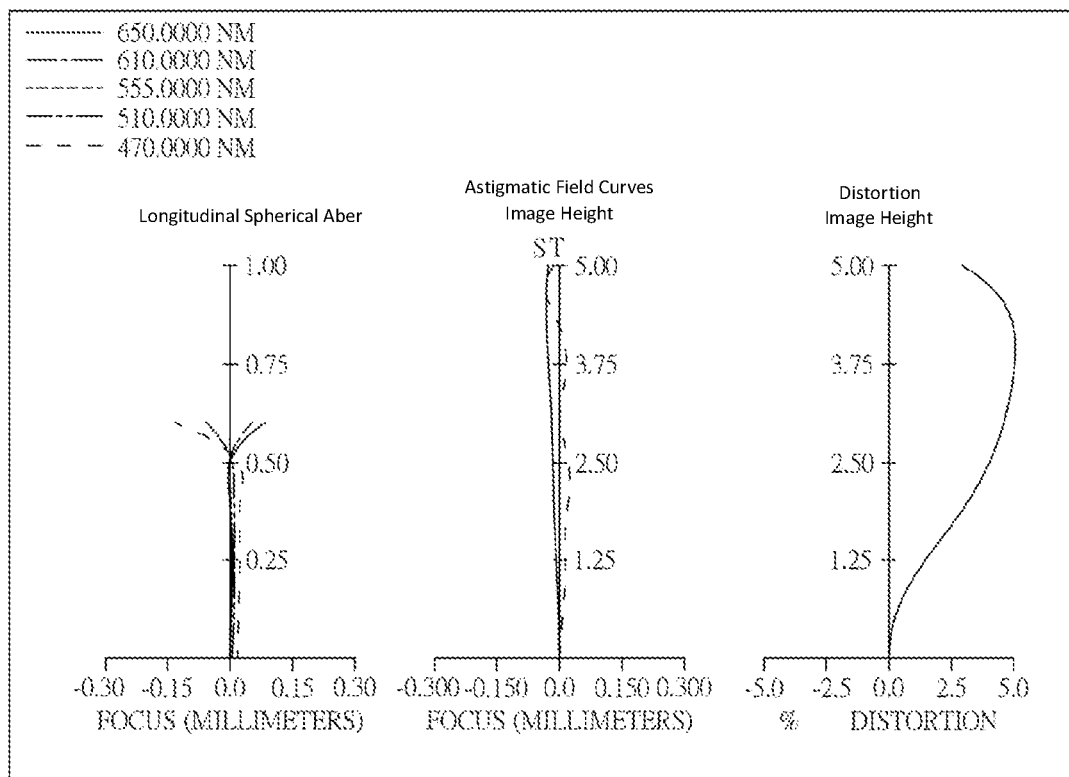
FIG. 2B shows curve diagrams of longitudinal spherical aberration, astigmatic field, and optical distortion of the optical image capturing module in the order from left to right of the first optical embodiment of the present application.

As shown in FIG. 2A and FIG. 2B, wherein a lens group of an optical image capturing module 10 of a first optical embodiment of the present invention is illustrated in FIG. 2A, and FIG. 2B shows curve diagrams of longitudinal spherical aberration, astigmatic field, and optical distortion of the optical image capturing module in the order from left to right of the first optical embodiment. The optical image capturing module 10 of the first optical embodiment includes, along an optical axis from an object side to an image side, a first lens 110, an aperture 100, a second lens 120, a third lens 130, a fourth lens 140, a fifth lens 150, a sixth lens 160, an infrared rays filter 180, an image plane 190, and an image sensor 192.

The first lens 110 has negative refractive power and is made of plastic. An object-side surface 112 thereof, which faces the object side, is a concave aspheric surface, and an image-side surface 114 thereof, which faces the image side, is a concave aspheric surface. The object-side surface 112 has two inflection points. A profile curve length of the maximum effective half diameter of the object-side surface 112 of the first lens 110 is denoted by ARS11, and a profile curve length of the maximum effective half diameter of the image-side surface 114 of the first lens 110 is denoted by ARS12. A profile curve length of a half of the entrance pupil diameter (HEP) of the object-side surface 112 of the first lens 110 is denoted by ARE11, and a profile curve length of a half of the entrance pupil diameter (HEP) of the image-side surface 114 of the first lens 110 is denoted by ARE12. A thickness of the first lens 110 on the optical axis is denoted by TP1.

The first lens satisfies SGI111=−0.0031 mm; |SGI111|/(|SGI111|+TP1)=0.0016, where a displacement on the optical axis from a point on the object-side surface 112 of the first lens 110, through which the optical axis passes, to a point where the inflection point on the object-side surface 112, which is the closest to the optical axis, projects on the optical axis, is denoted by SGI111, and a displacement on the optical axis from a point on the image-side surface 114 of the first lens 110, through which the optical axis passes, to a point where the inflection point on the image-side surface 114, which is the closest to the optical axis, projects on the optical axis is denoted by SGI121.

The first lens 110 satisfies SGI112=1.3178 mm; |SGI112|/(|SGI112|+TP1)=0.4052, where a displacement on the optical axis from a point on the object-side surface 112 of the first lens 110, through which the optical axis passes, to a point where the inflection point on the object-side surface 112, which is the second closest to the optical axis, projects on the optical axis, is denoted by SGI112, and a displacement on the optical axis from a point on the image-side surface 114 of the first lens 110, through which the optical axis passes, to a point where the inflection point on the image-side surface 114, which is the second closest to the optical axis, projects on the optical axis is denoted by SGI122.

The first lens 110 satisfies HIF111=0.5557 mm; HIF111/HOI=0.1111, where a displacement perpendicular to the optical axis from a point on the object-side surface 112 of the first lens 110, through which the optical axis passes, to the inflection point, which is the closest to the optical axis is denoted by HIF111, and a displacement perpendicular to the optical axis from a point on the image-side surface 114 of the first lens 110, through which the optical axis passes, to the inflection point, which is the closest to the optical axis is denoted by HIF121.

The first lens 110 satisfies HIF112=5.3732 mm; HIF112/HOI=1.0746, where a displacement perpendicular to the optical axis from a point on the object-side surface 112 of the first lens 110, through which the optical axis passes, to the inflection point, which is the second closest to the optical axis is denoted by HIF112, and a displacement perpendicular to the optical axis from a point on the image-side surface 114 of the first lens 110, through which the optical axis passes, to the inflection point, which is the second closest to the optical axis is denoted by HIF122.

The second lens 120 has positive refractive power and is made of plastic. An object-side surface 122 thereof, which faces the object side, is a convex aspheric surface, and an image-side surface 124 thereof, which faces the image side, is a convex aspheric surface. The object-side surface 122 has an inflection point. A profile curve length of the maximum effective half diameter of the object-side surface 122 of the second lens 120 is denoted by ARS21, and a profile curve length of the maximum effective half diameter of the image-side surface 124 of the second lens 120 is denoted by ARS22. A profile curve length of a half of the entrance pupil diameter (HEP) of the object-side surface 122 of the second lens 120 is denoted by ARE21, and a profile curve length of a half of the entrance pupil diameter (HEP) of the image-side surface 124 of the second lens 120 is denoted by ARE22. A thickness of the second lens 120 on the optical axis is denoted by TP2.

The second lens 120 satisfies SGI211=0.1069 mm; |SGI211|/(|SGI211|+TP2)=0.0412; |SGI122|=0 mm; |SGI221|/(|SGI221|+TP2)=0, where a displacement on the optical axis from a point on the object-side surface 122 of the second lens 120, through which the optical axis passes, to a point where the inflection point on the object-side surface 122, which is the closest to the optical axis, projects on the optical axis, is denoted by SGI211, and a displacement on the optical axis from a point on the image-side surface 124 of the second lens 120, through which the optical axis passes, to a point where the inflection point on the image-side surface 124, which is the closest to the optical axis, projects on the optical axis is denoted by SGI221.

The second lens 120 satisfies HIF211=1.1264 mm; HIF211/HOI=0.2253; HIF221=0 mm; HIF221/HOI=0, where a displacement perpendicular to the optical axis from a point on the object-side surface 122 of the second lens 120, through which the optical axis passes, to the inflection point, which is the closest to the optical axis is denoted by HIF211, and a displacement perpendicular to the optical axis from a point on the image-side surface 124 of the second lens 120, through which the optical axis passes, to the inflection point, which is the closest to the optical axis is denoted by HIF221.

The third lens 130 has negative refractive power and is made of plastic. An object-side surface 132, which faces the object side, is a concave aspheric surface, and an image-side surface 134, which faces the image side, is a convex aspheric surface. The object-side surface 132 has an inflection point, and the image-side surface 134 has an inflection point. The object-side surface 122 has an inflection point. A profile curve length of the maximum effective half diameter of the object-side surface 132 of the third lens 130 is denoted by ARS31, and a profile curve length of the maximum effective half diameter of the image-side surface 134 of the third lens 130 is denoted by ARS32. A profile curve length of a half of the entrance pupil diameter (HEP) of the object-side surface 132 of the third lens 130 is denoted by ARE31, and a profile curve length of a half of the entrance pupil diameter (HEP) of the image-side surface 134 of the third lens 130 is denoted by ARE32. A thickness of the third lens 130 on the optical axis is denoted by TP3.

The third lens 130 satisfies SGI311=−0.3041 mm; |SGI311|/(|SGI311|+TP3)=0.4445; SGI321=−0.1172 mm; |SGI321|/(|SGI321|+TP3)=0.2357, where SGI311 is a displacement on the optical axis from a point on the object-side surface 132 of the third lens 130, through which the optical axis passes, to a point where the inflection point on the object-side surface 132, which is the closest to the optical axis, projects on the optical axis, and SGI321 is a displacement on the optical axis from a point on the image-side surface 134 of the third lens 130, through which the optical axis passes, to a point where the inflection point on the image-side surface 134, which is the closest to the optical axis, projects on the optical axis.

The third lens 130 satisfies HIF311=1.5907 mm; HIF311/HOI=0.3181; HIF321=1.3380 mm; HIF321/HOI=0.2676, where HIF311 is a distance perpendicular to the optical axis between the inflection point on the object-side surface 132 of the third lens 130, which is the closest to the optical axis, and the optical axis; HIF321 is a distance perpendicular to the optical axis between the inflection point on the image-side surface 134 of the third lens 130, which is the closest to the optical axis, and the optical axis.

The fourth lens 140 has positive refractive power and is made of plastic. An object-side surface 142, which faces the object side, is a convex aspheric surface, and an image-side surface 144, which faces the image side, is a concave aspheric surface. The object-side surface 142 has two inflection points, and the image-side surface 144 has an inflection point. A profile curve length of the maximum effective half diameter of the object-side surface 142 of the fourth lens 140 is denoted by ARS41, and a profile curve length of the maximum effective half diameter of the image-side surface 144 of the fourth lens 140 is denoted by ARS42. A profile curve length of a half of the entrance pupil diameter (HEP) of the object-side surface 142 of the fourth lens 140 is denoted by ARE41, and a profile curve length of a half of the entrance pupil diameter (HEP) of the image-side surface 144 of the fourth lens 140 is denoted by ARE42. A thickness of the fourth lens 140 on the optical axis is TP4.

The fourth lens 140 satisfies SGI411=0.0070 mm; |SGI411|/(|SGI411|+TP4)=0.0056; SGI421=0.0006 mm; |SGI421|/(|SGI421|+TP4)=0.0005, where SGI411 is a displacement on the optical axis from a point on the object-side surface 142 of the fourth lens 140, through which the optical axis passes, to a point where the inflection point on the object-side surface 142, which is the closest to the optical axis, projects on the optical axis, and SGI421 is a displacement on the optical axis from a point on the image-side surface 144 of the fourth lens 140, through which the optical axis passes, to a point where the inflection point on the image-side surface 144, which is the closest to the optical axis, projects on the optical axis.

The fourth lens 140 satisfies SGI412=−0.2078 mm; |SGI412|/(|SGI412|+TP4)=0.1439, where SGI412 is a displacement on the optical axis from a point on the object-side surface 142 of the fourth lens 140, through which the optical axis passes, to a point where the inflection point on the object-side surface 142, which is the second closest to the optical axis, projects on the optical axis, and SGI422 is a displacement on the optical axis from a point on the image-side surface 144 of the fourth lens 140, through which the optical axis passes, to a point where the inflection point on the image-side surface 144, which is the second closest to the optical axis, projects on the optical axis.

The fourth lens 140 further satisfies HIF411=0.4706 mm; HIF411/HOI=0.0941; HIF421=0.1721 mm; HIF421/HOI=0.0344, where HIF411 is a distance perpendicular to the optical axis between the inflection point on the object-side surface 142 of the fourth lens 140, which is the closest to the optical axis, and the optical axis; HIF421 is a distance perpendicular to the optical axis between the inflection point on the image-side surface 144 of the fourth lens 140, which is the closest to the optical axis, and the optical axis.

The fourth lens 140 satisfies HIF412=2.0421 mm; HIF412/HOI=0.4084, where HIF412 is a distance perpendicular to the optical axis between the inflection point on the object-side surface 142 of the fourth lens 140, which is the second closest to the optical axis, and the optical axis; HIF422 is a distance perpendicular to the optical axis between the inflection point on the image-side surface 144 of the fourth lens 140, which is the second closest to the optical axis, and the optical axis.

The fifth lens 150 has positive refractive power and is made of plastic. An object-side surface 152, which faces the object side, is a convex aspheric surface, and an image-side surface 154, which faces the image side, is a convex aspheric surface. The object-side surface 152 has two inflection points, and the image-side surface 154 has an inflection point. A profile curve length of the maximum effective half diameter of the object-side surface 152 of the fifth lens 150 is denoted by ARS51, and a profile curve length of the maximum effective half diameter of the image-side surface 154 of the fifth lens 150 is denoted by ARS52. A profile curve length of a half of the entrance pupil diameter (HEP) of the object-side surface 152 of the fifth lens 150 is denoted by ARE51, and a profile curve length of a half of the entrance pupil diameter (HEP) of the image-side surface 154 of the fifth lens 150 is denoted by ARE52. A thickness of the fifth lens 150 on the optical axis is denoted by TP5.

The fifth lens 150 satisfies SGI511=0.00364 mm; SGI521=−0.63365 mm; |SGI511|/(|SGI511|+TP5)=0.00338; |SGI521|/(|SGI521|+TP5)=0.37154, where SGI511 is a displacement on the optical axis from a point on the object-side surface 152 of the fifth lens 150, through which the optical axis passes, to a point where the inflection point on the object-side surface 152, which is the closest to the optical axis, projects on the optical axis, and SGI521 is a displacement on the optical axis from a point on the image-side surface 154 of the fifth lens 150, through which the optical axis passes, to a point where the inflection point on the image-side surface 154, which is the closest to the optical axis, projects on the optical axis.

The fifth lens 150 satisfies SGI512=−0.32032 mm; |SGI512|/(|SGI512|+TP5)=0.23009, where SGI512 is a displacement on the optical axis from a point on the object-side surface 152 of the fifth lens 150, through which the optical axis passes, to a point where the inflection point on the object-side surface 152, which is the second closest to the optical axis, projects on the optical axis, and SGI522 is a displacement on the optical axis from a point on the image-side surface 154 of the fifth lens 150, through which the optical axis passes, to a point where the inflection point on the image-side surface 154, which is the second closest to the optical axis, projects on the optical axis.

The fifth lens 150 satisfies SGI513=0 mm; SGI523=0 mm; |SGI513|/(|SGI513|+TP5)=0; |SGI523|/(|SGI523|+TP5)=0, where SGI513 is a displacement on the optical axis from a point on the object-side surface 152 of the fifth lens 150, through which the optical axis passes, to a point where the inflection point on the object-side surface 152, which is the third closest to the optical axis, projects on the optical axis, and SGI523 is a displacement on the optical axis from a point on the image-side surface 154 of the fifth lens 150, through which the optical axis passes, to a point where the inflection point on the image-side surface 154, which is the third closest to the optical axis, projects on the optical axis.

The fifth lens 150 satisfies SGI514=0 mm; SGI524=0 mm; |SGI514|/(|SGI514|+TP5)=0; |SGI524|/(|SGI524|+TP5)=0, where SGI514 is a displacement on the optical axis from a point on the object-side surface 152 of the fifth lens 150, through which the optical axis passes, to a point where the inflection point on the object-side surface 152, which is the fourth closest to the optical axis, projects on the optical axis, and SGI524 is a displacement on the optical axis from a point on the image-side surface 154 of the fifth lens 150, through which the optical axis passes, to a point where the inflection point on the image-side surface 154, which is the fourth closest to the optical axis, projects on the optical axis.

The fifth lens 150 further satisfies HIF511=0.28212 mm; HIF521=2.13850 mm; HIF511/HOI=0.05642; HIF521/HOI=0.42770, where HIF511 is a distance perpendicular to the optical axis between the inflection point on the object-side surface 152 of the fifth lens 150, which is the closest to the optical axis, and the optical axis; HIF521 is a distance perpendicular to the optical axis between the inflection point on the image-side surface 154 of the fifth lens 150, which is the closest to the optical axis, and the optical axis.

The fifth lens 150 further satisfies HIF512=2.51384 mm; HIF512/HOI=0.50277, where HIF512 is a distance perpendicular to the optical axis between the inflection point on the object-side surface 152 of the fifth lens 150, which is the second closest to the optical axis, and the optical axis; HIF522 is a distance perpendicular to the optical axis between the inflection point on the image-side surface 154 of the fifth lens 150, which is the second closest to the optical axis, and the optical axis.

The fifth lens 150 further satisfies HIF513=0 mm; HIF513/HOI=0; HIF523=0 mm; HIF523/HOI=0, where HIF513 is a distance perpendicular to the optical axis between the inflection point on the object-side surface 152 of the fifth lens 150, which is the third closest to the optical axis, and the optical axis; HIF523 is a distance perpendicular to the optical axis between the inflection point on the image-side surface 154 of the fifth lens 150, which is the third closest to the optical axis, and the optical axis.

The fifth lens 150 further satisfies HIF514=0 mm; HIF514/HOI=0; HIF524=0 mm; HIF524/HOI=0, where HIF514 is a distance perpendicular to the optical axis between the inflection point on the object-side surface 152 of the fifth lens 150, which is the fourth closest to the optical axis, and the optical axis; HIF524 is a distance perpendicular to the optical axis between the inflection point on the image-side surface 154 of the fifth lens 150, which is the fourth closest to the optical axis, and the optical axis.

The sixth lens 160 has negative refractive power and is made of plastic. An object-side surface 162, which faces the object side, is a concave surface, and an image-side surface 164, which faces the image side, is a concave surface. The object-side surface 162 has two inflection points, and the image-side surface 164 has an inflection point. Whereby, the incident angle of each view field entering the sixth lens 160 could be effectively adjusted to improve aberration. A profile curve length of the maximum effective half diameter of the object-side surface 162 of the sixth lens 160 is denoted by ARS61, and a profile curve length of the maximum effective half diameter of the image-side surface 164 of the sixth lens 160 is denoted by ARS62. A profile curve length of a half of the entrance pupil diameter (HEP) of the object-side surface 162 of the sixth lens 160 is denoted by ARE61, and a profile curve length of a half of the entrance pupil diameter (HEP) of the image-side surface 164 of the sixth lens 160 is denoted by ARS62. A thickness of the sixth lens 160 on the optical axis is denoted by TP6.

The sixth lens 160 satisfies SGI611=−0.38558 mm; SGI621=0.12386 mm; |SGI611|/(|SGI611|+TP6)=0.27212; |SGI621|/(|SGI621|+TP6)=0.10722, where SGI611 is a displacement on the optical axis from a point on the object-side surface 162 of the sixth lens 160, through which the optical axis passes, to a point where the inflection point on the object-side surface 162, which is the closest to the optical axis, projects on the optical axis, and SGI621 is a displacement on the optical axis from a point on the image-side surface 164 of the sixth lens 160, through which the optical axis passes, to a point where the inflection point on the image-side surface 164, which is the closest to the optical axis, projects on the optical axis.

The sixth lens 160 satisfies SGI612=−0.47400 mm; |SGI612|/(|SGI612|+TP6)=0.31488; SGI622=0 mm; |SGI622|/(|SGI622|+TP6)=0, where SGI612 is a displacement on the optical axis from a point on the object-side surface 162 of the sixth lens 160, through which the optical axis passes, to a point where the inflection point on the object-side surface 162, which is the second closest to the optical axis, projects on the optical axis, and SGI622 is a displacement on the optical axis from a point on the image-side surface 164 of the sixth lens 160, through which the optical axis passes, to a point where the inflection point on the image-side surface 164, which is the second closest to the optical axis, projects on the optical axis.

The sixth lens 160 further satisfies HIF611=2.24283 mm; HIF621=1.07376 mm; HIF611/HOI=0.44857; HIF621/HOI=0.21475, where HIF611 is a distance perpendicular to the optical axis between the inflection point on the object-side surface 162 of the sixth lens 160, which is the closest to the optical axis, and the optical axis; HIF621 is a distance perpendicular to the optical axis between the inflection point on the image-side surface 164 of the sixth lens 160, which is the closest to the optical axis, and the optical axis.

The sixth lens 160 further satisfies HIF612=2.48895 mm; HIF612/HOI=0.49779, where HIF612 is a distance perpendicular to the optical axis between the inflection point on the object-side surface 162 of the sixth lens 160, which is the second closest to the optical axis, and the optical axis; HIF622 is a distance perpendicular to the optical axis between the inflection point on the image-side surface 164 of the sixth lens 160, which is the second closest to the optical axis, and the optical axis.

The sixth lens 160 further satisfies HIF613=0 mm; HIF613/HOI=0; HIF623=0 mm; HIF623/HOI=0, where HIF613 is a distance perpendicular to the optical axis between the inflection point on the object-side surface 162 of the sixth lens 160, which is the third closest to the optical axis, and the optical axis; HIF623 is a distance perpendicular to the optical axis between the inflection point on the image-side surface 164 of the sixth lens 160, which is the third closest to the optical axis, and the optical axis.

The sixth lens 160 further satisfies HIF614=0 mm; HIF614/HOI=0; HIF624=0 mm; HIF624/HOI=0, where HIF614 is a distance perpendicular to the optical axis between the inflection point on the object-side surface 162 of the sixth lens 160, which is the fourth closest to the optical axis, and the optical axis; HIF624 is a distance perpendicular to the optical axis between the inflection point on the image-side surface 164 of the sixth lens 160, which is the fourth closest to the optical axis, and the optical axis.

The infrared rays filter 180 is made of glass and is disposed between the sixth lens 160 and the image plane 190. The infrared rays filter 180 gives no contribution to the focal length of the optical image capturing module.

The optical image capturing module 10 of the first optical embodiment has the following parameters, which are f=4.075 mm; f/HEP=1.4; HAF=50.001 degrees; and tan(HAF)=1.1918, where f is a focal length of the lens group; HAF is a half of the maximum field angle; and HEP is an entrance pupil diameter.

The parameters of the lenses of the first optical embodiment are f1=−7.828 mm; |f/f1|=0.52060; f6=−4.886; and |f1|>f6, where f1 is a focal length of the first lens 110; and f6 is a focal length of the sixth lens 160.

The first optical embodiment further satisfies |f2|+|f3|+|f4|+|f5|=95.50815; |f1|+|f6|=12.71352 and |f2|+|f3|+|f4|+|f5|>|f1|+|f6|, where f2 is a focal length of the second lens 120, f3 is a focal length of the third lens 130, f4 is a focal length of the fourth lens 140, f5 is a focal length of the fifth lens 150.

The optical image capturing module 10 of the first optical embodiment further satisfies ΣPPR=f/f2+f/f4+f/f5=1.63290; ΣNPR=|f1|+|f/3|+|f/f6|=1.51305; ΣPPR/|ΣNPR|=1.07921; |f/2|=0.69101; |f/f3|=0.15834; |f/f4|=0.06883; |f/f5|=0.87305; and |f/f6|=0.83412, where PPR is a ratio of a focal length f of the optical image capturing module to a focal length fp of each of the lenses with positive refractive power; and NPR is a ratio of a focal length f of the optical image capturing module to a focal length fn of each of lenses with negative refractive power.

The optical image capturing module 10 of the first optical embodiment further satisfies InTL+BFL=HOS; HOS=19.54120 mm; HOI=5.0 mm; HOS/HOI=3.90824; HOS/f=4.7952; InS=11.685 mm; InTL/HOS=0.9171; and InS/HOS=0.59794, where InTL is a distance between the object-side surface 112 of the first lens 110 and the image-side surface 164 of the sixth lens 160; HOS is a height of the image capturing system, i.e. a distance between the object-side surface 112 of the first lens 110 and the image plane 190; InS is a distance between the aperture 100 and the image plane 190; HOI is a half of a diagonal of an effective sensing area of the image sensor 192, i.e., the maximum image height; and BFL is a distance between the image-side surface 164 of the sixth lens 160 and the image plane 190.

The optical image capturing module 10 of the first optical embodiment further satisfies ΣTP=8.13899 mm; and ΣTP/InTL=0.52477, where ΣTP is a sum of the thicknesses of the lenses 110-160 with refractive power. It is helpful for the contrast of image and yield rate of manufacture and provides a suitable back focal length for installation of other elements.

The optical image capturing module 10 of the first optical embodiment further satisfies |R1/R2|=8.99987, where R1 is a radius of curvature of the object-side surface 112 of the first lens 110, and R2 is a radius of curvature of the image-side surface 114 of the first lens 110. It provides the first lens 110 with a suitable positive refractive power to reduce the increase rate of the spherical aberration.

The optical image capturing module 10 of the first optical embodiment further satisfies (R11−R12)/(R11+R12)=1.27780, where R11 is a radius of curvature of the object-side surface 162 of the sixth lens 160, and R12 is a radius of curvature of the image-side surface 164 of the sixth lens 160. It may modify the astigmatic field curvature.

The optical image capturing module 10 of the first optical embodiment further satisfies ΣPP=f2+f4+f5=69.770 mm; and f5/(f2+f4+f5)=0.067, where ΣPP is a sum of the focal lengths fp of each lens with positive refractive power. It is helpful to share the positive refractive power of a single lens to other positive lenses to avoid the significant aberration caused by the incident rays.

The optical image capturing module 10 of the first optical embodiment further satisfies ΣNP=f1+f3+f6=−38.451 mm; and f6/(f1+f3+f6)=0.127, where ΣNP is a sum of the focal lengths fn of each lens with negative refractive power. It is helpful to share the negative refractive power of the sixth lens 160 to the other negative lens, which avoid the significant aberration caused by the incident rays.

The optical image capturing module 10 of the first optical embodiment further satisfies IN12=6.418 mm; IN12/f=1.57491, where IN12 is a distance on the optical axis between the first lens 110 and the second lens 120. It may correct chromatic aberration and improve the performance.

The optical image capturing module 10 of the first optical embodiment further satisfies IN56=0.025 mm; IN56/f=0.00613, where IN56 is a distance on the optical axis between the fifth lens 150 and the sixth lens 160. It may correct chromatic aberration and improve the performance.

The optical image capturing module 10 of the first optical embodiment further satisfies TP1=1.934 mm; TP2=2.486 mm; and (TP1+IN12)/TP2=3.36005, where TP1 is a central thickness of the first lens 110 on the optical axis, and TP2 is a central thickness of the second lens 120 on the optical axis. It may control the sensitivity of manufacture of the optical image capturing module and improve the performance.

The optical image capturing module 10 of the first optical embodiment further satisfies TP5=1.072 mm; TP6=1.031 mm; and (TP6+IN56)/TP5=0.98555, where TP5 is a central thickness of the fifth lens 150 on the optical axis, TP6 is a central thickness of the sixth lens 160 on the optical axis, and IN56 is a distance on the optical axis between the fifth lens 150 and the sixth lens 160. It may control the sensitivity of manufacture of the optical image capturing module and lower the total height of the optical image capturing module.

The optical image capturing module 10 of the first optical embodiment further satisfies IN34=0.401 mm; IN45=0.025 mm; and TP4/(IN34+TP4+IN45)=0.74376, where TP4 is a central thickness of the fourth lens 140 on the optical axis; IN34 is a distance on the optical axis between the third lens 130 and the fourth lens 140; IN45 is a distance on the optical axis between the fourth lens 140 and the fifth lens 150. It may help to slightly correct the aberration caused by the incident rays and lower the total height of the optical image capturing module.

The optical image capturing module 10 of the first optical embodiment further satisfies InRS51=−0.34789 mm; InRS52=−0.88185 mm; |InRS51|/TP5=0.32458; and |InRS52|/TP5=0.82276, where InRS51 is a displacement from a point on the object-side surface 152 of the fifth lens 150 passed through by the optical axis to a point on the optical axis where a projection of the maximum effective semi diameter of the object-side surface 152 of the fifth lens 150 ends; InRS52 is a displacement from a point on the image-side surface 154 of the fifth lens 150 passed through by the optical axis to a point on the optical axis where a projection of the maximum effective semi diameter of the image-side surface 154 of the fifth lens 150 ends; and TP5 is a central thickness of the fifth lens 150 on the optical axis. It is helpful for manufacturing and shaping of the lenses and is helpful to reduce the size.

The optical image capturing module 10 of the first optical embodiment further satisfies HVT51=0.515349 mm; and HVT52=0 mm, where HVT51 is a distance perpendicular to the optical axis between the critical point on the object-side surface 152 of the fifth lens 150 and the optical axis; and HVT52 is a distance perpendicular to the optical axis between the critical point on the image-side surface 154 of the fifth lens 150 and the optical axis.

The optical image capturing module 10 of the first optical embodiment further satisfies InRS61=−0.58390 mm; InRS62=0.41976 mm; |InRS61|/TP6=0.56616; and |InRS62|/TP6=0.40700, where InRS61 is a displacement from a point on the object-side surface 162 of the sixth lens 160 passed through by the optical axis to a point on the optical axis where a projection of the maximum effective semi diameter of the object-side surface 162 of the sixth lens 160 ends; InRS62 is a displacement from a point on the image-side surface 164 of the sixth lens 160 passed through by the optical axis to a point on the optical axis where a projection of the maximum effective semi diameter of the image-side surface 164 of the sixth lens 160 ends; and TP6 is a central thickness of the sixth lens 160 on the optical axis. It is helpful for manufacturing and shaping of the lenses and is helpful to reduce the size.

The optical image capturing module 10 of the first optical embodiment satisfies HVT61=0 mm; and HVT62=0 mm, where HVT61 is a distance perpendicular to the optical axis between the critical point on the object-side surface 162 of the sixth lens 160 and the optical axis; and HVT62 is a distance perpendicular to the optical axis between the critical point on the image-side surface 164 of the sixth lens 160 and the optical axis.

The optical image capturing module 10 of the first optical embodiment satisfies HVT51/HOI=0.1031. It is helpful for correction of the aberration of the peripheral view field of the optical image capturing module.

The optical image capturing module 10 of the first optical embodiment satisfies HVT51/HOS=0.02634. It is helpful for correction of the aberration of the peripheral view field of the optical image capturing module.

The second lens 120, the third lens 130, and the sixth lens 160 have negative refractive power. The optical image capturing module 10 of the first optical embodiment further satisfies NA6/NA2≤1, where NA2 is an Abbe number of the second lens 120; NA3 is an Abbe number of the third lens 130; and NA6 is an Abbe number of the sixth lens 160. It may correct the aberration of the optical image capturing module.

The optical image capturing module 10 of the first optical embodiment further satisfies |TDT|=2.124%; |ODT|=5.076%, where TDT is TV distortion; and ODT is optical distortion.

The optical image capturing module 10 of the first optical embodiment further satisfies LS=12 mm; PhiA=2*(EHD62)= 6.726 mm, where EHD62 is a maximum effective half diameter of the image-side surface 164 of the sixth lens 160.

The parameters of the lenses of the first optical embodiment are listed in Table 1 and Table 2.

TABLE 1 f = 4.075 mm; f/HEP = 1.4, HAF = 50.000 deg

| Surface | Radius of curvature (mm) | Thickness (mm) | Material | Refractive index | Abbe number | Focal length (mm) |
|---|---|---|---|---|---|---|
| 0 | Object plane | plane | | | | |
| 1 | $1^{st}$ lens −40.99625704 | 1.934 | plastic | 1.515 | 56.55 | −7.828 |
| 2 | 4.555209289 | 5.923 | | | | |
| 3 | Aperture plane | 0.495 | | | | |
| 4 | $2^{nd}$ lens 5.333427366 | 2.486 | plastic | 1.544 | 55.96 | 5.897 |
| 5 | −6.781659971 | 0.502 | | | | |
| 6 | $3^{rd}$ lens −5.697794287 | 0.380 | plastic | 1.642 | 22.46 | −25.738 |
| 7 | −8.883957518 | 0.401 | | | | |
| 8 | $4^{th}$ lens 13.19225664 | 1.236 | plastic | 1.544 | 55.96 | 59.205 |
| 9 | 21.55681832 | 0.025 | | | | |
| 10 | $5^{th}$ lens 8.987806345 | 1.072 | plastic | 1.515 | 56.55 | 4.668 |
| 11 | −3.158875374 | 0.025 | | | | |
| 12 | $6^{th}$ lens −29.46491425 | 1.031 | plastic | 1.642 | 22.46 | −4.886 |
| 13 | 3.593484273 | 2.412 | | | | |
| 14 | Infrared rays filter plane | 0.200 | | 1.517 | 64.13 | |
| 15 | plane | 1.420 | | | | |
| 16 | Image plane plane | | | | | |

Reference wavelength (d-line): 555 mm; the position of blocking light: the effective half diameter of the clear aperture of the first surface is 5.800 mm; the effective diameter of the clear aperture of the third surface is 1.570 mm; the effective diameter of the clear aperture of the fifth surface is 1.950 mm.

TABLE 2

Coefficients of the aspheric surfaces

| Surface | 1 | 2 | 3 | 4 | 5 | 6 | 8 |
|---|---|---|---|---|---|---|---|
| k | 4.707622E+01 | −4.310876E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| Surface | 9 | 10 | 11 | 12 | 13 |
|---|---|---|---|---|---|
| k | 6.200000E+01 | −2.114008E+01 | −7.699905E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |

TABLE 2-continued

| Coefficients of the aspheric surfaces | | | | | |
|---|---|---|---|---|---|
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The figures related to the profile curve lengths obtained based on Table 1 and Table 2 are listed in the following table:

| First optical embodiment (Reference wavelength (d-line): 555 mm) | | | | | | |
|---|---|---|---|---|---|---|
| ARE | 1/2(HEP) | ARE value | ARE−1/2(HEP) | 2(ARE/HEP) % | TP | ARE ITP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |
| ARS | EHD | ARS value | ARS−EHD | (ARS/EHD) % | TP | ARS/TP (%) |
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

The detail parameters of the first optical embodiment are listed in Table 1, in which the unit of the radius of curvature, thickness, and focal length are millimeter, and surface 0-16 indicates the surfaces of all elements in the system in sequence from the object side to the image side. Table 2 is the list of coefficients of the aspheric surfaces, in which k indicates the taper coefficient in the aspheric curve equation, and A1-A20 indicate the coefficients of aspheric surfaces from the first order to the twentieth order of each aspheric surface. The following optical embodiments have similar diagrams and tables, which are the same as those of the first optical embodiment, so we do not describe it again. The definitions of the mechanism component parameters of the following optical embodiments are the same as those of the first optical embodiment.

Second Optical Embodiment

Figure 3A:
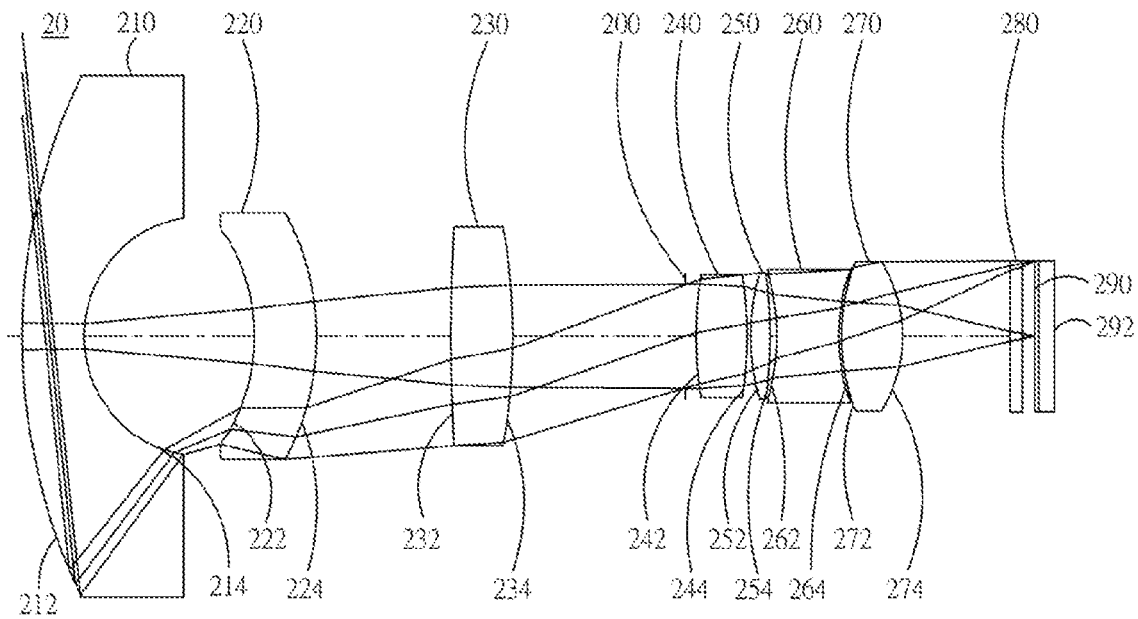
FIG. 3A is a schematic diagram of a second optical embodiment of the present invention.
Figure 3B:
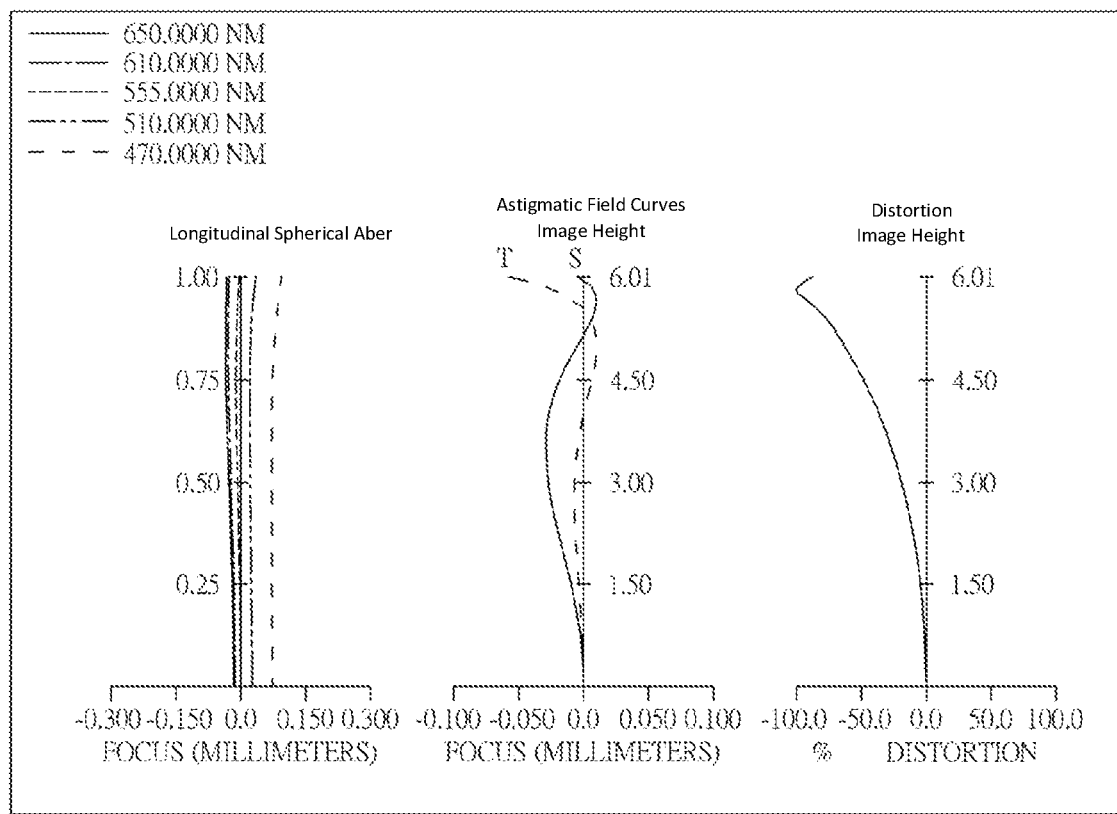
FIG. 3B shows curve diagrams of longitudinal spherical aberration, astigmatic field, and optical distortion of the optical image capturing module in the order from left to right of the second optical embodiment of the present application.

As shown in FIG. 3A and FIG. 3B, an optical image capturing module 20 of the second optical embodiment of the present invention includes, along an optical axis from an object side to an image side, a first lens 210, a second lens 220, a third lens 230, an aperture 200, a fourth lens 240, a fifth lens 250, a sixth lens 260, a seventh lens 270, an infrared rays filter 280, an image plane 290, and an image sensor 292.

The first lens 210 has negative refractive power and is made of glass. An object-side surface 212 thereof, which faces the object side, is a convex spherical surface, and an image-side surface 214 thereof, which faces the image side, is a concave spherical surface.

The second lens 220 has negative refractive power and is made of glass. An object-side surface 222 thereof, which faces the object side, is a concave spherical surface, and an image-side surface 224 thereof, which faces the image side, is a convex spherical surface.

The third lens 230 has positive refractive power and is made of glass. An object-side surface 232, which faces the object side, is a convex spherical surface, and an image-side surface 234, which faces the image side, is a convex spherical surface.

The fourth lens 240 has positive refractive power and is made of glass. An object-side surface 242, which faces the object side, is a convex spherical surface, and an image-side surface 244, which faces the image side, is a convex spherical surface.

The fifth lens 250 has positive refractive power and is made of glass. An object-side surface 252, which faces the object side, is a convex aspherical surface, and an image-side surface 254, which faces the image side, is a convex aspherical surface.

The sixth lens 260 has negative refractive power and is made of glass. An object-side surface 262, which faces the object side, is a concave aspherical surface, and an image-side surface 264, which faces the image side, is a concave aspherical surface. Whereby, the incident angle of each view field entering the sixth lens 260 could be effectively adjusted to improve aberration.

The seventh lens 270 has negative refractive power and is made of glass. An object-side surface 272, which faces the object side, is a convex surface, and an image-side surface 274, which faces the image side, is a convex surface. It may help to shorten the back focal length to keep small in size, and may reduce an incident angle of the light of an off-axis field of view and correct the aberration of the off-axis field of view.

The infrared rays filter 280 is made of glass and is disposed between the seventh lens 270 and the image plane 290. The infrared rays filter 280 gives no contribution to the focal length of the optical image capturing module 20.

The parameters of the lenses of the second optical embodiment are listed in Table 3 and Table 4.

TABLE 3 f = 4.7601 mm; f/HEP = 2.2; HAF = 95.98 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 1E+18 | | | | |
| 1 | 1st lens | 47.71478323 | 4.977 | glass | 2.001 | 29.13 | −12.647 |
| 2 | | 9.527614761 | 13.737 | | | | |
| 3 | 2nd lens | −14.88061107 | 5.000 | glass | 2.001 | 29.13 | −99.541 |
| 4 | | −20.42046946 | 10.837 | | | | |
| 5 | 3rd lens | 182.4762997 | 5.000 | glass | 1.847 | 23.78 | 44.046 |
| 6 | | −46.71963608 | 13.902 | | | | |
| 7 | Aperture | 1E+18 | 0.850 | | | | |
| 8 | 4th lens | 28.60018103 | 4.095 | glass | 1.834 | 37.35 | 19.369 |
| 9 | | −35.08507586 | 0.323 | | | | |
| 10 | 5th lens | 18.25991342 | 1.539 | glass | 1.609 | 46.44 | 20.223 |
| 11 | | −36.99028878 | 0.546 | | | | |
| 12 | 6th lens | −18.24574524 | 5.000 | glass | 2.002 | 19.32 | −7.668 |
| 13 | | 15.33897192 | 0.215 | | | | |
| 14 | 7th lens | 16.13218937 | 4.933 | glass | 1.517 | 64.20 | 13.620 |
| 15 | | −11.24007 | 8.664 | | | | |
| 16 | Infrared rays filter | 1E+18 | 1.000 | BK_7 | 1.517 | 64.2 | |
| 17 | | 1E+18 | 1.007 | | | | |
| 18 | Image plane | 1E+18 | −0.007 | | | | |

Reference wavelength (d-line): 555 nm

TABLE 4

Coefficients of the aspheric surfaces

| Surface | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

| Surface | 9 | 10 | 11 | 12 | 13 | 14 | 15 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

An equation of the aspheric surfaces of the second optical embodiment is the same as that of the first optical embodiment, and the definitions are the same as well.

The exact parameters of the second optical embodiment based on Table 3 and Table 4 are listed in the following table:

| Second optical embodiment (Reference wavelength: 555 nm) | | | | | |
|---|---|---|---|---|---|
| \|f/f1\| | \|f/f2\| | \|f/f3\| | \|f/f4\| | \|f/f5\| | \|f/f6\| |
| 0.3764 | 0.0478 | 0.1081 | 0.2458 | 0.2354 | 0.6208 |
| \|f/f7\| | ΣPPR | ΣNPR | ΣPPR/\|ΣNPR\| | IN12/f | IN67/f |
| 0.3495 | 1.3510 | 0.6327 | 2.1352 | 2.8858 | 0.0451 |
| \|f1/f2\| | \|f2/f3\| | (TP1 + IN12)/TP2 | | (TP7 + IN67)/TP6 | |
| 0.1271 | 2.2599 | 3.7428 | | 1.0296 | |
| HOS | InTL | HOS/HOI | InS/HOS | ODT % | TDT % |
| 81.6178 | 70.9539 | 13.6030 | 0.3451 | −113.2790 | 84.4806 |
| HVT11 | HVT12 | HVT21 | HVT22 | HV131 | HVT32 |
| 0.0000 | 0.0000 | 0.0000 | 0.0000 | 0.0000 | 0.0000 |
| HV161 | HVT62 | HV171 | HVT72 | HVT72/HOI | HVT72/HOS |
| 0.0000 | 0.0000 | 0.0000 | 0.0000 | 0.0000 | 0.0000 |
| PhiA | | | | | HOI |
| 11.962 mm | | | | | 6 mm |
| | | | | | InTL/HOS |
| | | | | | 0.8693 |
| PSTA | PLTA | NSTA | NLTA | SSTA | SLTA |
| 0.060 mm | −0.005 mm | 0.016 mm | 0.006 mm | 0.020 mm | −0.008 mm |

The figures related to the profile curve lengths obtained based on Table 3 and Table 4 are listed in the following table:

| Second optical embodiment (Reference wavelength: 555 nm) | | | | | | |
|---|---|---|---|---|---|---|
| ARE | 1/2(HEP) | ARE value | ARE-1/2(HEP) | 2(ARE/HEP) % | TP | ARE/TP (%) |
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |
| ARS | EHD | ARS value | ARS-EHD | (ARS/EHD) % | TP | ARS/TP (%) |
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The results of the equations of the second optical embodiment based on Table 3 and Table 4 are listed in the following table:

| Values related to the inflection points of the second optical embodiment (Reference wavelength: 555 nm) | | | | | | | |
|---|---|---|---|---|---|---|---|
| HIF111 | 0 | HIF111/HOI | 0 | SGH11 | 0 | \|SGI111\|/(\|SGI111\| + TP1) | 0 |

Third Optical Embodiment

Figure 4A:
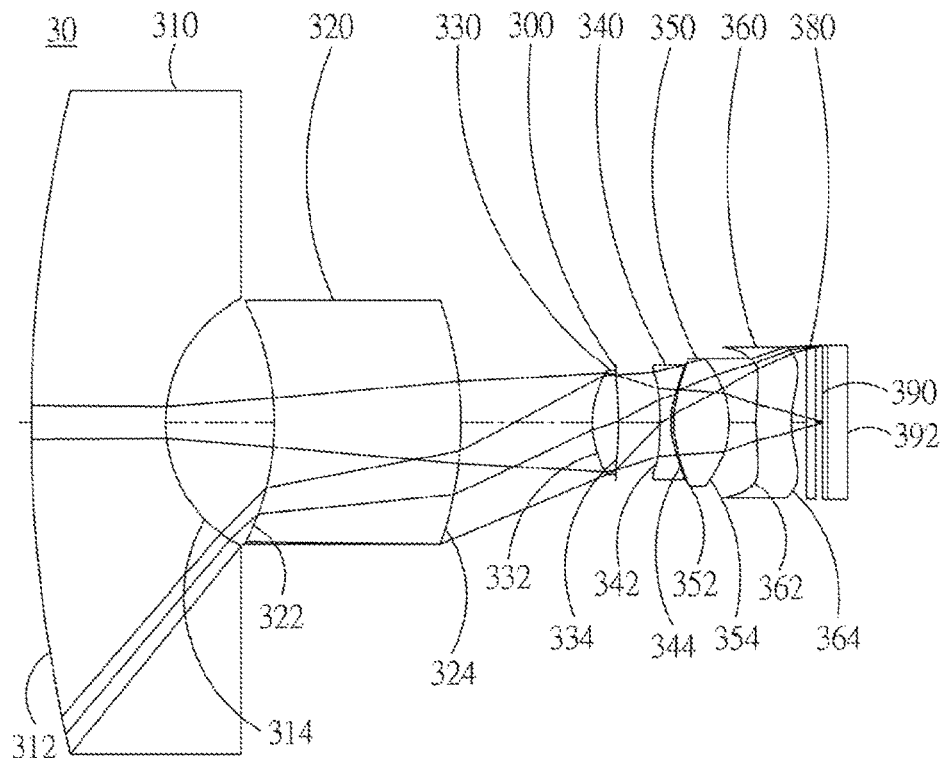
FIG. 4A is a schematic diagram of a third optical embodiment of the present invention.
Figure 4B:
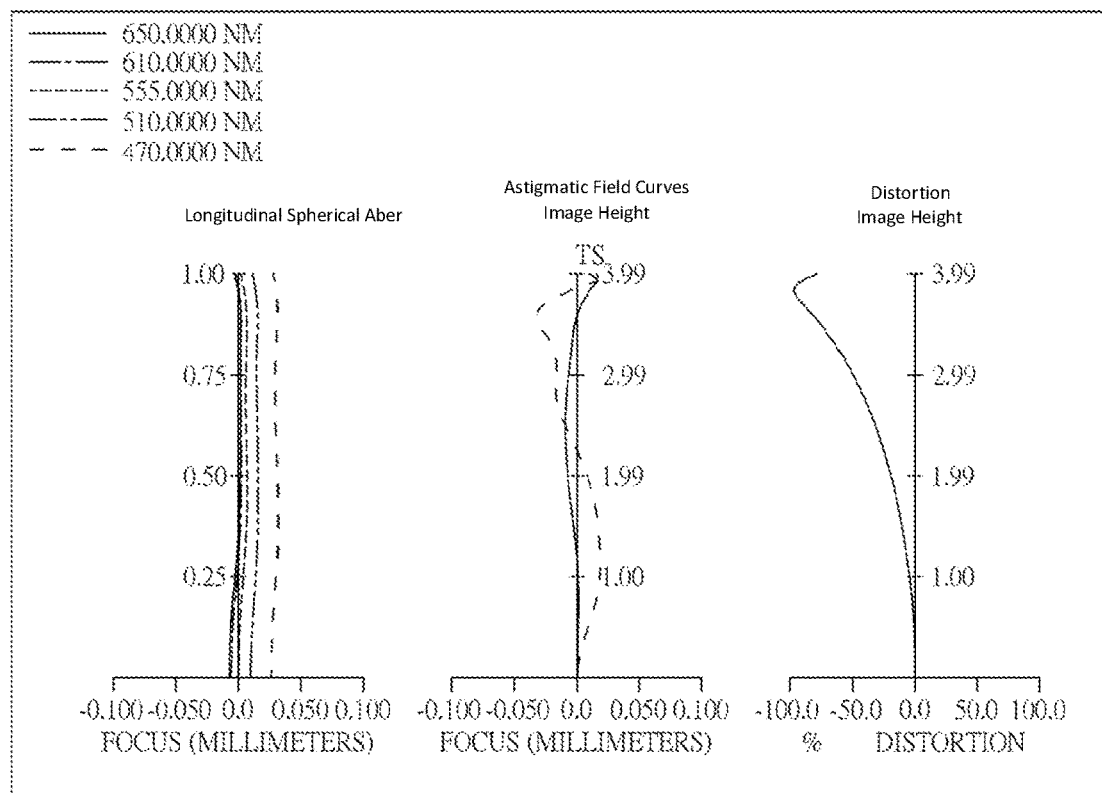
FIG. 4B shows curve diagrams of longitudinal spherical aberration, astigmatic field, and optical distortion of the optical image capturing module in the order from left to right of the third optical embodiment of the present application.

As shown in FIG. 4A and FIG. 4B, an optical image capturing module 30 of the third optical embodiment of the present invention includes, along an optical axis from an object side to an image side, a first lens 310, a second lens 320, a third lens 330, an aperture 300, a fourth lens 340, a fifth lens 350, a sixth lens 360, a seventh lens 370, an infrared rays filter 380, an image plane 390, and an image sensor 392.

The first lens 310 has negative refractive power and is made of glass. An object-side surface 312 thereof, which faces the object side, is a convex spherical surface, and an image-side surface 314 thereof, which faces the image side, is a concave spherical surface.

The second lens 320 has negative refractive power and is made of glass. An object-side surface 322 thereof, which faces the object side, is a concave spherical surface, and an image-side surface 324 thereof, which faces the image side, is a convex spherical surface.

The third lens 330 has positive refractive power and is made of plastic. An object-side surface 332 thereof, which faces the object side, is a convex aspheric surface, and an image-side surface 334 thereof, which faces the image side, is a convex aspheric surface. The image-side surface 334 has an inflection point.

The fourth lens 340 has negative refractive power and is made of plastic. An object-side surface 342, which faces the object side, is a concave aspheric surface, and an image-side surface 344, which faces the image side, is a concave aspheric surface. The image-side surface 344 has an inflection point.

The fifth lens 350 has positive refractive power and is made of plastic. An object-side surface 352, which faces the object side, is a convex aspheric surface, and an image-side surface 354, which faces the image side, is a convex aspheric surface.

The sixth lens 360 has negative refractive power and is made of plastic. An object-side surface 362, which faces the object side, is a convex aspheric surface, and an image-side surface 364, which faces the image side, is a concave aspheric surface. The object-side surface 362 has an inflection point, and the image-side surface 364 has an inflection point. It may help to shorten the back focal length to keep small in size. Whereby, the incident angle of each view field entering the sixth lens 360 could be effectively adjusted to improve aberration.

The infrared rays filter 380 is made of glass and is disposed between the sixth lens 360 and the image plane 390. The infrared rays filter 390 gives no contribution to the focal length of the optical image capturing module 30.

The parameters of the lenses of the third optical embodiment are listed in Table 5 and Table 6.

TABLE 5 f = 2.808 mm; f/HEP = 1.6; HAF = 100 deg

| Surface | Radius of curvature (mm) | Thickness (mm) | Material | Refractive index | Abbe number | Focal length (mm) |
|---|---|---|---|---|---|---|
| 0 | Object | 1E+18 | 1E+18 | | | |
| 1 | 1$^{st}$ lens | 71.398124 | 7.214 | glass | 1.702 | 41.15 | -11.765 |
| 2 | | 7.117272355 | 5.788 | | | | |
| 3 | 2$^{nd}$ lens | -13.29213699 | 10.000 | glass | 2.003 | 19.32 | -4537.460 |
| 4 | | -18.37509887 | 7.005 | | | | |
| 5 | 3$^{rd}$ lens | 5.039114804 | 1.398 | plastic | 1.514 | 56.80 | 7.553 |
| 6 | | -15.53136631 | -0.140 | | | | |
| 7 | Aperture | 1E+18 | 2.378 | | | | |
| 8 | 4$^{th}$ lens | -18.68613609 | 0.577 | plastic | 1.661 | 20.40 | -4.978 |
| 9 | | 4.086545927 | 0.141 | | | | |
| 10 | 5$^{th}$ lens | 4.927609282 | 2.974 | plastic | 1.565 | 58.00 | 4.709 |
| 11 | | -4.551946605 | 1.389 | | | | |
| 12 | 6$^{th}$ lens | 9.184876531 | 1.916 | plastic | 1.514 | 56.80 | -23.405 |
| 13 | | 4.845500046 | 0.800 | | | | |
| 14 | Infrared rays filter | 1E+18 | 0.500 | BK_7 | 1.517 | 64.13 | |
| 15 | | 1E+18 | 0.371 | | | | |
| 16 | Image plane | 1E+18 | 0.005 | | | | |

Reference wavelength (d-line): 555 nm; the position of blocking light: none.

TABLE 6

| Coefficients of the aspheric surfaces | | | | | | |
|---|---|---|---|---|---|---|
| Surface | 1 | 2 | 3 | 4 | 5 | 6 |
| k | 0.000000E+00 | 0.000000E+00 | 0.000000E+00 | 0.000000E+00 | 1.318519E−01 | 3.120384E+00 |
| A4 | 0.000000E+00 | 0.000000E+00 | 0.000000E+00 | 0.000000E+00 | 6.405246E−05 | 2.103942E−03 |
| A6 | 0.000000E+00 | 0.000000E+00 | 0.000000E+00 | 0.000000E+00 | 2.278341E−05 | −1.050629E−04 |
| A8 | 0.000000E+00 | 0.000000E+00 | 0.000000E+00 | 0.000000E+00 | −3.672908E−06 | 6.168906E−06 |
| A10 | 0.000000E+00 | 0.000000E+00 | 0.000000E+00 | 0.000000E+00 | 3.748457E−07 | −1.224682E−07 |
| Surface | 8 | 9 | 10 | 11 | 12 | 13 |
| k | −1.494442E+01 | 2.744228E−02 | −7.864013E+00 | −2.263702E+00 | −4.206923E+01 | −7.030803E+00 |
| A4 | −1.598286E−03 | −7.291825E−03 | 1.405243E−04 | −3.919567E−03 | −1.679499E−03 | −2.640099E−03 |
| A6 | −9.177115E−04 | 9.730714E−05 | 1.837602E−04 | 2.683449E−04 | −3.518520E−04 | −4.507651E−05 |
| A8 | 1.011405E−04 | 1.101816E−06 | −2.173368E−05 | −1.229452E−05 | 5.047353E−05 | −2.600391E−05 |
| A10 | −4.919835E−06 | −6.849076E−07 | 7.328496E−07 | 4.222621E−07 | −3.851055E−06 | 1.161811E−06 |

An equation of the aspheric surfaces of the third optical embodiment is the same as that of the first optical embodiment, and the definitions are the same as well.

The exact parameters of the third optical embodiment based on Table 5 and Table 6 are listed in the following table:

| Third optical embodiment (Reference wavelength: 555 nm) | | | | | |
|---|---|---|---|---|---|
| \|f/f1\| | \|f/f2\| | \|f/f3\| | \|f/f4\| | \|f/f5\| | \|f/f6\| |
| 0.23865 | 0.00062 | 0.37172 | 0.56396 | 0.59621 | 0.11996 |
| ΣPPR | ΣNPR | ΣPPR/\|ΣNPR\| | IN12/f | IN56/f | TP4/(IN34 + TP4 + IN45) |
| 1.77054 | 0.12058 | 14.68400 | 2.06169 | 0.49464 | 0.19512 |
| \|f1/f2\| | \|f2/f3\| | (TP1 + IN12)/ IP2 | | (TP6 + IN56)/TP5 | |
| 0.00259 | 600.74778 | 1.30023 | | 1.11131 | |
| HOS | InTL | HOS/HOI | InS/HOS | ODT % | TDT % |
| 42.31580 | 40.63970 | 10.57895 | 0.26115 | −122.32700 | 93.33510 |
| HVT51 | HVT52 | HVT61 | HVT62 | HVT62/HOI | HVT62/HOS |
| 0 | 0 | 2.22299 | 2.60561 | 0.65140 | 0.06158 |
| TP2/TP3 | TP3/TP4 | InRS61 | InRS62 | \|InRS61\|/TP6 | \|InRS62\|/TP6 |
| 7.15374 | 2.42321 | −0.20807 | −0.24978 | 0.10861 | 0.13038 |
| PhiA | | | | | HOI |
| 6.150 mm | | | | | 4 mm |
| | | | | | InTL/HOS |
| | | | | | 0.9604 |
| PSTA | PLTA | NSTA | NLTA | SSTA | SLTA |
| 0.014 mm | 0.002 mm | −0.003 mm | −0.002 mm | 0.011 mm | −0.001 mm |

The figures related to the profile curve lengths obtained based on Table 5 and Table 6 are listed in the following table:

| Third optical embodiment (Reference wavelength: 555 nm) | | | | | | |
|---|---|---|---|---|---|---|
| ARE | 1/2(HEP) | ARE value | ARE−1/2(HEP) | 2(ARE/HEP) % | TP | ARE/TP (%) |
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |
| 62 | 0.877 | 0.881 | 0.00368 | 100.42% | 1.916 | 45.99% |
| ARS | EHD | ARS value | ARS−EHD | (ARS/EHD) % | TP | ARS/TP (%) |
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |

-continued

| Third optical embodiment (Reference wavelength: 555 nm) | | | | | |
|---|---|---|---|---|---|
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The results of the equations of the third optical embodiment based on Table 5 and Table 6 are listed in the following table:

| Values related to the inflection points of the third optical embodiment (Reference wavelength: 555 nm) | | | | | | |
|---|---|---|---|---|---|---|
| HIF321 | 2.0367 | HIF321/HOI | 0.5092 | SGI321 | −0.1056 | \|SGI321\|/(\|SGI321\| + TP3) | 0.0702 |
| HIF421 | 2.4635 | HIF421/HOI | 0.6159 | SGI421 | 0.5780 | \|SGI421\|/(\|SGI421\| + TP4) | 0.5005 |
| HIF611 | 1.2364 | HIF611/HOI | 0.3091 | SGI611 | 0.0668 | \|SGI611\|/(\|SGI611\| + TP6) | 0.0337 |
| HIF621 | 1.5488 | HIF621/HOI | 0.3872 | SGI621 | 0.2014 | \|SGI621\|/(\|SGI621\| + TP6) | 0.0951 |

Fourth Optical Embodiment

Figure 5A:
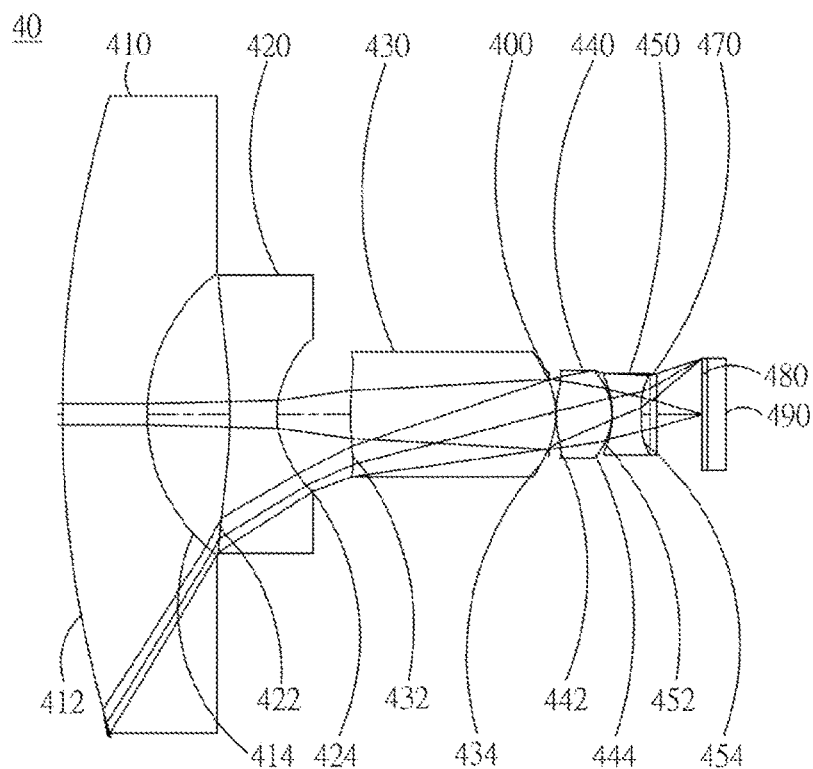
FIG. 5A is a schematic diagram of a fourth optical embodiment of the present invention.
Figure 5B:
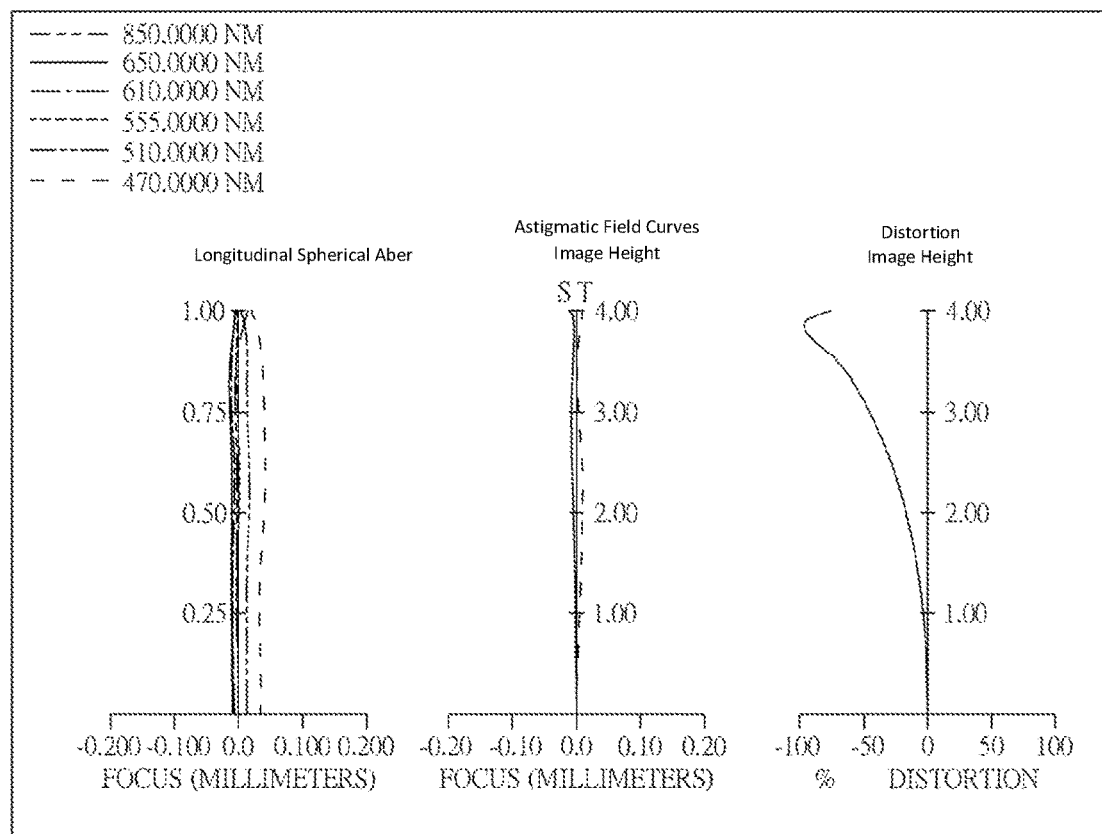
FIG. 5B shows curve diagrams of longitudinal spherical aberration, astigmatic field, and optical distortion of the optical image capturing module in the order from left to right of the fourth optical embodiment of the present application.

As shown in FIG. 5A and FIG. 5B, an optical image capturing module 40 of the fourth optical embodiment of the present invention includes, along an optical axis from an object side to an image side, a first lens 410, a second lens 420, an aperture 400, a third lens 430, a fourth lens 440, a fifth lens 450, an infrared rays filter 470, an image plane 480, and an image sensor 490.

The first lens 410 has negative refractive power and is made of glass. An object-side surface 412 thereof, which faces the object side, is a convex spherical surface, and an image-side surface 414 thereof, which faces the image side, is a concave spherical surface.

The second lens 420 has negative refractive power and is made of plastic. An object-side surface 422 thereof, which faces the object side, is a concave aspheric surface, and an image-side surface 424 thereof, which faces the image side, is a concave aspheric surface. The object-side surface 422 has an inflection point.

The third lens 430 has positive refractive power and is made of plastic. An object-side surface 432 thereof, which faces the object side, is a convex aspheric surface, and an image-side surface 434 thereof, which faces the image side, is a convex aspheric surface. The object-side surface 432 has an inflection point.

The fourth lens 440 has positive refractive power and is made of plastic. An object-side surface 442, which faces the object side, is a convex aspheric surface, and an image-side surface 444, which faces the image side, is a convex aspheric surface. The object-side surface 442 has an inflection point.

The fifth lens 450 has negative refractive power and is made of plastic. An object-side surface 452, which faces the object side, is a concave aspheric surface, and an image-side surface 454, which faces the image side, is a concave aspheric surface. The object-side surface 452 has two inflection points. It may help to shorten the back focal length to keep small in size.

The infrared rays filter 470 is made of glass and is disposed between the fifth lens 450 and the image plane 480. The infrared rays filter 470 gives no contribution to the focal length of the optical image capturing module 40.

The parameters of the lenses of the fourth optical embodiment are listed in Table 7 and Table 8.

TABLE 7

| f = 2.7883 mm; f/HEP = 1.8; HAF = 101 deg | | | | | | |
|---|---|---|---|---|---|---|
| Surface | | Radius of curvature (mm) | Thickness (mm) | Material | Refractive index | Abbe number | Focal length (mm) |
| 0 | Object | 1E+18 | 1E+18 | | | | |
| 1 | 1st lens | 76.84219 | 6.117399 | glass | 1.497 | 81.61 | −31.322 |
| 2 | | 12.62555 | 5.924382 | | | | |
| 3 | 2nd lens | −37.0327 | 3.429817 | plastic | 1.565 | 54.5 | −8.70843 |
| 4 | | 5.88556 | 5.305191 | | | | |
| 5 | 3rd lens | 17.99395 | 14.79391 | | | | |
| 6 | | −5.76903 | −0.4855 | plastic | 1.565 | 58 | 9.94787 |
| 7 | Aperture | 1E+18 | 0.535498 | | | | |
| 8 | 4th lens | 8.19404 | 4.011739 | plastic | 1.565 | 58 | 5.24898 |
| 9 | | −3.84363 | 0.050366 | | | | |
| 10 | 5th lens | −4.34991 | 2.088275 | plastic | 1.661 | 20.4 | −4.97515 |
| 11 | | 16.6609 | 0.6 | | | | |
| 12 | Infrared rays filter | 1E+18 | 0.5 | BK_7 | 1.517 | 64.13 | |

TABLE 7-continued f = 2.7883 mm; f/HEP = 1.8; HAF = 101 deg

| Surface | Radius of curvature (mm) | Thickness (mm) | Material | Refractive index | Abbe number | Focal length (mm) |
|---|---|---|---|---|---|---|
| 13 | 1E+18 | 3.254927 | | | | |
| 14 Image plane | 1E+18 | −0.00013 | | | | |

Reference wavelength (d-line): 555 nm.

TABLE 8

Coefficients of the aspheric surfaces

| Surface | 1 | 2 | 3 | 4 | 5 |
|---|---|---|---|---|---|
| k | 0.000000E+00 | 0.000000E+00 | 0.131249 | −0.069541 | −0.324555 |
| A4 | 0.000000E+00 | 0.000000E+00 | 3.99823E−05 | −8.55712E−04 | −9.07093E−04 |
| A6 | 0.000000E+00 | 0.000000E+00 | 9.03636E−08 | −1.96175E−06 | −1.02465E−05 |
| A8 | 0.000000E+00 | 0.000000E+00 | 1.91025E−09 | −1.39344E−08 | −8.18157E−08 |
| A10 | 0.000000E+00 | 0.000000E+00 | −1.18567E−11 | −4.17090E−09 | −2.42621E−09 |
| A12 | 0.000000E+00 | 0.000000E+00 | 0.000000E+00 | 0.000000E+00 | 0.000000E+00 |

| Surface | 6 | 8 | 9 | 10 | 11 |
|---|---|---|---|---|---|
| k | 0.009216 | −0.292346 | −0.18604 | −6.17195 | 27.541383 |
| A4 | 8.80963E−04 | −1.02138E−03 | 4.33629E−03 | 1.58379E−03 | 7.56932E−03 |
| A6 | 3.14497E−05 | −1.18559E−04 | −2.91588E−04 | 1.81549E−04 | 7.83858E−04 |
| A8 | −3.15863E−06 | 1.34404E−05 | 9.11419E−06 | −1.18213E−05 | 4.79120E−05 |
| A10 | 1.44613E−07 | −2.80681E−06 | 1.28365E−07 | 1.92716E−06 | −1.73591E−06 |
| A12 | 0.000000E+00 | 0.000000E+00 | 0.000000E+00 | 0.000000E+00 | 0.000000E+00 |

An equation of the aspheric surfaces of the fourth optical embodiment is the same as that of the first optical embodiment, and the definitions are the same as well.

The exact parameters of the fourth optical embodiment based on Table 7 and Table 8 are listed in the following table:

Fourth optical embodiment (Reference wavelength: 555 nm)

| |f/f1| | |f/f2| | |f/f3| | |f/f4| | |f/f5| | |f1/f2| |
|---|---|---|---|---|---|
| 0.08902 | 0.32019 | 0.28029 | 0.53121 | 0.56045 | 3.59674 |
| ΣPPR | ΣNPR | ΣPPR/|ΣNPR| | IN12/f | IN45/f | |f2/f3| |
| 1.4118 | 0.3693 | 3.8229 | 2.1247 | 0.0181 | 0.8754 |
| TP3/(IN23 + TP3 + IN34) | | (TP1 + IN12)/TP2 | | (TP5 + IN45)/TP4 | |
| 0.73422 | | 3.51091 | | 0.53309 | |
| HOS | InTL | HOS/HOI | InS/HOS | ODT % | TDT % |
| 46.12590 | 41.77110 | 11.53148 | 0.23936 | −125.266 | 99.1671 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| TP2/TP3 | TP3/TP4 | InRS51 | InRS52 | |InRS51|/TP5 | |InRS52|/TP5 |
| 0.23184 | 3.68765 | −0.679265 | 0.5369 | 0.32528 | 0.25710 |
| PhiA | | | | | HOI |
| 5.598 mm | | | | | 4 mm |
| | | | | | InTL/HOS |
| | | | | | 0.9056 |
| PSTA | PLTA | NSTA | NLTA | SSTA | SLTA |
| −0.011 mm | 0.005 mm | −0.010 mm | −0.003 mm | 0.005 mm | −0.00026 mm |

The figures related to the profile curve lengths obtained based on Table 7 and Table 8 are listed in the following table:

Fourth optical embodiment (Reference wavelength: 555 nm)

| ARE | 1/2(HEP) | ARE value | ARE-1/2(HEP) | 2(ARE/HEP) % | TP | ARE/TP (%) |
|---|---|---|---|---|---|---|
| 11 | 0.775 | 0.774 | −0.00052 | 99.93% | 6.117 | 12.65% |
| 12 | 0.775 | 0.774 | −0.00005 | 99.99% | 6.117 | 12.66% |

-continued

| Fourth optical embodiment (Reference wavelength: 555 nm) | | | | | |
|---|---|---|---|---|---|
| 21 | 0.775 | 0.774 | −0.00048 | 99.94% | 3.430 | 22.57% |
| 22 | 0.775 | 0.776 | 0.00168 | 100.22% | 3.430 | 22.63% |
| 31 | 0.775 | 0.774 | −0.00031 | 99.96% | 14.794 | 5.23% |
| 32 | 0.775 | 0.776 | 0.00177 | 100.23% | 14.794 | 5.25% |
| 41 | 0.775 | 0.775 | 0.00059 | 100.08% | 4.012 | 19.32% |
| 42 | 0.775 | 0.779 | 0.00453 | 100.59% | 4.012 | 19.42% |
| 51 | 0.775 | 0.778 | 0.00311 | 100.40% | 2.088 | 37.24% |
| 52 | 0.775 | 0.774 | −0.00014 | 99.98% | 2.088 | 37.08% |

| ARS | EHD | ARS value | ARS-EHD | (ARS/EHD) % | TP | ARS/TP (%) |
|---|---|---|---|---|---|---|
| 11 | 23.038 | 23.397 | 0.359 | 101.56% | 6.117 | 382.46% |
| 12 | 10.140 | 11.772 | 1.632 | 116.10% | 6.117 | 192.44% |
| 21 | 10.138 | 10.178 | 0.039 | 100.39% | 3.430 | 296.74% |
| 22 | 5.537 | 6.337 | 0.800 | 114.44% | 3.430 | 184.76% |
| 31 | 4.490 | 4.502 | 0.012 | 100.27% | 14.794 | 30.43% |
| 32 | 2.544 | 2.620 | 0.076 | 102.97% | 14.794 | 17.71% |
| 41 | 2.735 | 2.759 | 0.024 | 100.89% | 4.012 | 68.77% |
| 42 | 3.123 | 3.449 | 0.326 | 110.43% | 4.012 | 85.97% |
| 51 | 2.934 | 3.023 | 0.089 | 103.04% | 2.088 | 144.74% |
| 52 | 2.799 | 2.883 | 0.084 | 103.00% | 2.088 | 138.08% |

The results of the equations of the fourth optical embodiment based on Table 7 and Table 8 are listed in the following table:

| Values related to the inflection points of the fourth optical embodiment (Reference wavelength: 555 nm) | | | | | | | |
|---|---|---|---|---|---|---|---|
| HIF211 | 6.3902 | HIF211/HOI | 1.5976 | SGI211 | −0.4793 | \|SGI211\|/(\|SGI211\| + TP2) | 0.1226 |
| HIF311 | 2.1324 | HIF311/HOI | 0.5331 | SGI311 | 1.1069 | \|SGI311\|/(\|SGI311\| + TP3) | 0.0072 |
| HIF411 | 2.0278 | HIF411/HOI | 0.5070 | SGI411 | 0.2287 | \|SGI411\|/(\|SGI411\| + TP4) | 0.0539 |
| HIF511 | 2.6253 | HIF511/HOI | 0.6563 | SGI511 | −0.5681 | \|SGI511\|/(\|SGI511\| + TP5) | 0.2139 |
| HIF512 | 2.1521 | HIF512/HOI | 0.5380 | SGI512 | −0.8314 | \|SGI512\|/(\|SGI512\| + TP5) | 0.2848 |

Fifth Optical Embodiment

Figure 6A:
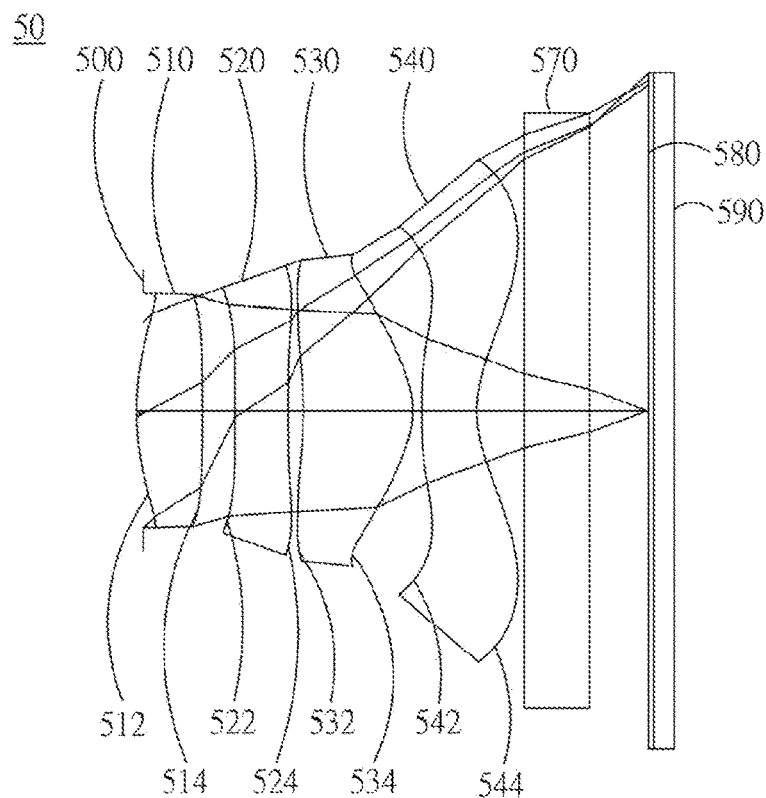
FIG. 6A is a schematic diagram of a fifth optical embodiment of the present invention.
Figure 6B:
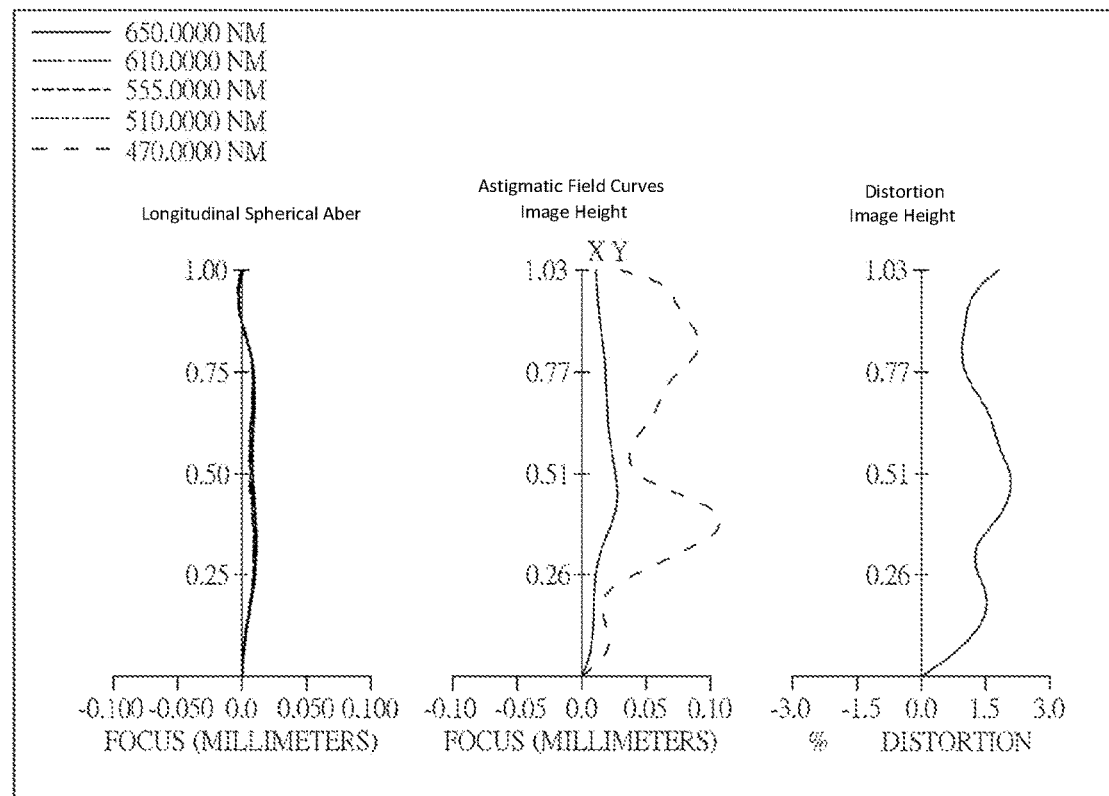
FIG. 6B shows curve diagrams of longitudinal spherical aberration, astigmatic field, and optical distortion of the optical image capturing module in the order from left to right of the fifth optical embodiment of the present application.

As shown in FIG. 6A and FIG. 6B, an optical image capturing module 50 of the fifth optical embodiment of the present invention includes, along an optical axis from an object side to an image side, an aperture 500, a first lens 510, a second lens 520, a third lens 530, a fourth lens 540, an infrared rays filter 570, an image plane 580, and an image sensor 590.

The first lens 510 has positive refractive power and is made of plastic. An object-side surface 512, which faces the object side, is a convex aspheric surface, and an image-side surface 514, which faces the image side, is a convex aspheric surface. The object-side surface 512 has an inflection point.

The second lens 520 has negative refractive power and is made of plastic. An object-side surface 522 thereof, which faces the object side, is a convex aspheric surface, and an image-side surface 524 thereof, which faces the image side, is a concave aspheric surface. The object-side surface 522 has two inflection points, and the image-side surface 524 has an inflection point.

The third lens 530 has positive refractive power and is made of plastic. An object-side surface 532, which faces the object side, is a concave aspheric surface, and an image-side surface 534, which faces the image side, is a convex aspheric surface. The object-side surface 532 has three inflection points, and the image-side surface 534 has an inflection point.

The fourth lens 540 has negative refractive power and is made of plastic. An object-side surface 542, which faces the object side, is a concave aspheric surface, and an image-side surface 544, which faces the image side, is a concave aspheric surface. The object-side surface 542 has two inflection points, and the image-side surface 544 has an inflection point.

The infrared rays filter 570 is made of glass and is disposed between the fourth lens 540 and the image plane 580. The infrared rays filter 570 gives no contribution to the focal length of the optical image capturing module 50.

The parameters of the lenses of the fifth optical embodiment are listed in Table 9 and Table 10.

TABLE 9

| f = 1.04102 mm; f/HEP = 1.4; HAF = 44.0346 deg | | | | | | |
|---|---|---|---|---|---|---|
| Surface | | Radius of curvature (mm) | Thickness (mm) | Material | Refractive index | Abbe number | Focal length (mm) |
| 0 | Object | 1E+18 | 600 | | | | |
| 1 | Aperture | 1E+18 | −0.020 | | | | |
| 2 | 1st lens | 0.890166851 | 0.210 | plastic | 1.545 | 55.96 | 1.587 |

TABLE 9-continued f = 1.04102 mm; f/HEP = 1.4; HAF = 44.0346 deg

| Surface | | Radius of curvature (mm) | Thickness (mm) | Material | Refractive index | Abbe number | Focal length (mm) |
|---|---|---|---|---|---|---|---|
| 3 | | −29.11040115 | −0.010 | | | | |
| 4 | | 1E+3018 | 0.116 | | | | |
| 5 | 2$^{nd}$ lens | 10.67765398 | 0.170 | plastic | 1.642 | 22.46 | −14.569 |
| 6 | | 4.977771922 | 0.049 | | | | |
| 7 | 3$^{rd}$ lens | −1.191436932 | 0.349 | plastic | 1.545 | 55.96 | 0.510 |
| 8 | | −0.248990674 | 0.030 | | | | |
| 9 | 4$^{th}$ lens | −38.08537212 | 0.176 | plastic | 1.642 | 22.46 | −0.569 |
| 10 | | 0.372574476 | 0.152 | | | | |
| 11 | | 1E+18 | 0.210 | BK_7 | 1.517 | 64.13 | 1E+18 |
| 12 | | 1E+18 | 0.185 | | | | 1E+18 |
| 13 | | 1E+18 | 0.005 | | | | 1E+18 |

Reference wavelength (d-line): 555 nm; the position of blocking light: the effective half diameter of the clear aperture of the fourth surface is 0.360 mm.

TABLE 10

Coefficients of the aspheric surfaces

| Surface | 2 | 3 | 5 | 6 |
|---|---|---|---|---|
| k | −1.106629E+00 | 2.994179E−07 | −7.788754E+01 | −3.440335E+01 |
| A4 | 8.291155E−01 | −6.401113E−01 | −4.958114E+00 | −1.875957E+00 |
| A6 | −2.398799E+01 | −1.265726E+01 | 1.299769E+02 | 8.568480E+01 |
| A8 | 1.825378E+02 | 8.457286E+01 | −2.736977E+02 | −1.279044E+03 |
| A10 | −6.211133E+02 | −2.157875E+02 | 2.908537E+04 | 8.661312E+03 |
| A12 | −4.719066E+02 | −6.203600E+02 | −1.499597E+05 | −2.875274E+04 |
| A14 | 0.000000E+00 | 0.000000E+00 | 2.992026E+05 | 3.764871E+04 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| Surface | 7 | 8 | 9 | 10 |
|---|---|---|---|---|
| k | −8.522097E−01 | −4.735945E+00 | −2.277155E+01 | −8.039778E−01 |
| A4 | −4.878227E−01 | −2.490377E+00 | 1.672704E+01 | −7.613206E+00 |
| A6 | 1.291242E+02 | 1.524149E+02 | −3.260722E+02 | 3.374046E+01 |
| A8 | −1.979689E+03 | −4.841033E+03 | 3.373231E+03 | −1.368453E+02 |
| A10 | 1.456076E+04 | 8.053747E+04 | −2.177676E+04 | 4.049486E+02 |
| A12 | −5.975920E+04 | −7.936887E+05 | 8.951687E+04 | −9.711797E+02 |
| A14 | 1.351676E+05 | 4.811528E+06 | −2.363737E+05 | 1.942574E+03 |
| A16 | −1.329001E+05 | −1.762293E+07 | 3.983151E+05 | −2.876356E+03 |
| A18 | 0.000000E+00 | 3.579891E+07 | −4.090689E+05 | 2.562386E+03 |
| A20 | 0.000000E+00 | −3.094006E+07 | 2.056724E+05 | −9.943657E+02 |

An equation of the aspheric surfaces of the fifth optical embodiment is the same as that of the first optical embodiment, and the definitions are the same as well.

The exact parameters of the fifth optical embodiment based on Table 9 and Table 10 are listed in the following table:

Fifth optical embodiment (Reference wavelength: 555 nm)

| InRS41 | InRS42 | HVT41 | HVT42 | ODT % | TDT % |
|---|---|---|---|---|---|
| −0.07431 | 0.00475 | 0.00000 | 0.53450 | 2.09403 | 0.84704 |
| \|f/f1\| | \|f/f2\| | \|f/f3\| | \|f/f4\| | \|f1/f2\| | \|f2/f3\| |
| 0.65616 | 0.07145 | 2.04129 | 1.83056 | 0.10890 | 28.56826 |
| ΣPPR | ΣNPR | ΣPPR/\|ΣNPR\| | ΣPP | ΣNP | f1/ΣPP |
| 2.11274 | 2.48672 | 0.84961 | −14.05932 | 1.01785 | 1.03627 |
| f4/ΣNP | IN12/f | IN23/f | IN34/f | TP3/f | TP4/f |
| 1.55872 | 0.10215 | 0.04697 | 0.02882 | 0.33567 | 0.16952 |
| InTL | HOS | HOS/HOI | InS/HOS | InTL/HOS | ΣTP/InTL |
| 1.09131 | 1.64329 | 1.59853 | 0.98783 | 0.66410 | 0.83025 |

-continued

| Fifth optical embodiment (Reference wavelength: 555 nm) | | | | | |
|---|---|---|---|---|---|
| (TP1 + IN12)/ TP2 | (TP4 + IN34)/ TP3 | TP1/TP2 | TP3/TP4 | IN23/(TP2 + IN23 + TP3) | |
| 1.86168 | 0.59088 | 1.23615 | 1.98009 | 0.08604 | |
| \|InRS41\|/TP4 | \|InRS42\|/TP4 | HVT42/HOI | HVT42/HOS | InTL/HOS | |
| 0.4211 | 0.0269 | 0.5199 | 0.3253 | 0.6641 | |
| PhiA | | | | | HOI |
| 1.596 mm | | | | | 1.028 mm |
| PSTA | PLTA | NSTA | NLTA | SSTA | SLTA |
| −0.029 mm | −0.023 mm | −0.011 mm | −0.024 mm | 0.010 mm | 0.011 mm |

The results of the equations of the fifth optical embodiment based on Table 9 and Table 10 are listed in the following table:

| Values related to the inflection points of the fifth optical embodiment (Reference wavelength: 555 nm) | | | | | | | |
|---|---|---|---|---|---|---|---|
| HIF111 | 0.28454 | HIF111/HOI | 0.27679 | SGI111 | 0.04361 | \|SGI111\|/(\|SGI111\| + TP1) | 0.17184 |
| HIF211 | 0.04198 | HIF211/HOI | 0.04083 | SGI211 | 0.00007 | \|SGI211\|/(\|SGI211\| + TP2) | 0.00040 |
| HIF212 | 0.37903 | HIF212/HOI | 0.36871 | SGI212 | −0.03682 | \|SGI212\|/(\|SGI212\| + TP2) | 0.17801 |
| HIF221 | 0.25058 | HIF221/HOI | 0.24376 | SGI221 | 0.00695 | \|SGI221\|/(\|SGI221\| + TP2) | 0.03927 |
| HIF311 | 0.14881 | HIF311/HOI | 0.14476 | SGI311 | −0.00854 | \|SGI311\|/(\|SGI311\| + TP3) | 0.02386 |
| HIF312 | 0.31992 | HIF312/HOI | 0.31120 | SGI312 | −0.01783 | \|SGI312\|/(\|SGI312\| + TP3) | 0.04855 |
| HIF313 | 0.32956 | HIF313/HOI | 0.32058 | SGI313 | −0.01801 | \|SGI313\|/(\|SGI313\| + TP3) | 0.04902 |
| HIF321 | 0.36943 | HIF321/HOI | 0.35937 | SGI321 | −0.14878 | \|SGI321\|/(\|SGI321\| + TP3) | 0.29862 |
| HIF411 | 0.01147 | HIF411/HOI | 0.01116 | SGI411 | −0.00000 | \|SGI411\|/(\|SGI411\| + TP4) | 0.00001 |
| HIF412 | 0.22405 | HIF412/HOI | 0.21795 | SGI412 | 0.01598 | \|SGI412\|/(\|SGI412\| + TP4) | 0.08304 |
| HIF421 | 0.24105 | HIF421/HOI | 0.23448 | SGI421 | 0.05924 | \|SGI421\|/(\|SGI421\| + TP4) | 0.25131 |

The figures related to the profile curve lengths obtained based on Table 9 and Table 10 are listed in the following table:

| Fifth optical embodiment (Reference wavelength: 555 nm) | | | | | | |
|---|---|---|---|---|---|---|
| ARE | 1/2 (HEP) | ARE value | ARE−1/2 (HEP) | 2(ARE/HEP) % | TP | ARE/TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.372 | 0.375 | 0.00267 | 100.72% | 0.170 | 220.31% |
| 22 | 0.372 | 0.371 | −0.00060 | 99.84% | 0.170 | 218.39% |
| 31 | 0.372 | 0.372 | −0.00023 | 99.94% | 0.349 | 106.35% |
| 32 | 0.372 | 0.404 | 0.03219 | 108.66% | 0.349 | 115.63% |
| 41 | 0.372 | 0.373 | 0.00112 | 100.30% | 0.176 | 211.35% |
| 42 | 0.372 | 0.387 | 0.01533 | 104.12% | 0.176 | 219.40% |
| ARS | EHD | ARS value | ARS−EHD | (ARS/EHD) % | TP | ARS/TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.387 | 0.391 | 0.00383 | 100.99% | 0.170 | 229.73% |
| 22 | 0.458 | 0.460 | 0.00202 | 100.44% | 0.170 | 270.73% |
| 31 | 0.476 | 0.478 | 0.00161 | 100.34% | 0.349 | 136.76% |
| 32 | 0.494 | 0.538 | 0.04435 | 108.98% | 0.349 | 154.02% |
| 41 | 0.585 | 0.624 | 0.03890 | 106.65% | 0.176 | 353.34% |
| 42 | 0.798 | 0.866 | 0.06775 | 108.49% | 0.176 | 490.68% |

Sixth Optical Embodiment

Figure 7A:
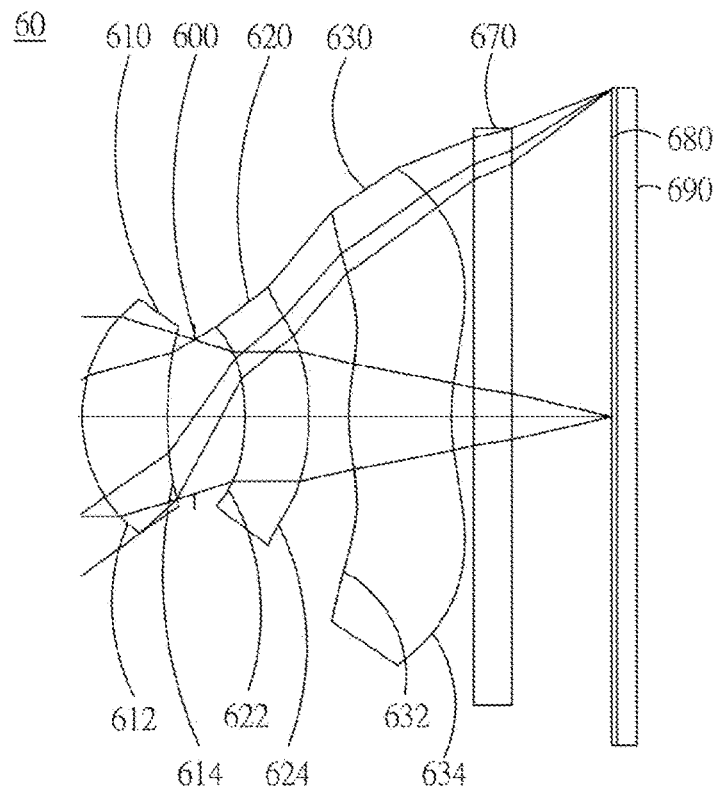
FIG. 7A is a schematic diagram of a sixth optical embodiment of the present invention.
Figure 7B:
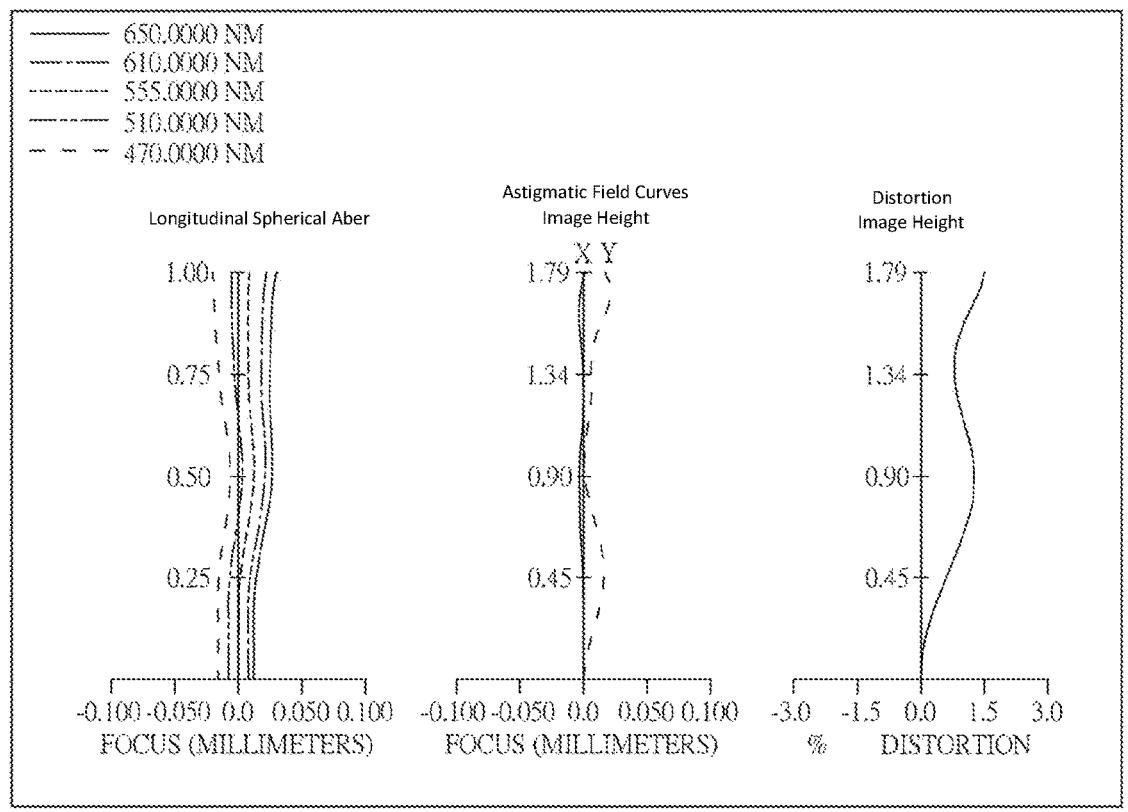
FIG. 7B shows curve diagrams of longitudinal spherical aberration, astigmatic field, and optical distortion of the optical image capturing module in the order from left to right of the sixth optical embodiment of the present application.

As shown in FIG. 7A and FIG. 7B, an optical image capturing module 60 of the sixth optical embodiment of the present invention includes, along an optical axis from an object side to an image side, a first lens 610, an aperture 600, a second lens 620, a third lens 630, an infrared rays filter 670, an image plane 680, and an image sensor 690.

The first lens 610 has positive refractive power and is made of plastic. An object-side surface 612, which faces the object side, is a convex aspheric surface, and an image-side surface 614, which faces the image side, is a concave aspheric surface.

The second lens 620 has negative refractive power and is made of plastic. An object-side surface 622 thereof, which faces the object side, is a concave aspheric surface, and an image-side surface 624 thereof, which faces the image side, is a convex aspheric surface. The image-side surface 624 has an inflection point.

The third lens 630 has positive refractive power and is made of plastic. An object-side surface 632, which faces the object side, is a convex aspheric surface, and an image-side surface 634, which faces the image side, is a concave aspheric surface. The object-side surface 632 has two inflection points, and the image-side surface 634 has an inflection point.

The infrared rays filter 670 is made of glass and is disposed between the third lens 630 and the image plane 680. The infrared rays filter 670 gives no contribution to the focal length of the optical image capturing module 60.

The parameters of the lenses of the sixth optical embodiment are listed in Table 11 and Table 12.

TABLE 11

| | | f = 2.41135 mm; f/HEP = 2.22; HAF = 36 deg | | | | |
|---|---|---|---|---|---|---|
| Surface | | Radius of curvature (mm) | Thickness (mm) | Material | Refractive index | Abbe number | Focal length (mm) |
| 0 | Object | 1E+18 | 600 | | | | |
| 1 | 1st lens | 0.840352226 | 0.468 | plastic | 1.535 | 56.27 | 2.232 |
| 2 | | 2.271975602 | 0.148 | | | | |
| 3 | Aperture | 1E+18 | 0.277 | | | | |
| 4 | 2nd lens | −1.157324239 | 0.349 | plastic | 1.642 | 22.46 | −5.221 |
| 5 | | −1.968404008 | 0.221 | | | | |
| 6 | 3rd lens | 1.151874235 | 0.559 | plastic | 1.544 | 56.09 | 7.360 |
| 7 | | 1.338105159 | 0.123 | | | | |
| 8 | Infrared rays filter | 1E+18 | 0.210 | BK7 | 1.517 | 64.13 | |
| 9 | | 1E+18 | 0.547 | | | | |
| 10 | Image plane | 1E+18 | 0.000 | | | | |

Reference wavelength (d-line): 555 nm; the position of blocking light: the effective half diameter of the clear aperture of the first surface is 0.640 mm.

TABLE 12

| | Coefficients of the aspheric surfaces | | | | | |
|---|---|---|---|---|---|---|
| Surface | 1 | 2 | 4 | 5 | 6 | 7 |
| k | −2.019203E−01 | 1.528275E+01 | 3.743939E+00 | −1.207814E+01 | −1.276860E+01 | −3.034004E+00 |
| A4 | 3.944883E−02 | −1.670490E−01 | −4.266331E−01 | −1.696843E+00 | −7.396546E−01 | −5.308488E−00 |
| A6 | 4.774062E−01 | 3.857435E+00 | −1.423859E+00 | 5.164775E+00 | 4.449101E−01 | 4.374142E−01 |
| A8 | −1.528780E+00 | −7.091408E+01 | 4.119587E+01 | −1.445541E+01 | 2.622372E−01 | −3.111192E−01 |
| A10 | 5.133947E+00 | 6.365801E+02 | −3.456462E+02 | 2.876958E+01 | −2.510946E−01 | 1.354257E−01 |
| A12 | −6.250496E+00 | −3.141002E+03 | 1.495452E+03 | −2.662400E+01 | −1.048030E−01 | −2.652902E−02 |
| A14 | 1.068803E+00 | 7.962834E+03 | −2.747802E+03 | 1.661634E+01 | 1.462137E−01 | −1.203306E−03 |
| A16 | 7.995491E+00 | −8.268637E+03 | 1.443133E+03 | −1.327827E+01 | −3.676651E−02 | 7.805611E−04 |

An equation of the aspheric surfaces of the sixth optical embodiment is the same as that of the first optical embodiment, and the definitions are the same as well.

The exact parameters of the sixth optical embodiment based on Table 11 and Table 12 are listed in the following table:

| Sixth optical embodiment (Reference wavelength: 555 nm) | | | | | |
|---|---|---|---|---|---|
| |f/f1| | |f/f2| | |f/f3| | |f1/f2| | |f2/f3| | TP1/TP2 |
| 1.08042 | 0.46186 | 0.32763 | 2.33928 | 1.40968 | 1.33921 |
| ΣPPR | ΣNPR | ΣPPR/|ΣNPR| | IN12/f | IN23/f | TP2/TP3 |
| 1.40805 | 0.46186 | 3.04866 | 0.17636 | 0.09155 | 0.62498 |
| TP2/(IN12 + TP2 + IN23) | | (TP1 + IN12)/TP2 | | (TP3 + IN23)/TP2 | |
| 0.35102 | | 2.23183 | | 2.23183 | |
| HOS | InTL | HOS/HOI | InS/HOS | |ODT|% | |TDT|% |
| 2.90175 | 2.02243 | 1.61928 | 0.78770 | 1.50000 | 0.71008 |
| HVT21 | HVT22 | HVT31 | HVT32 | HVT32/HOI | HVT32/HOS |
| 0.00000 | 0.00000 | 0.46887 | 0.67544 | 0.37692 | 0.23277 |
| PhiA | | | | | HOI |
| 2.716 mm | | | | | 1.792 mm |
| | | | | | InTL/HOS |
| | | | | | 0.6970 |
| PLTA | PSTA | NLTA | NSTA | SLTA | SSTA |
| −0.002 mm | 0.008 mm | 0.006 mm | −0.008 mm | −0.007 mm | 0.006 mm |

The results of the equations of the sixth optical embodiment based on Table 11 and Table 12 are listed in the following table:

Values related to the inflection points of the sixth optical embodiment
(Reference wavelength: 555 nm)

| | | | | | | |
|---|---|---|---|---|---|---|
| HIF221 | 0.5599 | HIF221/HOI | 0.3125 | SGI221 | −0.1487 | |SGI221|/(|SGI221| + TP2) 0.2412 |
| HIF311 | 0.2405 | HIF311/HOI | 0.1342 | SGI311 | 0.0201 | |SGI311|/(|SGI311| + TP3) 0.0413 |
| HIF312 | 0.8255 | HIF312/HOI | 0.4607 | SGI312 | −0.0234 | |SGI312|/(|SGI312| + TP3) 0.0476 |
| HIF321 | 0.3505 | HIF321/HOI | 0.1956 | SGI321 | 0.0371 | |SGI321|/(|SGI321| + TP3) 0.0735 |

The figures related to the profile curve lengths obtained based on Table 11 and Table 12 are listed in the following table:

Sixth optical embodiment (Reference wavelength: 555 nm)

| ARE | 1/2 (HEP) | ARE value | ARE-1/2 (HEP) | 2(ARE/HEP) % | TP | ARE/TP (%) |
|---|---|---|---|---|---|---|
| 11 | 0.546 | 0.598 | 0.052 | 109.49% | 0.468 | 127.80% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.546 | 0.572 | 0.026 | 104.78% | 0.349 | 163.78% |
| 31 | 0.546 | 0.548 | 0.002 | 100.36% | 0.559 | 98.04% |
| 32 | 0.546 | 0.550 | 0.004 | 100.80% | 0.559 | 98.47% |

| ARS | EHD | ARS value | ARS-EHD | (ARS/EHD) % | TP | ARS/TP (%) |
|---|---|---|---|---|---|---|
| 11 | 0.640 | 0.739 | 0.099 | 115.54% | 0.468 | 158.03% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.706 | 0.750 | 0.044 | 106.28% | 0.349 | 214.72% |
| 31 | 1.118 | 1.135 | 0.017 | 101.49% | 0.559 | 203.04% |
| 32 | 1.358 | 1.489 | 0.131 | 109.69% | 0.559 | 266.34% |

The optical image capturing module of the present invention could be one of a group consisting of an electronic portable device, an electronic wearable device, an electronic monitoring device, an electronic information device, an electronic communication device, a machine vision device, and a vehicle electronic device. In addition, the optical image capturing module of the present invention could reduce the required mechanism space and increase the visible area of the screen by using different lens groups with different number of lens.

It must be pointed out that the embodiments described above are only some embodiments of the present invention. All equivalent structures which employ the concepts disclosed in this specification and the appended claims should fall within the scope of the present invention.

What is claimed is:

1. A movable carrier auxiliary system, comprising:
at least two optical image capturing systems respectively disposed on a left portion and a right portion of a movable carrier, wherein each of the optical image capturing systems comprises an image capturing module and an operation module; the image capturing module captures and produces an environmental image surrounding the movable carrier; the operation module is electrically connected to the image capturing module, and detects at least one moving object in the environmental image to generate a detecting signal;
at least one warning module which is electrically connected to the operation module, and receives the detecting signal, and generates a warning signal when the detecting signal is received to determine that the at least one moving object approaches the movable carrier, and
at least one displaying device electrically connected to the at least one warning module to display the warning signal;
wherein each of the optical image capturing systems has at least one lens group; the at least one lens group comprises at least two lenses having refractive power and satisfies:

$1.0 \leq f/HEP \leq 10.0$;

$0 \deg \leq HAF \leq 150 \deg$; and $0.9 \leq 2 (ARE/HEP) \leq 2.0$;

where f is a focal length of the at least one lens group; HEP is an entrance pupil diameter of the at least one lens group; HAF is a half of a maximum field angle of the at least one lens group; ARE is a profile curve length measured from a start point where an optical axis of the at least one lens group passes through any surface of one of the at least two lenses, along a surface profile of the corresponding lens, and finally to a coordinate point of a perpendicular distance where is a half of the entrance pupil diameter away from the optical axis.

2. The movable carrier auxiliary system of claim 1, wherein the at least one lens group satisfies:

$0.9 \leq ARS/EHD \leq 2.0$;

wherein for any surface of any lens, ARS is a profile curve length measured from a start point where the optical axis passes therethrough, along a surface profile thereof, and finally to an end point of the maximum effective half diameter thereof; EHD is a maximum effective half diameter thereof.

3. The movable carrier auxiliary system of claim 1, wherein the at least one lens group satisfies:

$PLTA \leq 100$ μm;

$PSTA \leq 100$ μm;

$NLTA \leq 100$ μm;

$NSTA \leq 100$ μm;

$SLTA \leq 100$ μm;

$SSTA \leq 100$ μm; and $|TDT| \leq 250\%$;

where HOI is a maximum height for image formation perpendicular to the optical axis on an image plane of the at least one lens group; PLTA is a transverse aberration at 0.7 HOI in a positive direction of a tangential ray fan aberration after the longest operation wavelength passing through an edge of the entrance pupil; PSTA is a transverse aberration at 0.7 HOI in the positive direction of the tangential ray fan aberration after the shortest operation wavelength passing through the edge of the entrance pupil; NLTA is a transverse aberration at 0.7 HOI in a negative direction of the tangential ray fan aberration after the longest operation wavelength passing through the edge of the entrance pupil; NSTA is a transverse aberration at 0.7 HOI in the negative direction of the tangential ray fan aberration after the shortest operation wavelength passing through the edge of the entrance pupil; SLTA is a transverse aberration at 0.7 HOI of a sagittal ray fan aberration after the longest operation wavelength passing through the edge of the entrance pupil; SSTA is a transverse aberration at 0.7 HOI of the sagittal ray fan aberration after the shortest operation wavelength passing through the edge of the entrance pupil; TDT is a TV distortion for image formation in the optical image capturing module.

4. The movable carrier auxiliary system of claim 1, wherein the at least one lens group comprises four lenses having refractive power, which are constituted by a first lens, a second lens, a third lens, and a fourth lens in order along an optical axis from an object side to an image side; the at least one lens group satisfies:

$0.1 \leq InTL/HOS \leq 0.95$;

where HOS is a distance in parallel with the optical axis between an object-side surface of the first lens and an image plane of the at least one lens group; InTL is a distance in parallel with the optical axis from the object-side surface of the first lens to an image-side surface of the fourth lens.

5. The movable carrier auxiliary system of claim 1, wherein the at least one lens group comprises five lenses having refractive power, which are constituted by a first lens, a second lens, a third lens, a fourth lens, and a fifth lens in order along an optical axis from an object side to an image side; the at least one lens group satisfies:

$0.1 \leq InTL/HOS \leq 0.95$;

where HOS is a distance in parallel with the optical axis between an object-side surface of the first lens and an image plane of the at least one lens group; InTL is a distance in parallel with the optical axis from the object-side surface of the first lens to an image-side surface of the fifth lens.

6. The movable carrier auxiliary system of claim 1, wherein the at least one lens group comprises six lenses having refractive power, which are constituted by a first lens, a second lens, a third lens, a fourth lens, a fifth lens, and a six lens in order along an optical axis from an object side to an image side; the at least one lens group satisfies:

$0.1 \leq InTL/HOS \leq 0.95$;

where HOS is a distance in parallel with the optical axis between an object-side surface of the first lens and an image plane of the at least one lens group; InTL is a distance in parallel with the optical axis from the object-side surface of the first lens to an image-side surface of the sixth lens.

7. The movable carrier auxiliary system of claim 1, wherein the at least one lens group comprises seven lenses having refractive power, which are constituted by a first lens, a second lens, a third lens, a fourth lens, a fifth lens, a sixth lens, and a seventh lens in order along an optical axis from an object side to an image side; the at least one lens group satisfies:

$0.1 \leq InTL/HOS \leq 0.95$;

where HOS is a distance in parallel with the optical axis between an object-side surface of the first lens and an image plane of the at least one lens group; InTL is a distance in parallel with the optical axis from the object-side surface of the first lens to an image-side surface of the seventh lens.

8. The movable carrier auxiliary system of claim 1, wherein the warning signal is displayed on the at least one displaying device as an image, a text, or both of the image and the text.

9. The movable carrier auxiliary system of claim 1, wherein the a horizontal angle of view covered by the environmental image is at least 50 degrees.

10. The movable carrier auxiliary system of claim 1, wherein the movable carrier auxiliary system comprises at least three optical image capturing systems respectively disposed on the left portion, the right portion, and a rear portion of the movable carrier.

11. The movable carrier auxiliary system of claim 1, wherein the movable carrier auxiliary system comprises at least four optical image capturing systems respectively disposed on the left portion, the right portion, a front portion, and a rear portion of the movable carrier.

12. The movable carrier auxiliary system of claim 1, further comprising at least one image fusion output device which is disposed inside of the movable carrier and is electrically connected to the optical image capturing systems, thereby to receive the environmental image of the optical image capturing systems to generate a fusion image.

13. The movable carrier auxiliary system of claim 12, wherein a horizontal angle of view covered by the fusion image is at least 180 degrees.

14. The movable carrier auxiliary system of claim 12, wherein a horizontal angle of view covered by the fusion image is at least 360 degrees.

15. The movable carrier auxiliary system of claim 1, wherein each of the optical image capturing systems is disposed on the at least one displaying device.

16. The movable carrier auxiliary system of claim 1, wherein the at least one displaying device is disposed inside, outside, or both inside and outside of the movable carrier.

17. The movable carrier auxiliary system of claim 1, wherein the at least one displaying device is a vehicle electronic rear-view mirror.

18. The movable carrier auxiliary system of claim 1, wherein the at least one displaying device comprises at least one of a LCD, a LED, an OLED, a plasma projection element, a digital projection element, and a liquid crystal display module.

19. A movable carrier auxiliary system, comprising:
at least two optical image capturing systems respectively disposed on a left portion and a right portion of a movable carrier, wherein each of the optical image capturing systems comprises an image capturing module and an operation module; the image capturing module captures and produces an environmental image surrounding the movable carrier; the operation module is electrically connected to the image capturing module, and detects at least one moving object in the environmental image to generate a detecting signal;
at least one warning module which is electrically connected to the operation module, and receives the detecting signal, and generates a warning signal when the detecting signal is received to determine that the at least one moving object approaches the movable carrier;

at least one warning member which is disposed on the movable carrier and is electrically connected to the at least one warning module, wherein the at least one warning member operates when the at least one warning member receives the warning signal sent from the at least one warning module; and at least one displaying device electrically connected to the at least one warning module to display the warning signal;

wherein each of the optical image capturing systems has at least one lens group; the at least one lens group comprises at least two lenses having refractive power and satisfies:

$$1.0 \leq f/HEP \leq 10.0;$$

$$0 \deg \leq HAF \leq 150 \deg; \text{ and}$$

$$0.9 \leq 2(ARE/HEP) \leq 2.0;$$

where f is a focal length of the at least one lens group; HEP is an entrance pupil diameter of the at least one lens group; HAF is a half of a maximum field angle of the at least one lens group; ARE is a profile curve length measured from a start point where an optical axis of the at least one lens group passes through any surface of one of the at least two lenses, along a surface profile of the corresponding lens, and finally to a coordinate point of a perpendicular distance where is a half of the entrance pupil diameter away from the optical axis.

20. The movable carrier auxiliary system of claim 19, wherein the at least one warning member is a warning light, a sounding device, or both the warning light and the sounding device.

21. The movable carrier auxiliary system of claim 19, wherein the movable carrier auxiliary system comprises at least three optical image capturing systems respectively disposed on the left portion, the right portion, and a rear portion of the movable carrier.

22. The movable carrier auxiliary system of claim 19, further comprising at least one image fusion output device which is disposed inside of the movable carrier and is electrically connected to the optical image capturing systems, thereby to receive the environmental image of the optical image capturing systems to generate a fusion image.

23. The movable carrier auxiliary system of claim 19, wherein the operation module detects the at least one moving object in the environmental image to generate at least one tracking mark.

24. The movable carrier auxiliary system of claim 19, further comprising:

at least one computing processing unit electrically connected to the at least one warning module;

at least one image switching processor which outputs the corresponding environmental image to the at least one displaying device by switching to one of the optical image capturing systems disposed at different positions based on different control signals come from the movable carrier; and at least one heterogeneous detecting module which is adapted to send a signal to a surrounding environment of the movable carrier and receive a feedback signal, and transmit the feedback signal to the at least one computing processing unit, thereby to achieve a detecting performance, wherein the at least one computing processing unit combines the feedback signal come from the at least one heterogeneous detecting module via the environmental image, thereby to identify an object in the surrounding environment of the movable carrier and an instantaneous distance between the object and the movable carrier.

25. The movable carrier auxiliary system of claim 24, wherein the at least one computing processing unit stores at least one predetermined safe distance and compares values between the predetermined safe distance and the instantaneous distance; when the instantaneous distance is smaller than the predetermined safe distance, the at least one computing processing unit controls the at least one warning module to generate the warning signal to display on the at least one displaying device.

26. The movable carrier auxiliary system of claim 19, wherein the movable carrier is at rest.

27. The movable carrier auxiliary system of claim 24, wherein the at least one heterogeneous detecting module is an ultrasonic transmitting/receiving module.

28. The movable carrier auxiliary system of claim 24, wherein the at least one heterogeneous detecting module is a millimeter wave radar transmitting/receiving module.

29. The movable carrier auxiliary system of claim 24, wherein the at least one heterogeneous detecting module is a lidar transmitting/receiving module.

30. The movable carrier auxiliary system of claim 24, wherein the at least one heterogeneous detecting module is an infrared light transmitting/receiving module.

31. The movable carrier auxiliary system of claim 24, wherein the at least one heterogeneous detecting module is a laser transmitting/receiving module.

32. A movable carrier auxiliary system, comprising:

at least two optical image capturing systems respectively disposed on a left portion and a right portion of a movable carrier, wherein each of the optical image capturing systems comprises an image capturing module and an operation module; the image capturing module captures and produces an environmental image surrounding the movable carrier; the operation module is electrically connected to the image capturing module, and detects at least one moving object in the environmental image to generate a detecting signal and at least one tracking mark;

at least one image fusion output device which is disposed inside of the movable carrier and is electrically connected to the optical image capturing systems, thereby to receive the environmental image of the optical image capturing systems to generate a fusion image;

at least one warning module which is electrically connected to the operation module, and receives the detecting signal, and generates a warning signal when the detecting signal is received to determine that the at least one moving object approaches the movable carrier;

at least one warning member which is disposed on the movable carrier and is electrically connected to the at least one warning module, wherein the at least one warning member operates when the at least one warning member receives the warning signal sent from the at least one warning module; and at least one displaying device electrically connected to the at least one warning module to display the warning signal, the fusion image, and the at least one tracking mark;

wherein each of the optical image capturing systems has at least one lens group; the at least one lens group comprises at least two lenses having refractive power and satisfies:

$1.0 \leq f/HEP \leq 10.0;$ $0 \text{ deg} \leq HAF \leq 150 \text{ deg}.$

33. The movable carrier auxiliary system of claim 32, wherein the at least one lens group satisfies:

$0.9 \leq 2(ARE/HEP) \leq 2.0;$ where f is a focal length of the at least one lens group; HEP is an entrance pupil diameter of the at least one lens group; HAF is a half of a maximum field angle of the at least one lens group; ARE is a profile curve length measured from a start point where an optical axis of the at least one lens group passes through any surface of one of the at least two lenses, along a surface profile of the corresponding lens, and finally to a coordinate point of a perpendicular distance where is a half of the entrance pupil diameter away from the optical axis; and $0.9 \leq ARS/EHD \leq 2.0;$ wherein for any surface of any lens, ARS is a profile curve length measured from a start point where the optical axis passes therethrough, along a surface profile thereof, and finally to an end point of the maximum effective half diameter thereof; EHD is a maximum effective half diameter thereof.

34. The movable carrier auxiliary system of claim 32, further comprising:
at least one computing processing unit electrically connected to the at least one warning module;
at least one image switching processor which outputs the corresponding environmental image to the at least one displaying device by switching to one of the optical image capturing systems disposed at different positions based on different control signals come from the movable carrier; and
at least one heterogeneous detecting module which is adapted to send a signal to a surrounding environment of the movable carrier and receive a feedback signal, and transmit the feedback signal to the at least one computing processing unit, thereby to achieve a detecting performance, wherein the at least one computing processing unit combines the feedback signal come from the at least one heterogeneous detecting module via the environmental image, thereby to identify an object in the surrounding environment of the movable carrier and an instantaneous distance between the object and the movable carrier.

35. The movable carrier auxiliary system of claim 34, wherein the at least one computing processing unit stores at least one predetermined safe distance and compares values between the predetermined safe distance and the instantaneous distance; when the instantaneous distance is smaller than the predetermined safe distance, the at least one computing processing unit controls the at least one warning module to generate the warning signal to display on the at least one displaying device.

36. The movable carrier auxiliary system of claim 32, wherein the at least one warning member is a warning light, a sounding device, or both the warning light and the sounding device.

37. The movable carrier auxiliary system of claim 32, wherein the movable carrier is at rest.

38. The movable carrier auxiliary system of claim 32, wherein the at least one lens group further comprises an aperture, wherein the optical image capturing module further satisfies:

$0.2 \leq InS/HOS \leq 1.1;$ where InS is a distance on the optical axis between the aperture and an image plane of the at least one lens group; HOS is a distance in parallel with the optical axis between an object-side surface of one of the at least two lenses of the at least one lens group furthest from the image plane and the image plane.

39. The movable carrier auxiliary system of claim 32, wherein the at least one displaying device is a vehicle electronic rear-view mirror.

40. The movable carrier auxiliary system of claim 32, wherein the at least one displaying device comprises:
a first transparent assembly having a first incidence surface and a first exit surface, wherein an image enters the first transparent assembly via the first incidence surface, and is emitted via the first exit surface;
a second transparent assembly disposed on the first exit surface, wherein a gap is formed between the second transparent assembly and the first transparent assembly; the second transparent assembly comprises a second incidence surface and a second exit surface; the image is emitted to the second transparent assembly from the first exit surface and is emitted via the second exit surface;
an electro-optic medium layer disposed in the gap formed between the first exit surface of the first transparent assembly and the second incidence surface of the second transparent assembly;
at least one transparent electrode disposed between the first transparent assembly and the electro-optic medium layer;
at least one reflective layer, wherein the electro-optic medium layer is disposed between the first transparent assembly and the at least one reflective layer;
at least one transparent conductive layer disposed between the electro-optic medium layer and the at least one reflective layer;
at least one electrical connector electrically connected to the electro-optic medium layer, wherein the at least one electrical connector transmits an electrical energy to the electro-optic medium layer to change a transparency of the electro-optic medium layer; and
at least one control member electrically connected to the at least one electrical connector, wherein when a brightness of the image exceeds a certain brightness, the at least one control member controls the at least one electrical connector to supply the electrical energy to the electro-optic medium layer.

* * * * *